(12) United States Patent
Yoneda

(10) Patent No.: US 10,559,249 B2
(45) Date of Patent: Feb. 11, 2020

(54) DEVICE, TELEVISION SYSTEM, AND ELECTRONIC DEVICE

(71) Applicant: Semiconductor Energy Laboratory Co., Ltd., Atsugi-shi, Kanagawa-ken (JP)

(72) Inventor: Seiichi Yoneda, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 333 days.

(21) Appl. No.: 15/386,947

(22) Filed: Dec. 21, 2016

(65) Prior Publication Data

US 2017/0186365 A1 Jun. 29, 2017

(30) Foreign Application Priority Data

Dec. 28, 2015 (JP) .................. 2015-255674

(51) Int. Cl.
*H04N 19/513* (2014.01)
*G09G 3/20* (2006.01)
(Continued)

(52) U.S. Cl.
CPC ............. *G09G 3/2096* (2013.01); *G09G 3/32* (2013.01); *G09G 3/3648* (2013.01);
(Continued)

(58) Field of Classification Search
None
See application file for complete search history.

(56) References Cited

U.S. PATENT DOCUMENTS 5,091,334 A 2/1992 Yamazaki et al.
5,262,350 A 11/1993 Yamazaki et al.
(Continued)

FOREIGN PATENT DOCUMENTS

CN 102763154 A 10/2012
JP 2002-152678 A 5/2002
(Continued)

OTHER PUBLICATIONS

International Search Report (Application No. PCT/IB2016/057756) dated Apr. 18, 2017.
(Continued)

*Primary Examiner* — Brian M Butcher
(74) *Attorney, Agent, or Firm* — Fish & Richardson P.C.

(57) ABSTRACT

To provide a novel device, a device with low power consumption, or a versatile device, the device includes a decoder, a driver circuit, and a display portion. The driver circuit includes a plurality of circuits. The display portion includes a plurality of display panels. The decoder has a function of generating a signal corresponding to an image displayed on the display portion. The decoder has a function of determining the necessity of rewriting an image of each of the display panels by detecting a change in the image of each of the display panels. The circuit has a function of outputting a signal to a display panel for which that image rewriting is determined to be necessary. The circuit has a function of stopping output of a signal to a display panel for which image rewriting is determined to be unnecessary.

16 Claims, 45 Drawing Sheets

(51) Int. Cl.
*H04N 19/10* (2014.01)
*H04N 19/423* (2014.01)
*H04N 19/44* (2014.01)
*H04N 19/65* (2014.01)
*G09G 3/32* (2016.01)
*G09G 3/36* (2006.01)
*H04N 5/44* (2011.01)

(52) U.S. Cl.
CPC ........... *H04N 19/10* (2014.11); *H04N 19/423* (2014.11); *H04N 19/44* (2014.11); *H04N 19/513* (2014.11); *H04N 19/65* (2014.11); *G09G 2300/0408* (2013.01); *G09G 2300/0426* (2013.01); *H04N 5/44* (2013.01)

(56) References Cited

U.S. PATENT DOCUMENTS

| | | |
|---|---|---|
| 5,262,654 A | 11/1993 | Yamazaki |
| 5,289,030 A | 2/1994 | Yamazaki et al. |
| 5,453,858 A | 9/1995 | Yamazaki |
| 5,534,884 A | 7/1996 | Mase et al. |
| 5,591,987 A | 1/1997 | Yamazaki et al. |
| 5,764,225 A | 6/1998 | Koshobu |
| 5,767,832 A | 6/1998 | Koyama et al. |
| 5,801,797 A | 9/1998 | Iida et al. |
| 5,849,601 A | 12/1998 | Yamazaki |
| 5,859,443 A | 1/1999 | Yamazaki et al. |
| 5,889,291 A | 3/1999 | Koyama et al. |
| 5,949,397 A | 9/1999 | Koyama et al. |
| 5,977,940 A | 11/1999 | Akiyama et al. |
| 5,982,471 A | 11/1999 | Hirakata et al. |
| 6,288,487 B1 | 9/2001 | Arai |
| 6,295,047 B1 | 9/2001 | Koyama et al. |
| 6,310,600 B1 | 10/2001 | Koyama et al. |
| 6,355,941 B1 | 3/2002 | Yamazaki et al. |
| 6,417,830 B1 | 7/2002 | Byeon, II |
| 6,476,791 B2 | 11/2002 | Koyama et al. |
| 6,480,181 B2 | 11/2002 | Ishii |
| 6,580,423 B1 | 6/2003 | Murade |
| 6,614,418 B2 | 9/2003 | Koyama et al. |
| 6,747,627 B1 | 6/2004 | Koyama et al. |
| 6,774,419 B2 | 8/2004 | Kimura |
| 6,795,066 B2 | 9/2004 | Tanaka et al. |
| 6,943,766 B2 | 9/2005 | Nakamura et al. |
| 6,953,951 B2 | 10/2005 | Yamazaki et al. |
| 7,053,874 B2 | 5/2006 | Koyama |
| 7,109,961 B2 | 9/2006 | Osame |
| 7,190,338 B2 | 3/2007 | Kubota et al. |
| 7,286,108 B2 | 10/2007 | Tsuda et al. |
| 7,291,967 B2 | 11/2007 | Sakata et al. |
| 7,362,295 B2 | 4/2008 | Park et al. |
| 7,399,991 B2 | 7/2008 | Seo et al. |
| 7,477,216 B2 | 1/2009 | Koyama et al. |
| 7,511,709 B2 | 3/2009 | Koyama et al. |
| 7,616,179 B2 | 11/2009 | Nakagawa et al. |
| 7,663,149 B2 | 2/2010 | Seo et al. |
| 7,737,438 B2 | 6/2010 | Endo et al. |
| 7,791,072 B2 | 9/2010 | Kumomi et al. |
| 7,791,074 B2 | 9/2010 | Iwasaki |
| 7,807,515 B2 | 10/2010 | Kato et al. |
| 7,906,777 B2 | 3/2011 | Yano et al. |
| 7,998,372 B2 | 8/2011 | Yano et al. |
| 8,003,981 B2 | 8/2011 | Iwasaki et al. |
| 8,084,331 B2 | 12/2011 | Ofuji et al. |
| 8,129,714 B2 | 3/2012 | Yano et al. |
| 8,143,115 B2 | 3/2012 | Omura et al. |
| 8,164,256 B2 | 4/2012 | Sano et al. |
| 8,202,365 B2 | 6/2012 | Umeda et al. |
| 8,217,877 B2 | 7/2012 | Fukutome |
| 8,274,078 B2 | 9/2012 | Itagaki et al. |
| 8,415,208 B2 | 4/2013 | Takayama et al. |
| 8,541,944 B2 | 9/2013 | Sano et al. |
| 2002/0011783 A1 | 1/2002 | Hosokawa |
| 2002/0113546 A1 | 8/2002 | Seo et al. |
| 2003/0032210 A1 | 2/2003 | Takayama et al. |
| 2003/0063078 A1 | 4/2003 | Hanari et al. |
| 2003/0090198 A1 | 5/2003 | Aston |
| 2003/0098860 A1 | 5/2003 | Nakamura et al. |
| 2005/0039670 A1 | 2/2005 | Hosono et al. |
| 2005/0052439 A1 | 3/2005 | Liou |
| 2005/0127380 A1 | 6/2005 | Kawasaki et al. |
| 2005/0285811 A1 | 12/2005 | Kawase et al. |
| 2006/0043380 A1 | 3/2006 | Kawazoeh et al. |
| 2006/0091794 A1 | 5/2006 | Agostinelli et al. |
| 2006/0267889 A1 | 11/2006 | Kimura |
| 2007/0182700 A1 | 8/2007 | Baba et al. |
| 2007/0259466 A1 | 11/2007 | Sakata et al. |
| 2008/0067508 A1 | 3/2008 | Endo et al. |
| 2008/0197769 A1 | 8/2008 | Seo et al. |
| 2008/0284929 A1 | 11/2008 | Kimura |
| 2008/0284970 A1 | 11/2008 | Ishitani |
| 2009/0045397 A1 | 2/2009 | Iwasaki |
| 2009/0065771 A1 | 3/2009 | Iwasaki et al. |
| 2009/0134389 A1 | 5/2009 | Matsunaga |
| 2009/0194766 A1 | 8/2009 | Park et al. |
| 2009/0219295 A1 | 9/2009 | Reijnaerts |
| 2009/0239320 A1 | 9/2009 | Takayama et al. |
| 2009/0261325 A1 | 10/2009 | Kawamura et al. |
| 2009/0267064 A1 | 10/2009 | Yano et al. |
| 2010/0045179 A1 | 2/2010 | Sano et al. |
| 2010/0066724 A1 | 3/2010 | Huh et al. |
| 2010/0117928 A1 | 5/2010 | Shim et al. |
| 2010/0164906 A1 | 7/2010 | Fukunaga et al. |
| 2010/0177018 A1 | 7/2010 | Wang et al. |
| 2010/0244185 A1 | 9/2010 | Takafuji et al. |
| 2010/0276689 A1 | 11/2010 | Iwasaki |
| 2010/0279462 A1 | 11/2010 | Iwasaki |
| 2010/0295042 A1 | 11/2010 | Yano et al. |
| 2010/0320458 A1 | 12/2010 | Umeda et al. |
| 2010/0320459 A1 | 12/2010 | Umeda et al. |
| 2011/0050657 A1 | 3/2011 | Yamada |
| 2011/0057861 A1 | 3/2011 | Cok et al. |
| 2011/0063262 A1 | 3/2011 | Umezaki et al. |
| 2011/0090183 A1 | 4/2011 | Yamazaki et al. |
| 2011/0090204 A1 | 4/2011 | Yamazaki et al. |
| 2011/0102696 A1 | 5/2011 | Yamazaki et al. |
| 2011/0115839 A1 | 5/2011 | Takahashi et al. |
| 2011/0141069 A1 | 6/2011 | Hirakata et al. |
| 2012/0268445 A1 | 10/2012 | Ogata et al. |
| 2013/0201637 A1 | 8/2013 | De Kok et al. |
| 2013/0299804 A1 | 11/2013 | Ogata et al. |
| 2014/0375704 A1* | 12/2014 | Bi .................. G09G 3/3275 345/694 |
| 2015/0028316 A1 | 1/2015 | Kojima et al. |
| 2015/0228704 A1 | 8/2015 | Miyake et al. |
| 2016/0014882 A1 | 1/2016 | Jongman et al. |
| 2016/0019019 A1 | 1/2016 | Ikeda et al. |
| 2016/0037608 A1 | 2/2016 | Ikeda et al. |
| 2016/0044751 A1 | 2/2016 | Ikeda et al. |
| 2016/0103649 A1 | 4/2016 | Yoshitani et al. |
| 2017/0041517 A1 | 2/2017 | Ikeda |

FOREIGN PATENT DOCUMENTS

| | | |
|---|---|---|
| JP | 2005-070722 A | 3/2005 |
| JP | 2007-096055 A | 4/2007 |
| JP | 2007-123861 A | 5/2007 |
| JP | 2008-033066 A | 2/2008 |
| JP | 2010-177431 A | 8/2010 |
| JP | 2011-141539 A | 7/2011 |
| JP | 2011-215380 A | 10/2011 |
| KR | 2012-0099761 A | 9/2012 |
| TW | 200509037 | 3/2005 |
| TW | 201133444 | 10/2011 |

OTHER PUBLICATIONS

Written Opinion (Application No. PCT/IB2016/057756) dated Apr. 18, 2017.

(56) References Cited

OTHER PUBLICATIONS

Nakamura.M et al., "Syntheses and crystal structures of new homologous compounds, indium iron zinc oxides (InFeO3(ZnO)m) (m natural number) and related compounds", Kotai Butsuri (Solid State Physics), 1993, vol. 28, No. 5, pp. 317-327.

Kawashima.S et al., "13.3-in. 8K x 4K 664-ppi OLED Display Using CAAC-OS FETs", SID Digest '14 : SID International Symposium Digest of Technical Papers, Jun. 3, 2014, pp. 627-630.

* cited by examiner

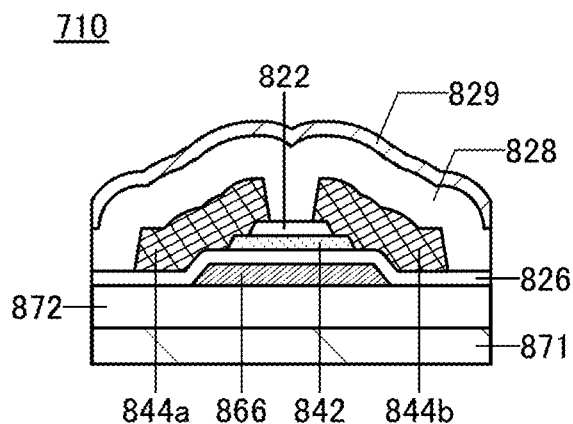
FIG. 22A1
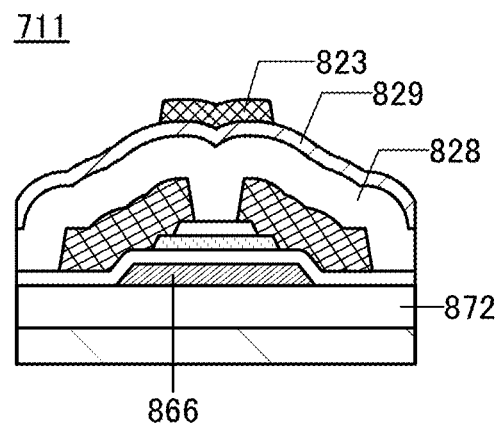
FIG. 22A2
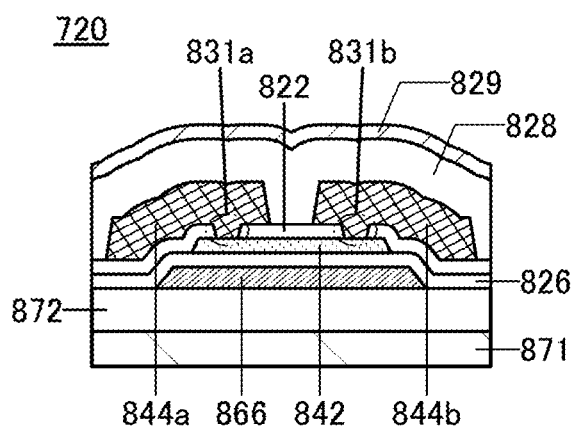
FIG. 22B1
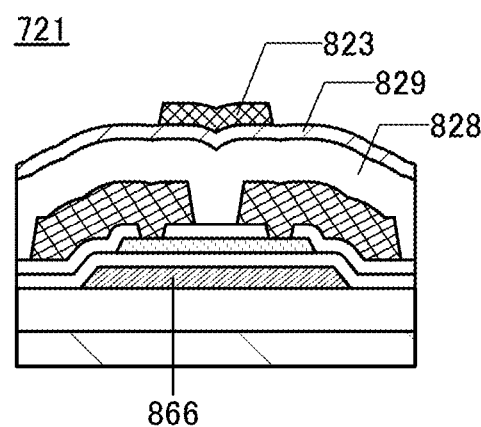
FIG. 22B2
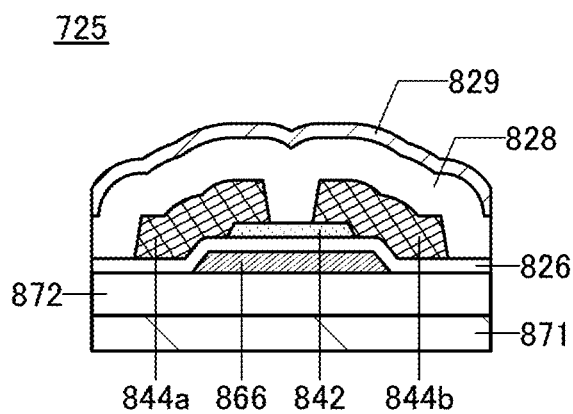
FIG. 22C1
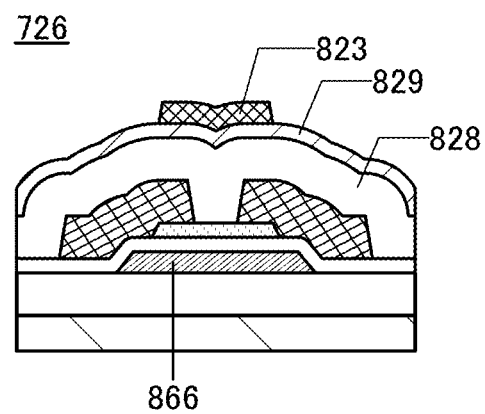
FIG. 22C2

FIG. 23A1
730
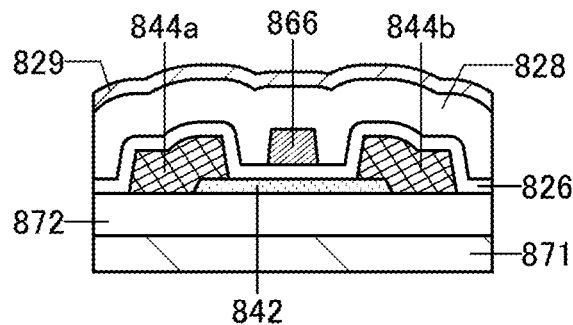
FIG. 23A2
731
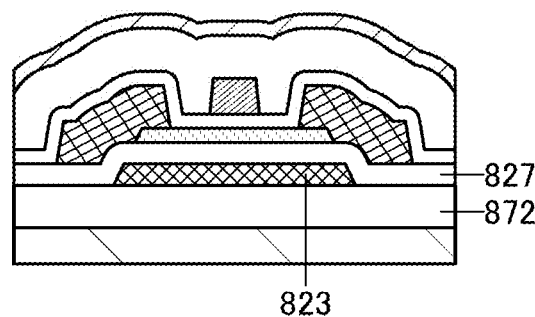
FIG. 23A3
730
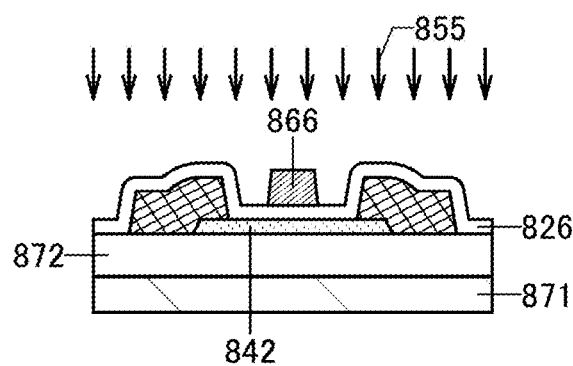
FIG. 23B1
740
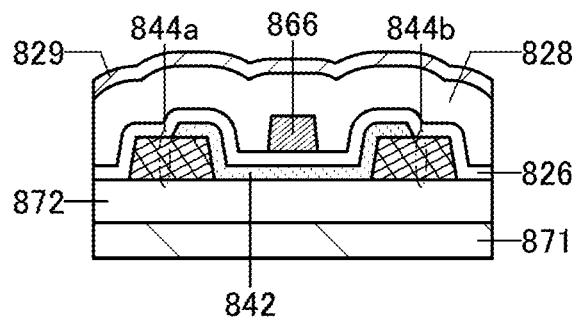
FIG. 23B2
741
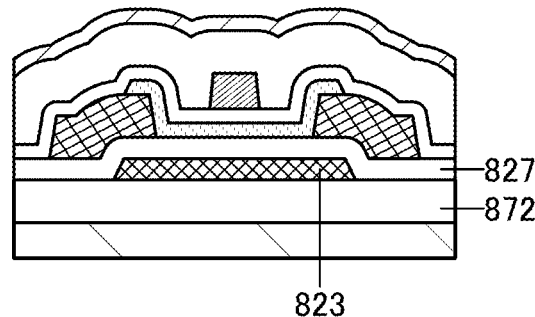

FIG. 24A1
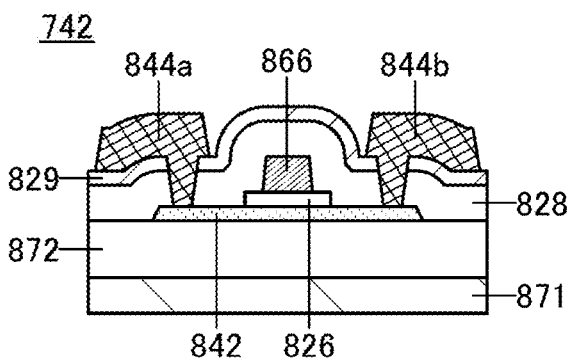
FIG. 24A2
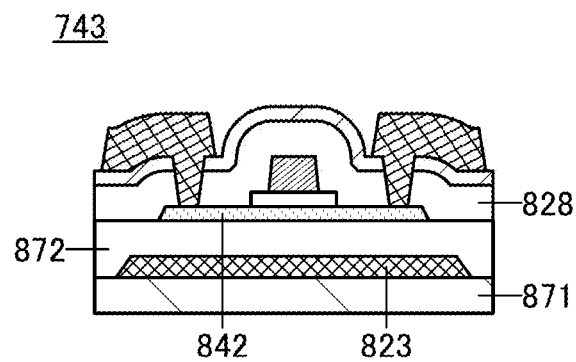
FIG. 24A3
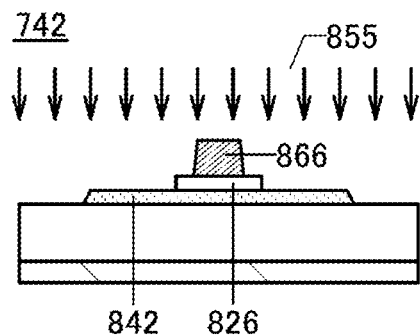
FIG. 24B1
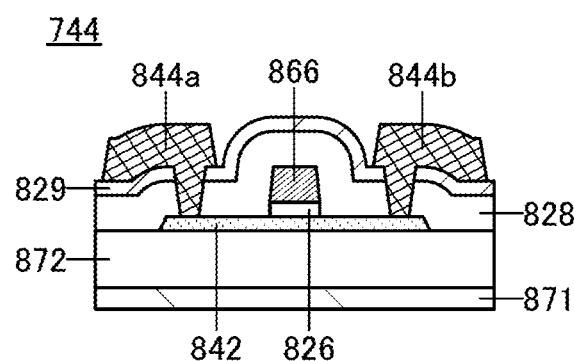
FIG. 24B2
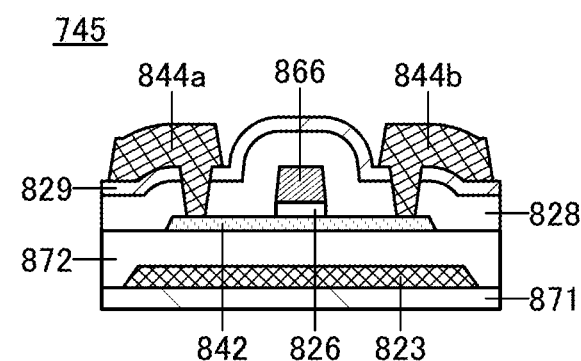
FIG. 24C1
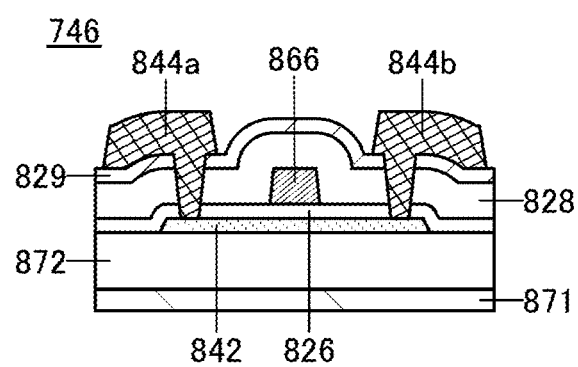
FIG. 24C2
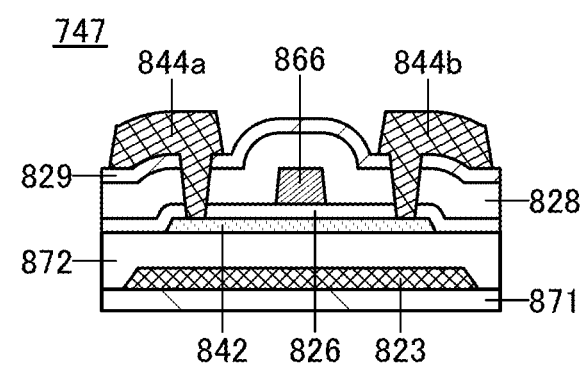

754

754

754

754a

754a

754a

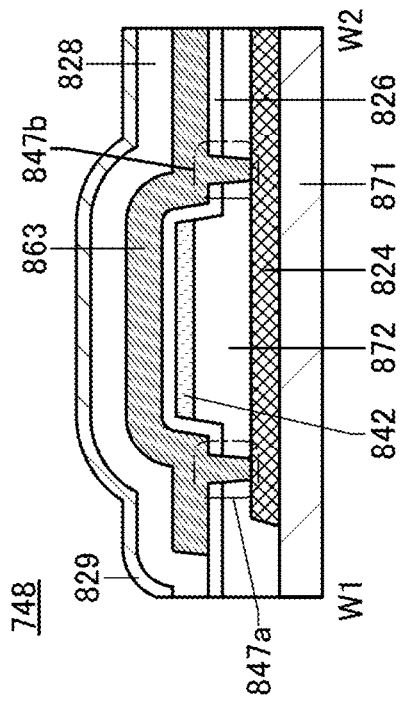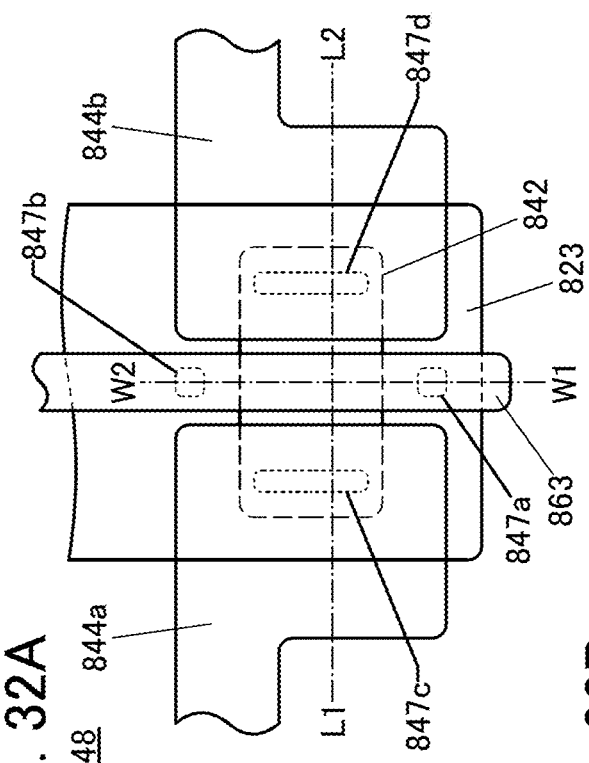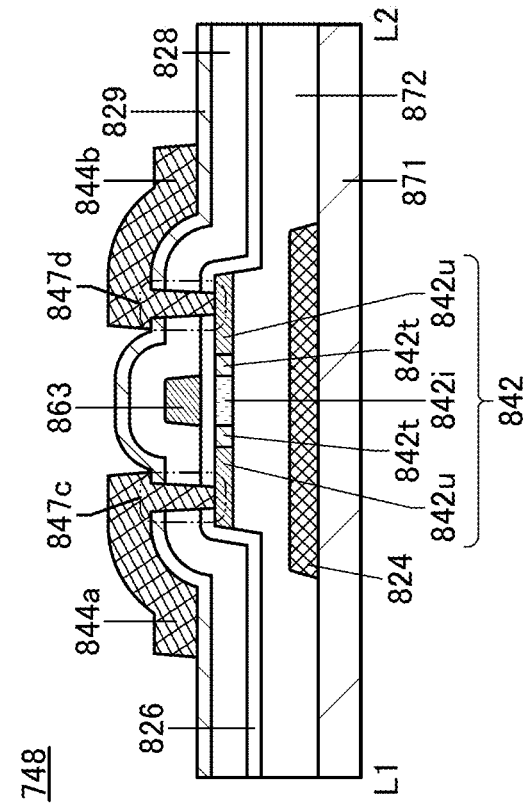
FIG. 32A
FIG. 32B
FIG. 32C

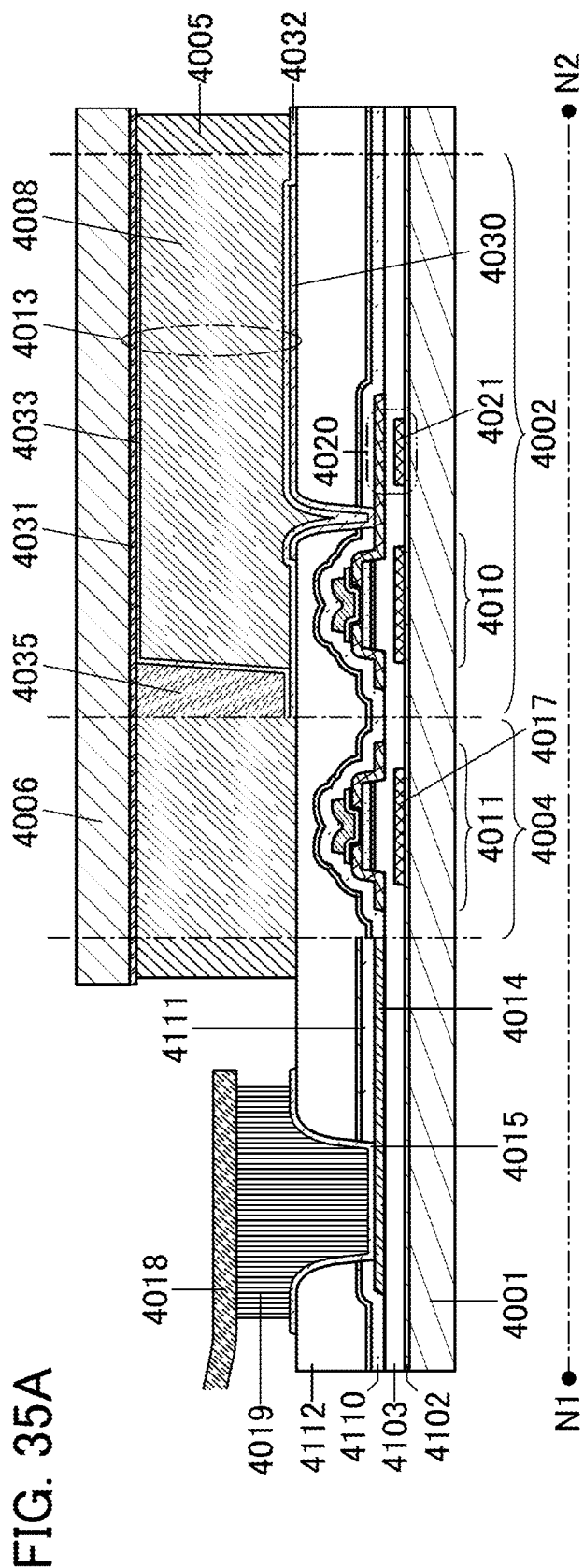
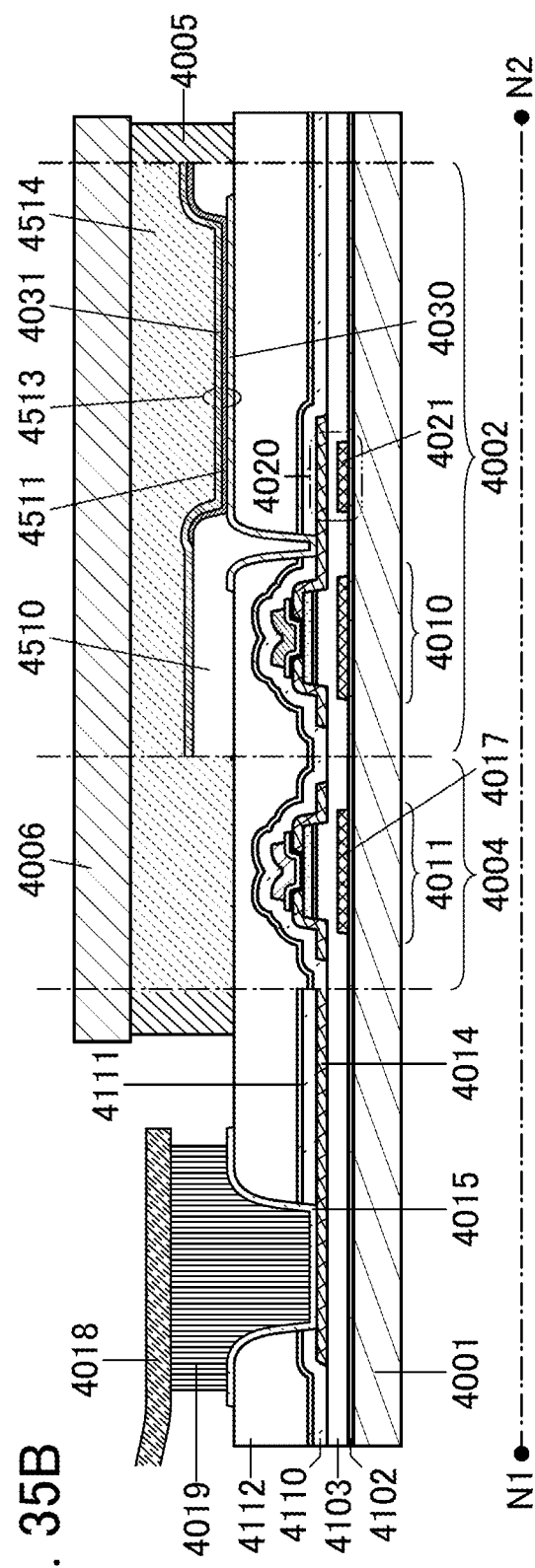
FIG. 35A
FIG. 35B

FIG. 40A out-of-plane method CAAC-OS
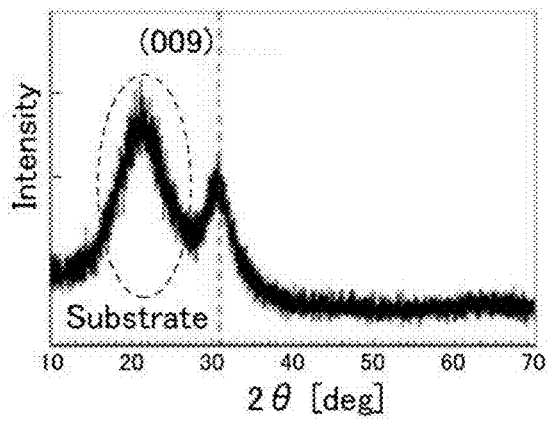
FIG. 40B in-plane method φ scan CAAC-OS
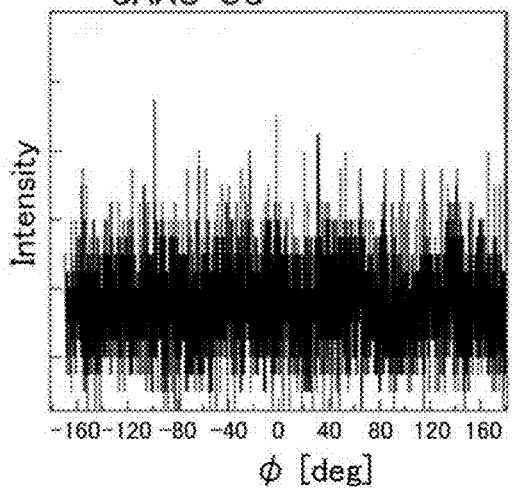
FIG. 40C in-plane method φ scan single crystal OS
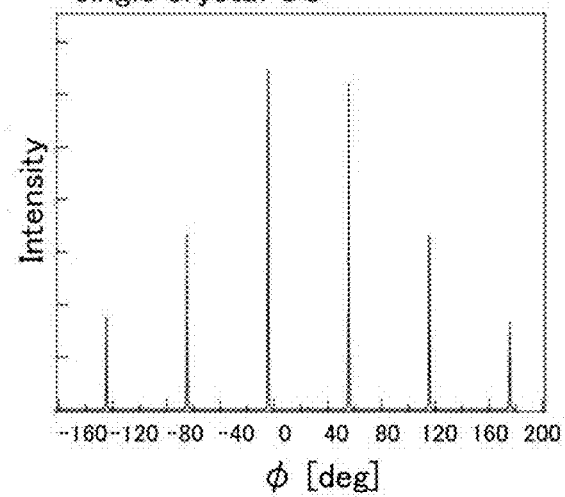
FIG. 40D
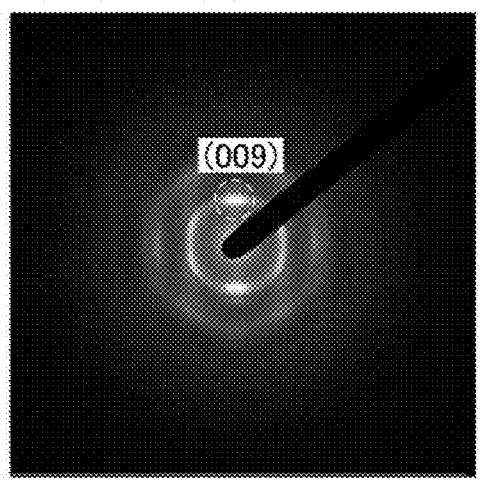
FIG. 40E
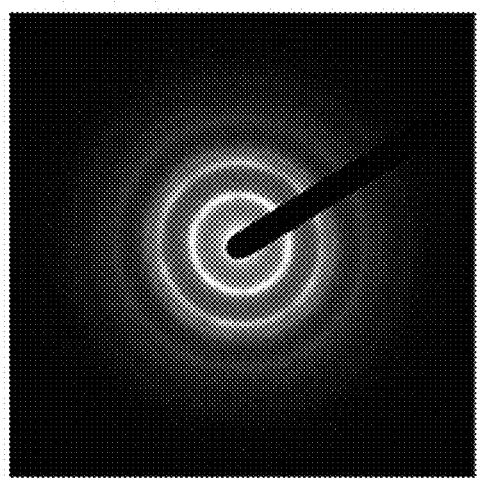

DEVICE, TELEVISION SYSTEM, AND ELECTRONIC DEVICE

TECHNICAL FIELD

One embodiment of the present invention relates to a device, a television system, and an electronic device.

Note that one embodiment of the present invention is not limited to the above technical field. The technical field of one embodiment of the invention disclosed in this specification and the like relates to an object, a method, or a manufacturing method. Furthermore, one embodiment of the present invention relates to a process, a machine, manufacture, or a composition of matter. One embodiment of the present invention relates to a semiconductor device, a display device, a light-emitting device, a power storage device, a memory device, an imaging device, a driving method thereof, or a manufacturing method thereof.

BACKGROUND ART

As a screen of a television (TV) becomes larger, it is desired to be able to watch a high-definition video. For this reason, ultra-high definition TV (UHDTV) broadcast has been promoted. In Japan, 4K broadcast service utilizing a communication satellite (CS) and an optical line started in 2015, and the broadcast of UHDTV (4K and 8K) by a broadcast satellite (BS) will start in the near future. Therefore, various electronic devices which correspond to 8K broadcast are developed (e.g., Non-Patent Document 1).

Flat panel displays typified by liquid crystal display devices and light-emitting display devices are widely used for displaying videos. Although the transistors used in these display devices are mainly manufactured using silicon semiconductors, attention has been drawn to a technique in which a metal oxide exhibiting semiconductor characteristics is used for transistors instead of a silicon semiconductor in recent years. For example, in Patent Documents 1 and 2, a technique is disclosed in which a transistor manufactured using zinc oxide or an In—Ga—Zn-based oxide as an oxide semiconductor is used as a pixel of a display device.

REFERENCE

Patent Document

[Patent Document 1] Japanese Published Patent Application No. 2007-96055
[Patent Document 2] Japanese Published Patent Application No. 2007-123861
[Non-Patent Document 1] S. Kawashima, et al., "13.3-In. 8K×4K 664-ppi OLED Display Using CAAC-OS FETs," SID 2014 DIGEST, pp. 627-630.

An object of one embodiment of the present invention is to provide a novel device. Another object of one embodiment of the present invention is to provide a device with low power consumption. Another object of one embodiment of the present invention is to provide a versatile device.

One embodiment of the present invention does not necessarily achieve all the objects listed above and only needs to achieve at least one of the objects. The description of the above objects does not preclude the existence of other objects. An object other than the above ones automatically becomes clear from description in the specification, the claims, the drawings, or the like. The object other than the above ones can be extracted from the description in the specification, the claims, the drawings, or the like.

The device of one embodiment of the present invention includes a decoder, a driver circuit, and a display portion. The driver circuit includes a plurality of circuits. The display portion includes a plurality of display panels. The decoder is configured to generate a signal corresponding to an image displayed on the display portion. The decoder is configured to detect a change in an image in each display panel and determines whether or not the image rewriting is necessary in each display panel. The circuit is configured to output the signal to the display panel for which image rewriting is determined to be necessary. The circuit is configured to stop output of the signal to the display panel for which image rewriting is determined to be unnecessary.

The device of one embodiment of the present invention includes a decoder, a driver circuit, and a display portion. The driver circuit includes a plurality of circuits. The display portion includes a plurality of display panels. The decoder is configured to generate a first signal corresponding to an image displayed on the display portion. The decoder is configured to detect a change in an image in each display panel and determines whether or not the image rewriting is necessary in each display panel. The circuit is configured to output the first signal to the display panel for which image rewriting is determined to be necessary. The circuit is configured to stop output of the first signal to the display panel for which image rewriting is determined to be unnecessary. The decoder is configured to generate a second signal to synchronize output of signals from the plurality of circuits to the display portion.

In the device of one embodiment of the present invention, the decoder may be configured to perform the determination on the basis of a value of a motion vector of the image displayed on the display panel and a prediction error of an inter-frame prediction of the image displayed on the display panel.

In the device of one embodiment of the present invention, the display panel may include a pixel. The pixel may include a transistor and a display element. One of a source and a drain of the transistor may be electrically connected to a wiring. The other of the source and the drain of the transistor may be electrically connected to the display element. The wiring may be configured to transmit a potential corresponding to a gray level displayed in the pixel. The transistor may include an oxide semiconductor in a channel formation region.

In the device of one embodiment of the present invention, the circuit may be provided inside the display panel.

The television system of one embodiment of the present invention includes the above device. The television system is configured to receive a broadcast signal to generate bitstream data and display an image on the basis of the bitstream data.

The electronic device of one embodiment of the present invention includes the above device or the above television system, and a microphone, a speaker, an operation switch, or a sensor.

One embodiment of the present invention can provide a novel device. Alternatively, according to one embodiment of the present invention, a device with low power consumption can be provided. According to one embodiment of the present invention, a versatile device can be provided.

Note that the description of these effects does not preclude the existence of other effects. One embodiment of the present invention does not necessarily have all of these effects. Other effects will be apparent from and can be derived from the description of the specification, the drawings, the claims, and the like.

BRIEF DESCRIPTION OF DRAWINGS

FIGS. 22A1, 22A2, 22B1, 22B2, 22C1, and 22C2 illustrate structural examples of transistors.

FIGS. 23A1, 23A2, 23A3, 23B1, and 23B2 illustrate structure examples of transistors.

FIGS. 24A1, 24A2, 24A3, 24B1, 24B2, 24C1, and 24C2 illustrate structure examples of transistors.

FIGS. 32A to 32C illustrate a structure example of a transistor.

FIGS. 35A and 35B illustrate structure examples of a display device.

FIGS. 40A to 40E show structural analysis of a CAAC-OS and a single crystal oxide semiconductor by XRD and selected-area electron diffraction patterns of a CAAC-OS.

BEST MODE FOR CARRYING OUT THE INVENTION

Figure 1:
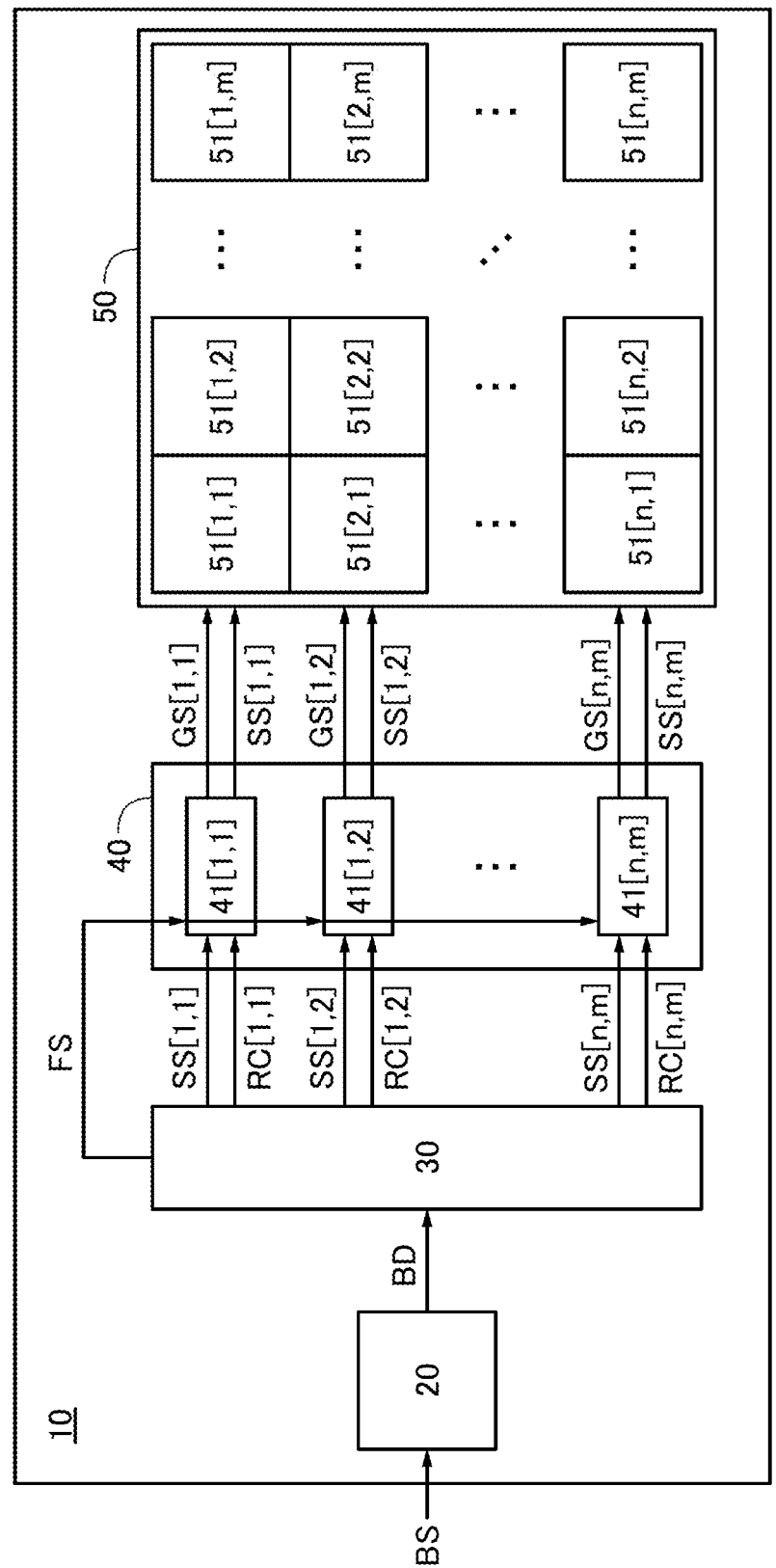
FIG. 1 illustrates a configuration example of a device.

Embodiments of the present invention will be described below in detail with reference to the accompanying drawings. Note that the present invention is not limited to the following description and it is easily understood by those skilled in the art that the mode and details can be variously changed without departing from the scope and spirit of the present invention. Therefore, the present invention should not be interpreted as being limited to the description of the embodiments below.

One embodiment of the present invention includes, in its category, display devices, memory devices, imaging devices, and RF (Radio Frequency) tags in addition to devices, television systems, and electronic devices. The display devices include, in its category, liquid crystal display devices, light-emitting devices having pixels each provided with a light-emitting element typified by an organic light-emitting element, electronic paper, digital micromirror devices (DMDs), plasma display panels (PDPs), field emission displays (FEDs), and the like.

Furthermore, in this specification and the like, an explicit description "X and Y are connected" means that X and Y are electrically connected, X and Y are functionally connected, and X and Y are directly connected. Accordingly, without limitation to a predetermined connection relation, for example, a connection relation shown in drawings or text, another connection relation is included in the drawings or the text. Here, X and Y each denote an object (e.g., a device, an element, a circuit, a wiring, an electrode, a terminal, a conductive film, or a layer).

Examples of the case where X and Y are directly connected include the case where an element that allows an electrical connection between X and Y (e.g., a switch, a transistor, a capacitor, an inductor, a resistor, a diode, a display element, a light-emitting element, and a load) is not connected between X and Y, and the case where X and Y are connected without the element that allows the electrical connection between X and Y provided therebetween.

For example, in the case where X and Y are electrically connected, one or more elements that enable an electrical connection between X and Y (e.g., a switch, a transistor, a capacitor, an inductor, a resistor, a diode, a display element, a light-emitting element, or a load) can be connected between X and Y. Note that the switch is controlled to be turned on or off. That is, a switch is conducting or not conducting (is turned on or off) to determine whether current flows therethrough or not. Alternatively, the switch has a function of selecting and changing a current path. Note that the case where X and Y are electrically connected includes the case where X and Y are directly connected.

For example, in the case where X and Y are functionally connected, one or more circuits that enable functional connection between X and Y (e.g., a logic circuit such as an inverter, a NAND circuit, or a NOR circuit; a signal converter circuit such as a DA converter circuit, an AD converter circuit, or a gamma correction circuit; a potential level converter circuit such as a power source circuit (e.g., a step-up converter or a step-down converter) or a level shifter circuit for changing the potential level of a signal; a voltage source; a current source; a switching circuit; an amplifier circuit such as a circuit that can increase signal amplitude, the amount of current, or the like, an operational amplifier, a differential amplifier circuit, a source follower circuit, or a buffer circuit; a signal generation circuit; a memory circuit; and/or a control circuit) can be connected between X and Y. For example, even when another circuit is interposed between X and Y, X and Y are functionally connected if a signal output from X is transmitted to Y. Note that the case where X and Y are functionally connected includes the case where X and Y are directly connected and the case where X and Y are electrically connected.

Note that in this specification and the like, an explicit description "X and Y are electrically connected" means that X and Y are electrically connected (i.e., the case where X and Y are connected with another element or another circuit provided therebetween), X and Y are functionally connected (i.e., the case where X and Y are functionally connected with another circuit provided therebetween), and X and Y are directly connected (i.e., the case where X and Y are connected without another element or another circuit provided therebetween). That is, in this specification and the like, the explicit description "X and Y are electrically connected" is the same as the description "X and Y are connected".

In describing structures of the present invention with reference to the drawings, the same reference numerals are used in common for the same portions in different drawings in some cases.

Even when independent components are electrically connected to each other in the drawing, one component has functions of a plurality of components in some cases. For example, when part of a wiring also functions as an electrode, one conductive film functions as the wiring and the electrode. Thus, "electrical connection" in this specification includes in its category such a case where one conductive film has functions of a plurality of components.

(Embodiment 1)

In this embodiment, a device according to one embodiment of the present invention is described.

<Structure Example of Device>

FIG. 1 illustrates a configuration example of a device 10. The device 10 can be used for a television system having a function of receiving a broadcast signal and displaying videos on a display portion. The device 10 includes a front end portion 20, a decoder 30, a driver circuit 40, and a display portion 50.

As a coding standard in 8K broadcast, a new standard of H.265|MPEG-H high efficiency video coding (hereinafter referred to as HEVC) is employed. The device 10 can be used for a television system for HEVC.

The front end portion 20 is a circuit having a function of receiving a broadcast signal (signal BS) and performing signal processing. Specifically, the front end portion 20 has a function of generating a signal corresponding to bitstream data (signal BD) by performing demodulation, digital-analog conversion, and the like on the received signal BS. The front end portion 20 may also have a function of correcting an error.

The decoder 30 has a function of generating a signal (signal SS) corresponding to an image to be displayed on the display portion 50 by decoding the signal BD. For example, the decoder 30 has a function of performing entropy decoding, inverse quantization, inverse orthogonal transform such as inverse discrete cosine transform (IDCT) or inverse discrete sine transform (IDST), intra-frame prediction, inter-frame prediction, and the like. In the case where the signal BS is encoded with HEVC, context adaptive binary arithmetic coding (CABAC) decoding is performed in the decoder 30. The signal SS generated in the decoder 30 is output to the driver circuit 40.

The driver circuit 40 has a function of controlling image display in the display portion 50. Specifically, the driver circuit 40 has a function of outputting a signal (signal GS) for selecting a specific region of the display portion 50 and the signal SS supplied to the region selected by the signal GS. In the driver circuit 40, image processing (e.g., gamma processing), digital-analog conversion, or the like may be performed on the signal SS. Furthermore, the driver circuit 40 can be provided in the display portion 50.

The display portion 50 has a function of displaying an image on the basis of the signals GS and SS input from the driver circuit 40. Either a still image or a moving image may be displayed on the display portion 50. The display portion 50 can include a liquid crystal display device or a light-emitting display device, for example.

Here, the display portion 50 includes a plurality of display panels 51. In FIG. 1, a structure example where the display panels 51 arranged in matrix of n rows and m columns (n and m are natural numbers) (the display panels 51[1,1] to 51[n,m]) are provided in the display portion 50 is shown. The display panels 51 can be controlled independently.

The display portion 50 can display one image using the plurality of display panels 51. Thus, an image display region of the display portion 50 can be enlarged. Since the display portion 50 includes the plurality of display panels 51, each of the display panels 51 is not required to be large. Thus, an apparatus for manufacturing the display panel does not need to be increased in size, whereby space-saving can be achieved. In addition, since an apparatus for manufacturing small- and medium-size display panels can be used for manufacturing the display panels 51, there is no need to prepare another manufacturing apparatus for a large-size display device, which leads to a reduction in manufacturing cost. In addition, a decrease in yield caused by an increase in the size of a display panel can be suppressed.

Although the display portion 50 can display one image using n×m display panels 51, one embodiment of the present invention is not limited thereto. For example, the display portion 50 may be divided to display a plurality of images or different images may be displayed on the n×m display panels 51.

Here, in displaying an image on the display portion 50, a display panel 51 in which there is no change in an image between the present frame and the previous frame or the change in the image is a predetermined value or less is included in some cases. Image rewriting is not performed on such a display panel 51, and driving for storing the image displayed in the previous frame can be performed thereon. In this way, power consumption associated with image rewriting can be reduced.

In one embodiment of the present invention, with the use of the decoder 30, image rewriting operation in the display panel 51 in which there is no change in an image or the change in the image is a predetermined value or less is stopped. Specifically, the decoder 30 has a function of determining the necessity of rewriting an image of each of the display panels 51 on the basis of the signal BD and outputting a signal (signal RC) corresponding to the necessity to the driver circuit 40. The driver circuit 40 rewrites or stores an image displayed on the display panel 51 in accordance with the signal RC.

The driver circuit 40 includes circuits 41 as many as the display panels 51. Since the display portion 50 includes n×m display panels 51 in FIG. 1, the driver circuit 40 includes n×m circuits 41 (circuits 41[1,1] to 41[n,m]). Then, the circuits 41 are configured to control display of images on respective display panels 51. Specifically, the signal SS[i, j] and the signal RC[i, j] are input from the decoder 30 to the circuit 41[i, j] (i is an integer greater than or equal to 1 and less than or equal to n, and j is an integer greater than or equal to 1 and less than or equal to m). The signal GS[i, j] and the signal SS[i, j] are input from the circuit 41[i, j] to the display panel 51[i, j].

The outputs of the signals GS and SS from the circuit 41 to the display panel 51 are controlled on the basis of a signal RC input from the decoder 30 to the circuit 41. Specifically, the circuit 41 corresponding to the display panel 51 for which image rewriting is determined to be necessary by the decoder 30 outputs the signals GS and SS to the display panel 51 and rewrites an image displayed on the display panel 51. On the other hand, the circuit 41 corresponding to the display panel 51 for which image rewriting is determined to be unnecessary does not output the signals GS and SS not to rewrite an image displayed on the display panel 51. Thus, operation of the circuit 41 which does not output the signals GS and SS can be stopped, which can reduce power consumption.

The display panel 51 which is determined that image rewriting is unnecessary may be the display panel 51 displaying a background image or the like which does not change, the display panel 51 displaying a still image, or the display panel 51 in which a change in an image is a predetermined value or less, for example.

Although the circuit 41 is provided outside the display panel 51 in FIG. 1, the circuit 41 may be provided in the display panel 51. The signals GS and SS may be generated by respective circuits.

The decoder 30 has a function of generating a synchronization signal (signal FS) for controlling an operation of the driver circuit 40. When the signal FS is input from the decoder 30 to the circuits 41[1,1] to 41[n,m], outputs of the signals GS and SS from the circuits 41[1,1] to 41[n,m] are synchronized. Accordingly, the timing of signals output from the driver circuit 40 to the display portion 50 is synchronized, whereby an image using a plurality of display panels 51 can be displayed on the display portion 50.

As described above, according to one embodiment of the present invention, since image rewriting can be omitted in a certain display panel 51, power consumption can be reduced. Specific configuration examples and operation examples of the circuit 41 and the display panel 51 will be described in Embodiment 2.

<Configuration Example of Decoder>

Figure 2:
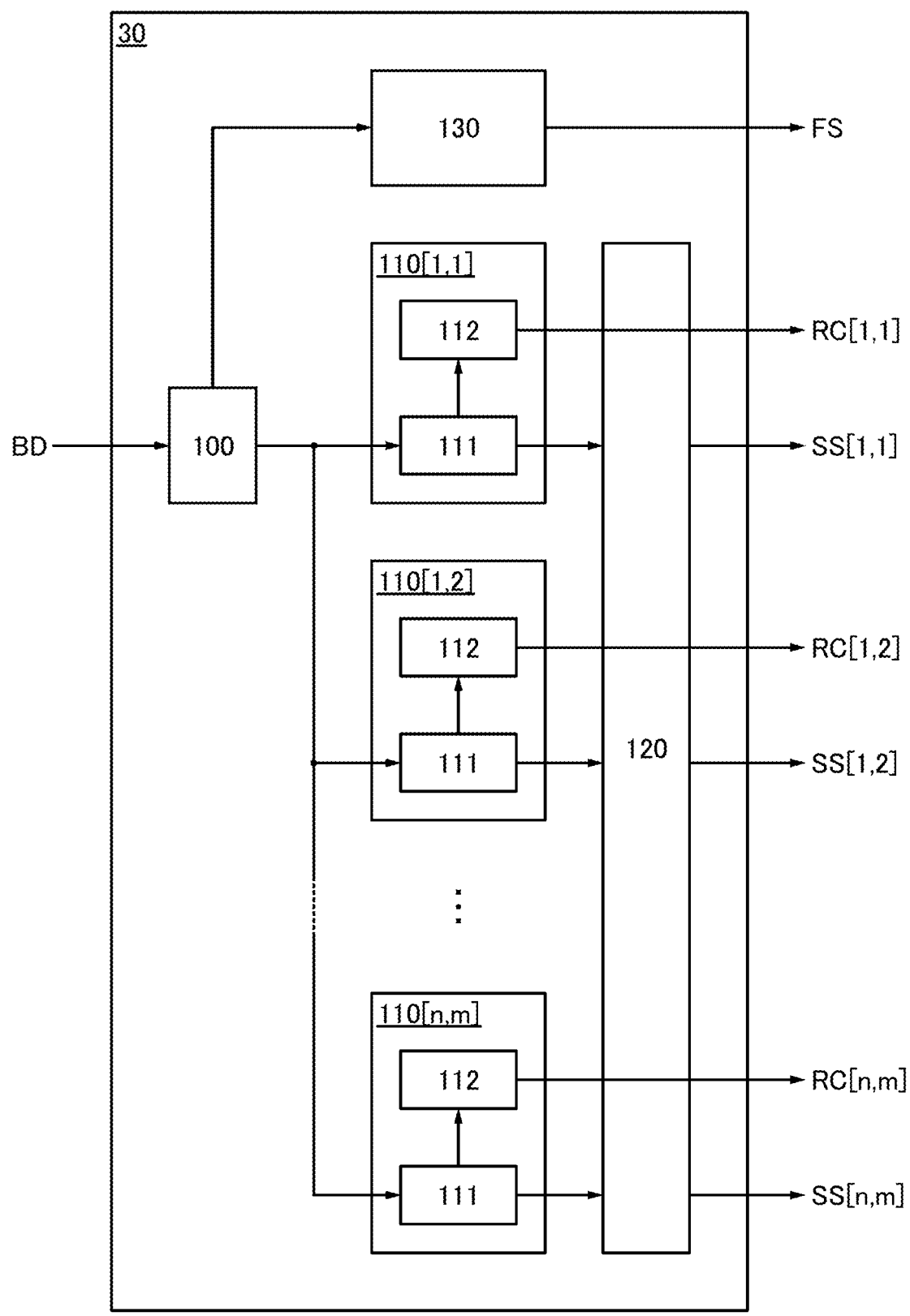
FIG. 2 is a diagram showing a configuration example of a decoder.

A specific example of the decoder 30 is shown in FIG. 2. The decoder 30 includes an identification circuit 100, a plurality of signal generation circuits 110, a loop filter 120, and a signal generation circuit 130.

The identification circuit 100 has a function of sorting and outputting the signals BD input from the front end portion 20 to the signal generation circuits 110. The signal BD includes image data of the display panels 51[1,1] to 51[n,m]. Therefore, the identification circuit 100 determines which display panel 51 corresponds to the image data included in the signal BD and outputs to the image data to the signal generation circuit 110 corresponding to the display panel 51. In FIG. 2, the signal generation circuits 110[1,1] to [n,m] corresponding to the display panels 51[1,1] to 51[n,m] are provided and the image data included in the signal BD is divided into n×m.

The identification circuit 100 has a function of outputting a predetermined signal to the signal generation circuit 130 every time image data of one frame is input as the signal BD.

The signal generation circuit 110 includes a decoder circuit 111 and a determination circuit 112. The decoder circuit 111 decodes the image data input from the identification circuit 100 and generates a signal corresponding to an image to be displayed on the display panel 51. The decoder circuit 111 has a function of preforming entropy decoding, inverse quantization, inverse orthogonal transform, intra-frame prediction, inter-frame prediction, or the like. The signal generated in the decoder circuit 111 is output to the circuit 41 through the loop filter 120.

The loop filter 120 has a function of performing filter operation on the signal generated in the decoder circuit 111 and output it as the signal SS to the circuit 41. Accordingly, noise included in the signal SS can be reduced.

The determination circuit 112 has a function of determining whether or not an image is rewritten in the display panel 51 on the basis of the signal decoded in the decoder circuit 111. Specifically, a change in an image between the present frame and the previous frame is detected in each of the display panels, whereby the necessity of image rewriting is determined for each of the display panels and a signal based on the determination result is output to the circuit 41 as the signal RC.

When the determination circuit 112 determines that image rewriting is necessary, the signal RC corresponding to the case where image rewriting is necessary is output from the determination circuit 112 to the circuit 41. Then, the signals GS and SS are supplied from the circuit 41 to the display panel 51, whereby image rewriting is performed in the display panel 51. On the other hand, when the determination circuit 112 determines that image rewriting is unnecessary the signal RC corresponding to the case where image rewriting is unnecessary is output from the determination circuit 112 to the circuit 41. Then, the supply of the signals GS and SS from the circuit 41 to the display panel 51 is stopped, whereby image rewriting is not performed in the display panel 51. In this manner, whether or not an image is rewritten is controlled for each of the display panels 51, so that power consumption can be reduced.

The generation of the signal RC in the determination circuit 112 can be performed in parallel with decoding operation in the decoder circuit 111. Therefore, the operation speed of the decoder 30 can be improved. Note that a specific structure example of the determination circuit 112 will be described later.

The signal generation circuits 110[1,1] to 110[n,m] can perform processing independently. Thus, the signals SS can be generated at high speed, so that the operation speed of the decoder 30 can be improved. Note that a device whose structure can be changed as appropriate by a user (PLD: programmable logic device) can be used as the signal generation circuit 110. Examples of the PLD include a simple programmable logic device (SPLD), a complex programmable logic device (CPLD), and a field programmable gate array (FPGA).

The signal generation circuit 130 has a function of generating the signal FS on the basis of the signal input from the identification circuit 100 every frame period and outputting the signal FS to the plurality of circuits 41. The plurality of circuits 41 output the signals GS and SS to the display panels 51 on the basis of the signal FS. Thus, the timing of outputting signals from the plurality of circuits 41 to the display portion 50 is controlled, whereby images displayed on the plurality of display panels 51 can be synchronized. Note that the specific configuration example of the signal generation circuit 130 will be described later.

<Operation Example of Device>

Next, an operation example of the device 10 shown in FIG. 1 is described. Here, as an example, an operation in the case where the signal BS input from the outside is a broadcasting signal which conforms to HEVC and an image is displayed on the display portion 50 on the basis of the broadcasting signal is described.

First, the signal BS is input to the front end portion 20. The signal BS is encoded by HEVC.

Figure 3:
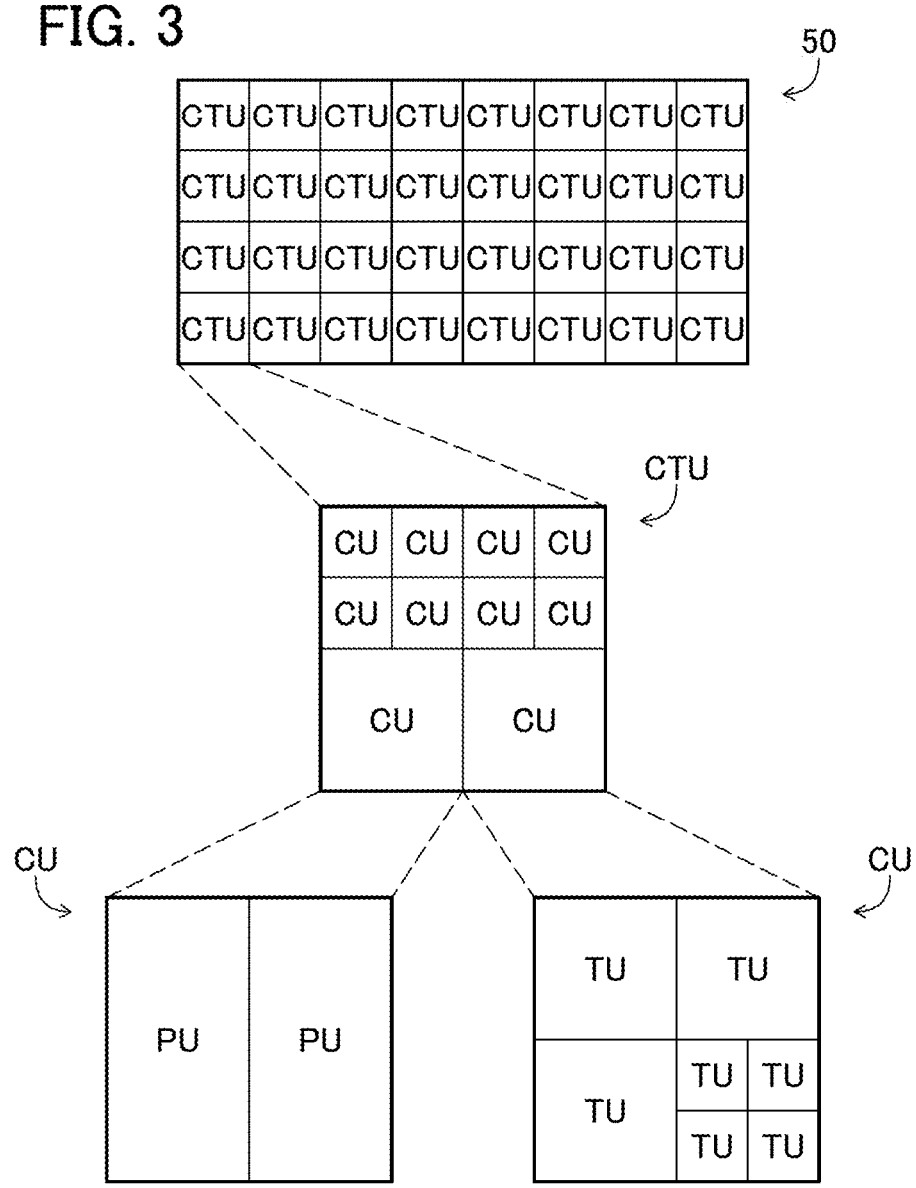
FIG. 3 illustrates CTUs.

Here, the signal processing in HEVC is performed using CTU (coding tree unit) as a basic element. FIG. 3 is a schematic view showing the state where image data displayed on the display portion 50 includes a group of CTUs.

Each of the CTUs includes a plurality of blocks of a coding unit (CU). The CU is a block which is a unit for performing encoding and decoding. As illustrated in FIG. 3, the CTU can include a group of CUs with different block sizes The CU is divided to form prediction units (PUs). The PU is a block which is a unit for performing prediction. Whether or not the division of the PU is performed or the number of divisions of the PU is determined in accordance with the content of the processing.

The CU is divided to form transformation units (TUs). The CU is a block which is a unit for performing orthogonal transform, inverse orthogonal transform, quantization and inverse quantization. Whether or not the division of TU is performed or the number of divisions of TU is determined in accordance with the content of the processing.

Figure 4:
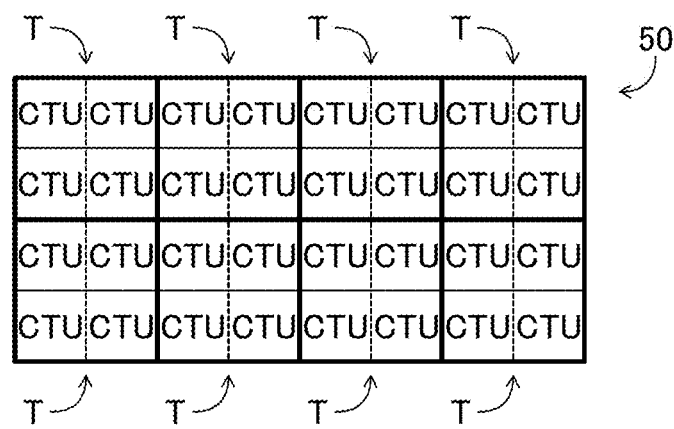
FIGS. 4A to 4C illustrate tiles.

The encoding and decoding can be independently performed in each block referred to as a tile including a plurality of CTUs. FIG. 4A is a schematic view showing the state where image data displayed on the display portion 50 is divided into a plurality of tiles T. The image data includes the plurality of tiles T, and encoding and decoding are performed for each tile T.

As illustrated in FIG. 4B, the display portion 50 includes a group of plurality of display panels 51[1,1] to 51[n,m]. According to one embodiment of the present invention, image data of one frame included in the signal BS is divided into n×m tiles T (tiles T[1,1] to T[n,m]) and processed as illustrated in FIG. 4C. Accordingly, one tile T corresponds to one display panel 51, and encoding and decoding can be independently performed for each display panel 51. For example, as illustrated in FIGS. 4B and 4C, the data of the tile T[2,2] can be used as image data of the display panel 51[2,2].

As described above, when the signal BS which is divided into n×m tiles T and encoded for each tile T is input to the front end portion 20, the front end portion 20 performs demodulation, digital-analog conversion, and error correction on the signal BS and generates bitstream data. The bitstream data is input to the decoder 30 as the signal BD.

Figure 5:
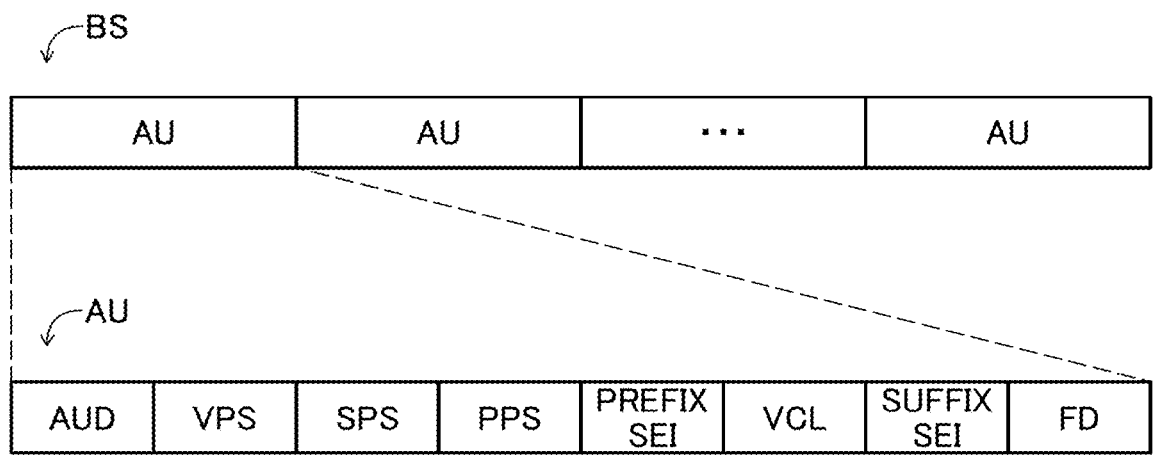
FIG. 5 shows a structure example of a unit.

The structure example of the signal BD input to the decoder 30 is shown in FIG. 5. The signal BD includes a plurality of access units (AUs). The AU includes data of one frame of an image displayed on the display portion 50.

The AU includes a plurality of units. Specifically, the AU includes an access unit delimiter (AUD) including a delimiter of the AU, a video parameter set (VPS) including setting information on images of all the frames displayed on the display portion 50, a sequence parameter set (SPS) including setting information on a plurality of frames included in a specific sequence, a picture parameter set (PPS) including setting information of each frame, a PREFIX_SEI (supplemental enhancement information) including a prefix of additional information, a video coding layer (VCL) including image data of one frame, a SUFFIX_SEI including a suffix of additional information, a filler data (FD) including dummy data for maintaining the length of the AU at a certain value, and the like. The length of the FD is adjusted in accordance with the length of the VCL in each of the AUs, whereby the lengths of the plurality of AUs included in the signal BS can be equal.

The VCL includes image data of one frame divided into n×m tiles T. Furthermore, the PPS includes tile division information (information on which tile each image data included in the VCL belongs to). The SPS includes information on a reference frame of an inter-frame prediction.

The bitstream data including the above units is input to the identification circuit 100 as the signal BD (see FIG. 2).

When the signal BD is input to the identification circuit 100, the identification circuit 100 decodes the tile division information included in the PPS and sorts the image data included in the VCL into the plurality of signal generation circuits 110. The identification circuit 100 determines whether or not information on the reference frame included in the SPS is decoded to perform inter-frame prediction. The identification circuit 100 outputs a signal to the signal generation circuit 130 when the identification circuit 100 recognizes the AUD included in the AU. Since the length of the AU is constant, the signal is output every frame at regular intervals.

Figure 6:
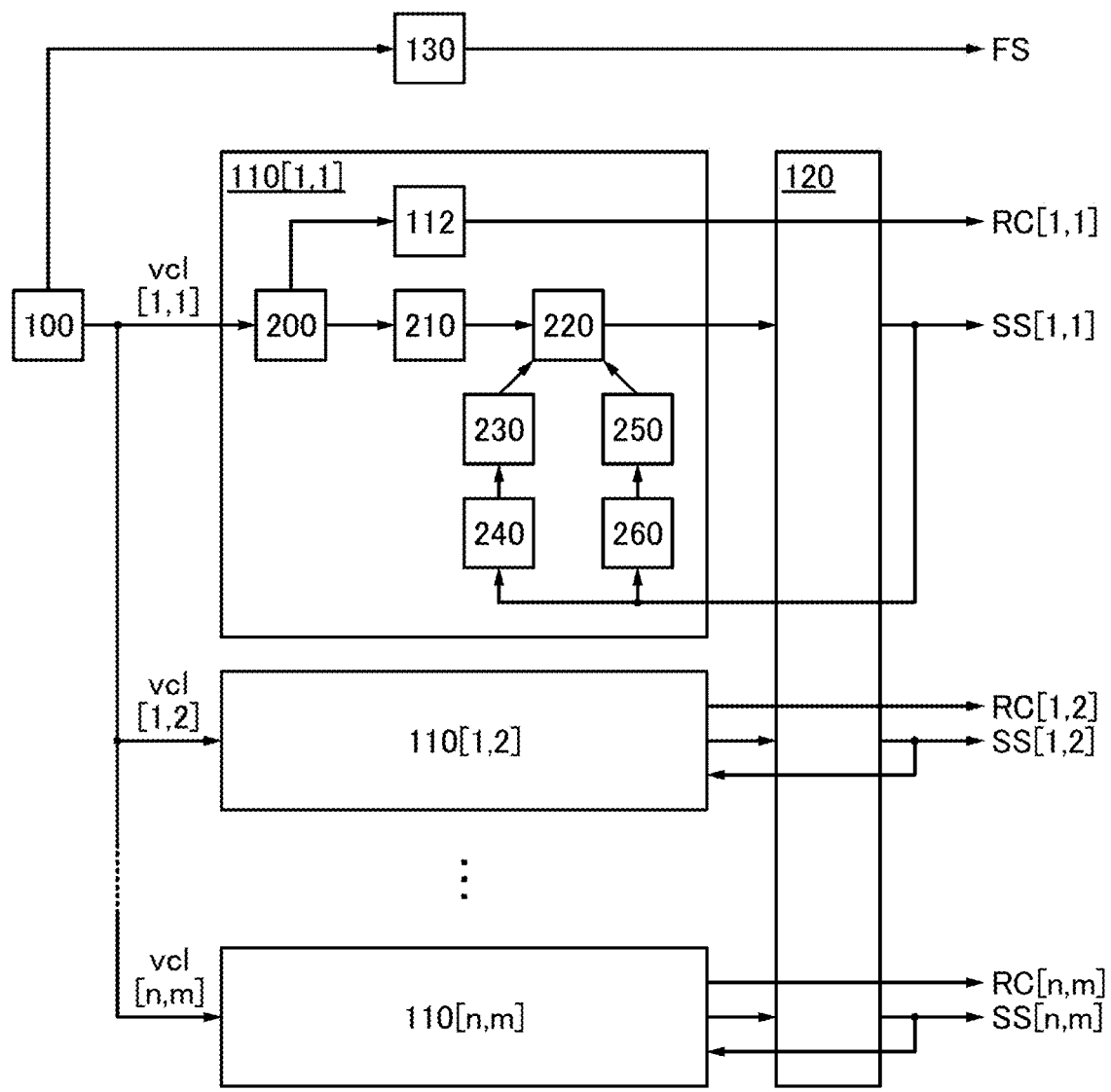
FIG. 6 shows a configuration example of a signal generation circuit.

The signal generation circuit 110 generates signals on the basis of the signal input from the identification circuit 100. More specific configuration example of the signal generation circuit 110 shown in FIG. 2 is shown in FIG. 6. The signal generation circuit 110 in FIG. 6 can decode bitstream data which conforms to HEVC. Although a configuration example of the signal generation circuit 110[1,1] is shown here, a configuration similar to that can be applied to the signal generation circuits 110[1,2] to 110[n,m].

The signal generation circuit 110 illustrated in FIG. 6 includes a decoder circuit 200, a converter circuit 210, an adder circuit 220, an intra-frame prediction circuit 230, a memory circuit 240, an inter-frame prediction circuit 250, a memory circuit 260, and the determination circuit 112.

The image data included in the VCL is divided into n×m signals (denoted by signals vcl[1,1] to vcl[n,m]) corresponding to image data displayed on the display panels 51[1,1] to 51[n,m]. The signals vcl[1,1] to vcl[n,m] are input to the decoder circuits 200 included in respective signal generation circuits 110. Note that image data is divided on the basis of tile division information included in the PPS.

The decoder circuit 200 has a function of performing CABAC decoding on the signal vcl input from the identification circuit 100. The signal decoded by the decoder circuit 200 is output to the converter circuit 210.

The converter circuit 210 has a function of performing inverse quantization and inverse transformation on the signal input from the decoder circuit 200. The signal subjected to the inverse quantization and inverse transformation in the converter circuit 210 is output to the adder circuit 220. The inverse quantization and the inverse transformation may be performed in different circuits.

In performing intra-frame prediction or inter-frame prediction, the adder circuit 220 has a function of generating a signal corresponding to an image displayed on the display panel 51 by adding the signal subjected to the inverse quantization and the inverse transformation in the converter circuit 210 and reference data. The signal generated in the adder circuit 220 is subjected to filter operation in the loop filter 120 and then output to the circuit 41 (not illustrated) as the signal SS.

When intra-frame prediction is performed, the intra-frame prediction circuit 230 reads out the reference data from the memory circuit 240 and outputs the reference data to the adder circuit 220. Then, the signal subjected to the inverse quantization and the inverse transformation and the reference data are added in the adder circuit 220 to be input to the loop filter 120, whereby the signal SS is generated.

When inter-frame prediction is performed, the inter-frame prediction circuit 250 reads out the reference data from the memory circuit 260 and outputs the reference data to the adder circuit 220. Then the signal subjected to the inverse quantization and the inverse transformation and the reference data are added in the adder circuit 220 to be input to the loop filter 120, whereby the signal SS is generated.

The signal SS output from the loop filter 120 is stored in the memory circuit 240 or 260 as new reference data. The reference data can be used when intra-frame prediction or inter-frame prediction is performed in the succeeding frames.

The image data decoded in the decoder circuit 200 is also output to the determination circuit 112. Then, the necessity of rewriting of an image displayed on the display panel 51 is determined in the determination circuit 112.

Figure 7:
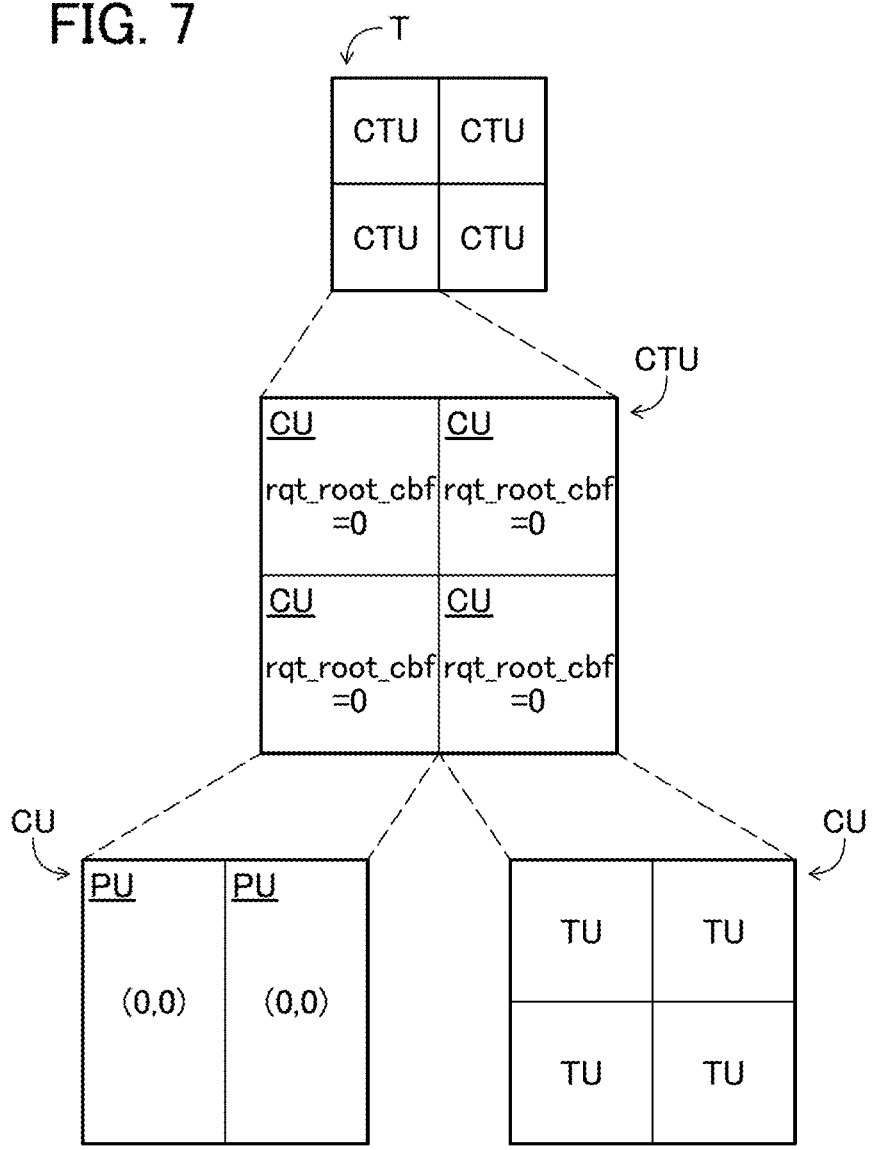
FIG. 7 illustrates division of a CU.

Specifically, first, image data included in one tile T is decoded in the decoder circuit 200. Image data included in one tile T corresponds to image data of one frame of one display panel 51. Here, as illustrated in FIG. 7, the tile T includes a plurality of CTUs, and the CTU includes a plurality of CUs. The CU can include a PU or a TU. The necessity of image rewriting is determined using the previous frame as a reference by performing a first determination for determining the values of motion vectors of all the PUs included in the tile T and a second determination for determining whether or not the TU is divided in all the CUs included in the tile T.

The first determination is performed by determining whether or not the motion vector of the PU is (0, 0). In the case where the motion vectors of all the PUs included in the tile T are (0, 0), it means that there is no component of parallel shift in the present frame. The second determination is performed by reading information (rqt_root_cbf) on the division of the TU included in the CU and determining whether or not the CU is divided into TUs. In the case where rqt_root_cbf=0, it means that there is no TU tree structure in the CU and no prediction error of the inter-frame prediction. Thus, in the case where the motion vectors of all the PUs included in the tile T are (0, 0) and rqt_root_cbf=0 in all the CUs included in the tile T, it means that there is no change in an image displayed on the display panel 51 between the previous frame and the present frame. Here, the determination circuit 112 determines that rewriting of an image on the display panel 51 is unnecessary and outputs the signal RC indicating that image rewriting is unnecessary is output to the circuit 41.

On the other hand, in the case where the tile T includes at least one PU with a motion vector other than (0, 0) or in the case where the tile T incudes at least one CU with rqt_root_cbf ≠ 0, it means that there is a change in the image displayed on the display panel 51 between the present frame and the previous frame. Here, the determination circuit 112 determines that rewriting of the image on the display panel 51 is necessary, and the signal RC indicating that image rewriting is necessary is output to the circuit 41.

Here, it is assumed that image rewriting is unnecessary in the case where all the motion vectors of PUs included in the tile T are (0, 0) and rqt_root_cbf=0 in all the CUs included in the tile T; however, a reference for determining the necessity of the image rewriting can be set as appropriate. For example, image rewriting can be unnecessary in the case where the motion vectors have a predetermined value or less or in the case where the number of the PUs with rqt_root_cbf ≠ 0 is a predetermined number or less.

Then, the circuit 41 (illustrated in FIG. 1) controls outputs of the signals GS and SS to the display panel 51 on the basis of the signal RC input from the decoder 30. In the case where image rewriting is necessary, the signals GS and SS are output to the display panel 51. In the case where image rewriting is unnecessary, the outputs of the signals GS and SS to the display panel 51 are stopped. Thus, the number of rewriting times of an image is reduced, whereby power consumption of the driver circuit 40 and the display portion 50 can be reduced.

The signal generation circuit 130 generates the synchronization signal (signal FS) on the basis of the signal BD and outputs the signal FS to the circuits 41[1,1] to 41[n,m]. The timing at which the signals are output from the circuits 41[1,1] to 41[n,m] is controlled in accordance with the signal FS.

<Configuration Example of Determination Circuit>

Figure 8:
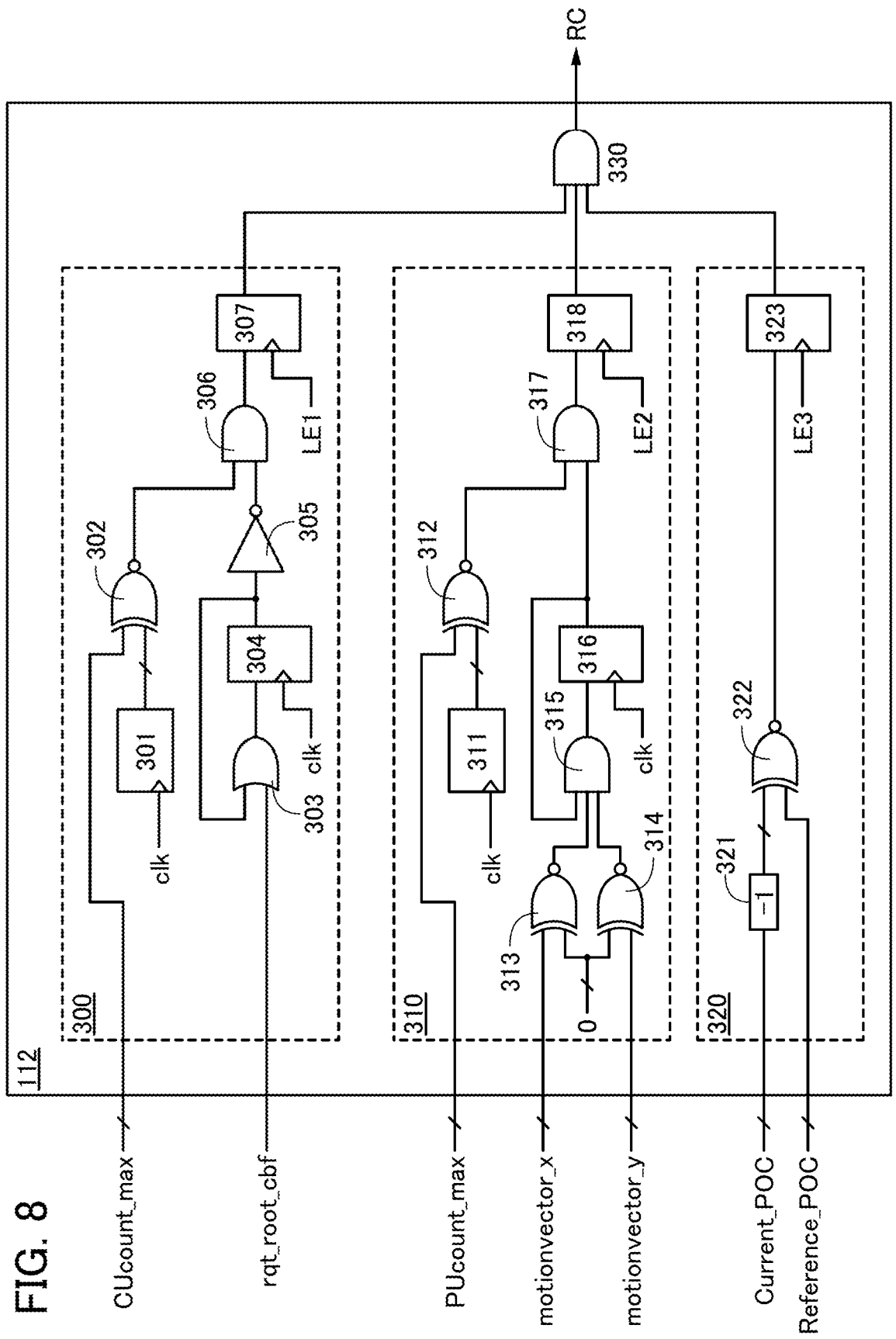
FIG. 8 illustrates a configuration example of a determination circuit.

FIG. 8 shows a specific configuration example of the determination circuit 112. The determination circuit 112 includes a circuit 300, a circuit 310, a circuit 320, and an AND 330.

In FIG. 8, a signal CUcount_max is a signal indicating the maximum number of the CU included in the tile T. A signal rqt_root_cbf is a signal indicating whether or not a TU tree structure exists in the CU. When the TU tree structure exists, the value of the signal is "1".

When the TU tree structure does not exist, the value of the signal is "0". A signal PUcount_max is a signal indicating the maximum number of the PU included in the tile T. A signal motionvector_x is a signal indicating an x component of a motion vector of the PU. A signal motionvector_y is a signal indicating a y component of a motion vector of the PU. A signal Current_POC is a signal indicating the number of the present frame. A signal Reference_POC is a signal indicating the number of the frame which is a reference of inter-frame prediction. A signal rqt_root_cbf is a signal input in accordance with HEVC.

The circuit 300 has a function of determining whether or not there is a CU with a TU tree structure in the tile T. The circuit 300 includes a counter 301, an XNOR 302, an OR 303, a flip flop(FF) 304, an inverter 305, an AND 306, and an FF 307.

The operation example of the circuit 300 is described. The counter 301 counts up in accordance with the clock signal clk, and the signal corresponding to the CU number is output from the counter 301. The signal rqt_root_cbf of a CU corresponding to the CU number output from the counter 301 is sequentially input to the OR 303. The output of the OR 303 is stored in the FF 304. The output of the FF 304 is input to the OR 303.

Here, in the initial state, the data "0" is stored in the FF 304. Therefore, in the case where the signal rqt_root_cbf input for the first time is "0", the output of the OR 303 is "0", so that the data "0" is stored in the FF 304. Then, as long as the signal rqt_root_cbf input to the OR 303 is "0", the output of the OR 303 is "0", so that the FF 304 is kept in a state where the data "0" is stored therein. On the other hand, in the case where the signal rqt_root_cbf is "1", the output of the OR 303 is "1", so that the data "1" is stored in the FF 304. Then, the data "1" stored in the FF 304 is input to the OR 303. In this manner, once the signal rqt_root_cbf becomes "1", the FF 304 is kept in a state where the data "1" is stored therein regardless of the value of the signal rqt_root_cbf input thereafter. Accordingly, in the case where all the signals rqt_root_cbf input to the circuit 300 are "0", the data "0" is stored in the FF 304, and in the case where at least one of the signals rqt_root_cbf is "1", the data "1" is stored in the FF 304.

When the signals rqt_root_cbf of all the CUs included in the tile T are input to the circuit 300, the output of the counter 301 becomes equal to the signal CUcount_max. Accordingly, the output of the XNOR 302 becomes "1" and is input to the AND 306. In the case where the signals rqt_root_cbf of all the CUs included in the tile T are "0", that is, in the case where the data stored in the FF 304 is "0", the output of the AND 306 is "1". On the other hand, in the case where the tile T includes at least one of CUs whose signal rqt_root_cbf is "1", that is, in the case where the data stored in the FF 304 is "1", the output of the AND 306 becomes "0". The output of the AND 306 is stored in the FF 304 when a signal LE1 becomes active. Accordingly, whether there is a CU with a TU tree structure in the tile T can be determined on the basis of the output of the FF 307.

The circuit 310 has a function of determining whether there is a PU whose motion vector is not (0, 0) in the tile T. The circuit 310 includes a counter 311, an XNOR 312, an XNOR 313, an XNOR 314, an AND 315, an FF 316, an AND 317, and an FF 318.

The operation example of the circuit 310 is described. The counter 311 counts up in accordance with the clock signal clk, and the signal corresponding to the PU number is output from the counter 311. The signal motionvector_x of a PU corresponding to the PU number output from the counter 311 is sequentially input to the XNOR 313, and the signal motionvector_y is sequentially input to the XNOR 314. The signals "0" are input to the XNOR 313 and the XNOR 314. Accordingly, in the case where the signal motionvector_x is "0", the output of the XNOR 313 is "1". In the case where the signal motionvector_x is not "0", the output of the XNOR 313 is "0". In the case where the signal motionvectory is "0", the output of the XNOR 314 is "1". In the case where the signal motionvector_y is not "0", the output of the XNOR 314 is "0". The outputs of the XNORs 313 and 314 are output to the AND 315, and the output of the AND 315 is stored in the FF 316. The output of the FF 316 is input to the AND 315.

Here, in the initial state, the data "1" is stored in the FF 316. Therefore, in the case where the signal motionvector_x and the signal motionvector_y input for the first time are "0", the output of the AND 315 is "1", so that the data "1" is stored in the FF 316. Then, as long as the signal motionvector_x input to the XNOR 313 and the signal motionvector_y input to the XNOR 314 are "0", the output of the AND 315 is "1", so that the FF 316 is kept in a state where the data "1" is stored therein. On the other hand, in the case where at least one of the signal motionvector_x and the signal motionvector_y is not "0", at least one of the outputs of the XNOR 313 and the XNOR 314 is "0", so that the output of the AND 315 is "0" and the data "0" is stored in the FF 316. Then, the data "0" stored in the FF 316 is input to the AND 315. In this manner, once the signal motionvector_x or motionvector_y has a value other than "0", the FF 316 is kept in a state where the data "0" is stored therein regardless of the values of the signals motionvector_x and motionvector_y input thereafter. Accordingly, in the case where all the signals motionvector_x and motionvector_y input to the circuit 310 are "0", the data "1" is stored in the FF 316, and in the case where at least one of the signals is not "0", the data "0" is stored in the FF 316.

When the signals motionvector_x and motionvector_y of all the PUs included in the tile T are input to the circuit 310, the output of the counter 311 becomes equal to the signal PUcount_max. Accordingly, the output of the XNOR 312 becomes "1" and is input to the AND 317. In the case where the motion vectors of all the PUs included in the tile T are (0, 0), that is, in the case where the data stored in the FF 316 is "1", the output of the AND 317 is "1". On the other hand, in the case where the tile T includes at least one of PUs whose signal motion vector is not (0, 0), that is, in the case where the data stored in the FF 316 is "0", the output of the AND 317 becomes "0". The output of the AND 317 is stored in the FF 318 when a signal LE2 becomes active. Accordingly, whether there is a PU with a motion vector other than (0, 0) in the tile T can be determined on the basis of the output of the FF 318.

The circuit 320 has a function of determining whether the frame which is a reference of the inter-frame prediction is the previous frame of the present frame. The circuit 320 includes a subtractor 321, an XNOR 322, and an FF 323.

The operation example of the circuit 320 is described. First, when the signal Current_POC is input, "1" is subtracted from the value of the signal Current_POC by the subtractor 321 and the number of the previous frame is input to the XNOR 322. The signal Reference_POC is input to the XNOR 322. Here, in the case where the number of the previous frame and that of the frame which is a reference of the inter-frame prediction match, the output of the XNOR 322 is "1", and in other cases, the output of the XNOR 322 is "0". When the signal LE3 becomes active, the output of the XNOR 322 is stored in the FF 304. Accordingly, whether the frame which is a reference of the inter-frame prediction is the previous frame can be determined on the basis of the output of the FF 323.

The outputs of the FF 307, the FF 318, and the FF 323 are input to the AND 330. In the case where it is determined that there is no CU with a TU tree structure in the tile T in the circuit 300, the motion vectors of all the PUs in the tile T are (0, 0) in the circuit 310, and the frame which is a reference of the inter-frame prediction is the previous frame, the output of the AND 330 is "1" and it is output to the circuit 41 as the signal RC. The fact that the signal RC is "1" means that there is no change in an image displayed on the display panel 51 (see FIG. 1 or the like) between the present frame and the previous frame and image rewriting is unnecessary. Thus, with use of the determination circuit 112, the necessity of image rewriting can be determined. Then, the operation of the circuit 41 is controlled in accordance with the signal RC output from the determination circuit 112.

<Operation Example of Output Circuit>

Figure 9:
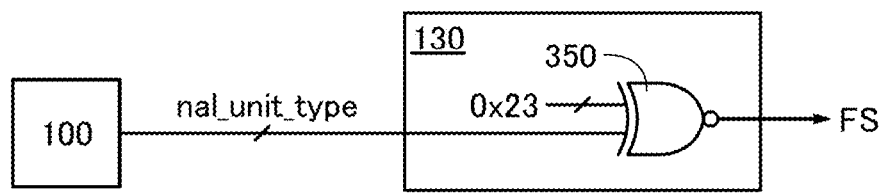
FIG. 9 illustrates a configuration example of a signal generation circuit.

The specific configuration example of the signal generation circuit 130 is shown in FIG. 9. The signal generation circuit 130 includes an XNOR 350. A signal "0x23" and a signal nal_unit_type are input to the XNOR 350. The signal nal_unit_type is a signal for indicating an identifier of a unit and is input in accordance with HEVC. The identifier corresponding to the AUD in FIG. 5 is "0x23".

When the identification circuit 100 receives bitstream data, the signal nal_unit_type is sequentially input from the identification circuit 100 to the XNOR 350. Here, when the identification circuit 100 identifies the AUD, the value of the signal nal_unit_type is "0x23" and the output of the XNOR 350 is "1". Then, the output signal is output to the plurality of circuits 41 (see FIG. 1) as the signal FS.

As described above, since the length of the AU included in the bitstream data is constant (see FIG. 5), the value of the signal nal_unit_type is "0x23" at regular intervals. Thus, the signal FS becomes "1" every frame period at regular intervals. The plurality of the circuits 41 output image data of the previous frames to the display panels 51 when the signal FS is "1". Accordingly, the timing of outputs of image data from the plurality of circuits 41 to the display panels 51 can be synchronized.

As described above, in one embodiment of the present invention, the decoder 30 has a function of determining the necessity of rewriting images displayed on the display panels 51, whereby whether or not an image is rewritten can be controlled in each of the display panels 51. Thus, the frequency of image rewriting and power consumption can be reduced. In one embodiment of the present invention, the above operation can be performed on the basis of a signal which conforms to HEVC. Thus, a versatile device can be provided.

This embodiment can be combined with any of the other embodiments as appropriate.

(Embodiment 2)

In this embodiment, a specific configuration example and an operation example of a display device which can be used as the display panel 51 are described.

<Configuration Example of Display Device>

As the display panel 51 included in the display portion 50 shown in FIG. 1, a display device such as a liquid crystal display device or a light-emitting display device can be used. An example of a display device which can be used as the display panel 51 is described below.

Figure 10A:
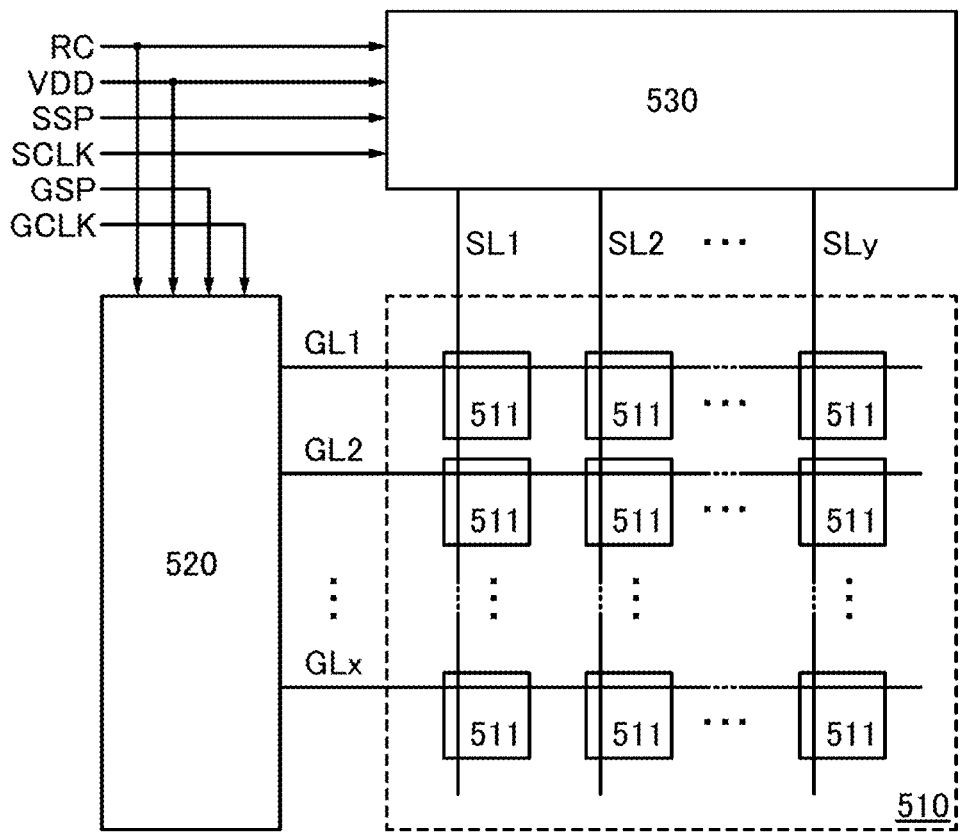
FIGS. 10A to 10C illustrate configuration examples of display devices.

FIG. 10A shows a configuration example of a display device 500. The display device 500 includes a pixel portion 510, a driver circuit 520, and a driver circuit 530.

The pixel portion 510 includes pixels 511 of x rows and y columns (x and y are natural numbers). The pixel 511 has a function of displaying a predetermined gray level on the basis of a signal supplied from a wiring SL.

In the case of displaying an 8K video, at least 7680×4320 pixels 511 are provided in the pixel portion 510. In the case of displaying a 4K video, at least 3840×2160 pixels 511 are provided in the pixel portion 510. In the case of displaying a 2K video, at least 1920×1080 pixels 511 are provided in the pixel portion 510.

The driver circuit 520 has a function of selecting pixels 511 in a certain row by supplying a predetermined potential (corresponding to the signal GS shown in FIG. 1) to a wiring GL. The driver circuit 530 has a function of writing image data to the pixels 511 which are selected by the driver circuit 520, by supplying potentials corresponding to image data (corresponding to the signals SS shown in FIG. 1) to wirings SL.

Note that the driver circuits 520 and 530 correspond to the circuits 41 in FIG. 1. That is, the structure of the display device 500 corresponds to the structure where the circuit 41 is provided in the display panel 51. Note that the driver circuits 520 and 530 may be provided outside the display panel 51.

The signal RC, a power supply potential VDD, a start pulse GSP, and a clock signal GCLK are input to the driver circuit 520. The signal RC, the power supply potential VDD, a start pulse SSP, and a clock signal SCLK are input to the driver circuit 530. Note that the signal RC is input from the decoder 30 (see FIG. 1).

When the signal RC corresponding to the case of performing image rewriting is input to the driver circuits 520 and 530, the driver circuits 520 and 530 are in an operation state. Here, the power supply potential VDD, the start pulse SSP, and the clock signal GCLK are supplied to the driver circuit 520, and the signals GS are supplied from the driver circuit 520 to the pixel portion 510 through the wirings GL. Moreover, the power supply potential VDD, the start pulse SSP, and the clock signal SCLK are supplied to the driver circuit 530, and the signals SS are supplied from the driver circuit 530 to the pixel portion 510 through the wirings SL.

On the other hand, when the signal RC corresponding to the case of not rewriting an image on the pixel portion 510 is input to the driver circuits 520 and 530, the driver circuits 520 and 530 are in a resting state. Here, the supply of the power supply potential VDD, the start pulse GSP, and the clock signal GCLK to the driver circuit 520 is stopped, so that an operation of the driver circuit 520 is stopped. Accordingly, the signals GS are not supplied to the pixel portion 510. Moreover, the supply of the power supply potential VDD, the start pulse SSP, and the clock signal SCLK to the driver circuit 530 is stopped, so that an operation of the driver circuit 530 is stopped. Accordingly, the signals SS are not supplied to the pixel portion 510. Thus, the driver circuits 520 and 530 can be in a resting state when image rewriting is unnecessary, whereby power consumption is reduced.

Note that the display device 500 may include a plurality of the driver circuits 520. For example, a half of the pixels 511 included in the pixel portion 510 may be controlled by the first driver circuit 520 and the other half may be controlled by the second driver circuit 520.

Figure 10B:
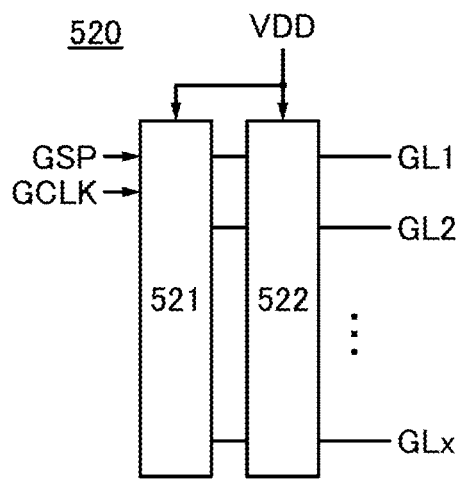

FIG. 10B illustrates a configuration example of the driver circuit 520. The driver circuit 520 includes a shift register 521 and a buffer 522. When the start pulse GSP and the clock signal GCLK are supplied to the shift register 521 while the power supply potential VDD is supplied to the shift register 521 and the buffer 522, the signals GS are supplied from the driver circuit 520 to the wirings GL.

Figure 10C:
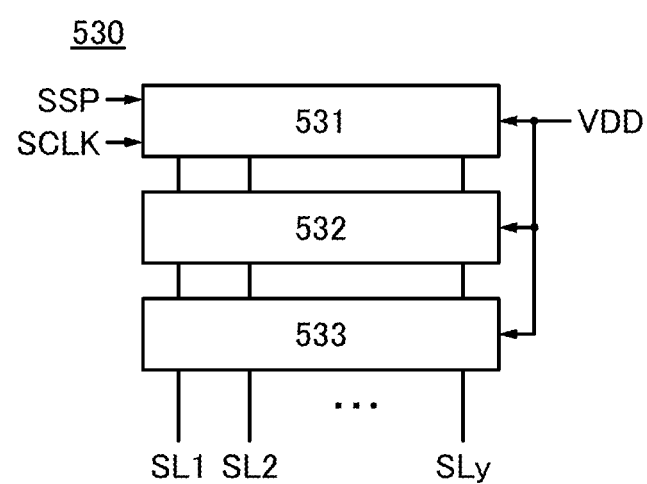

FIG. 10C illustrates a configuration example of the driver circuit 530. The driver circuit 530 includes a shift register 531, a latch circuit 532, and a buffer 533. When the start pulse SSP and the clock signal SCLK are supplied to the shift register 531 while the power supply potential VDD is supplied to the shift register 531, the latch circuit 532, and the buffer 533, the signals SS are supplied from the driver circuit 530 to wirings SL1 to SLy.

<Operation Example of Display Device>

Next, an operation example of the display device 500 is described. Here, an operation example of the case where the display device 500 is used for the circuit 41 and the display panel 51 illustrated in FIG. 1 is shown.

Figure 11:
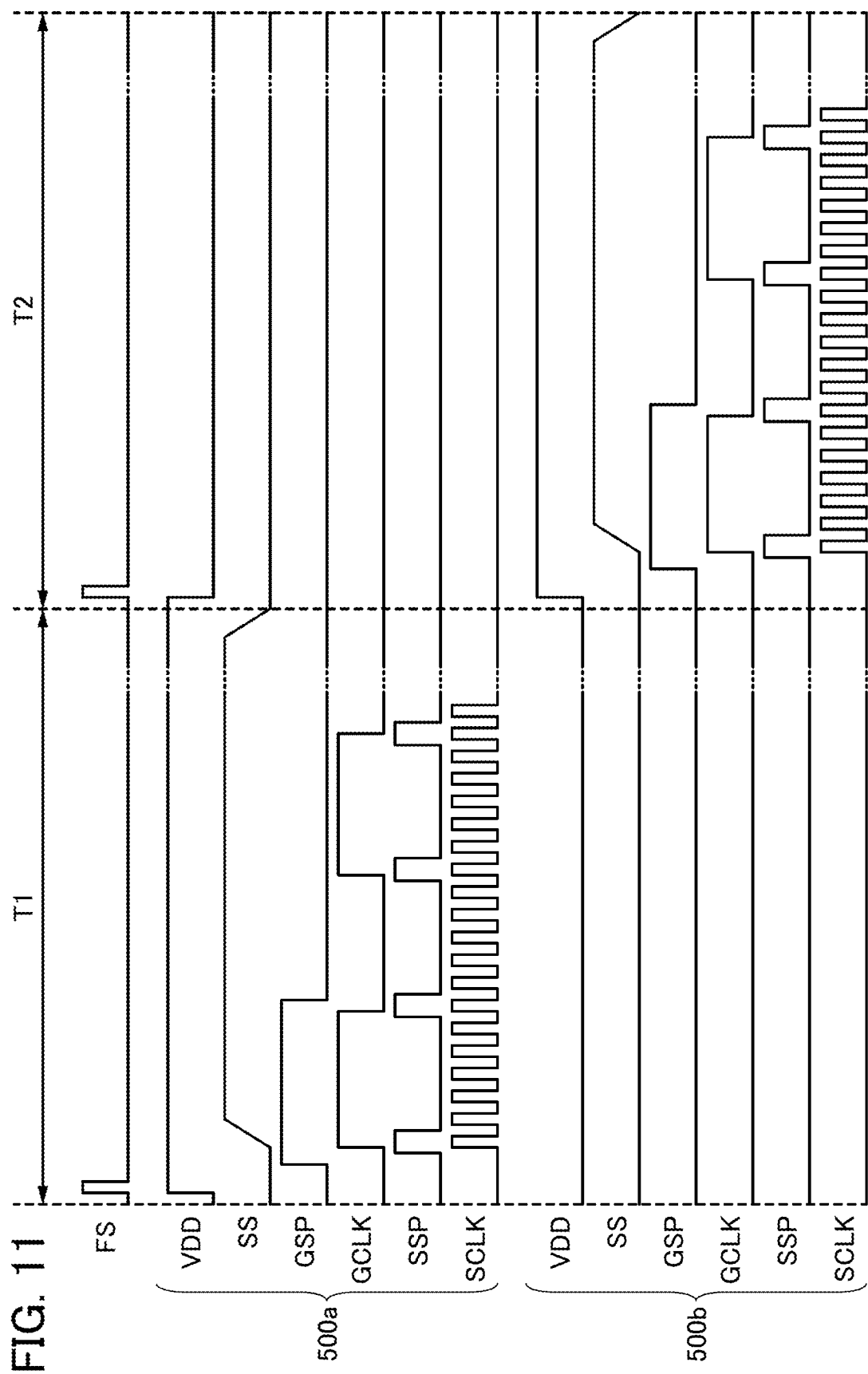
FIG. 11 is a timing chart.

FIG. 11 is a timing chart showing an operation of the display device 500. Here, as an example, operations of two display devices 500 (denoted by display devices 500a and 500b) included in the display portion 50 shown in FIG. 1 are described. A period T1 is a frame period in which image rewriting is performed in the display device 500a and image rewriting is not performed in the display device 500b. A period T2 is a frame period in which image rewriting is not performed in the display device 500a and image rewriting is performed in the display device 500b.

First, in the period T1, when the signal FS is set to high level, in the display device 500a, the power supply potential VDD is supplied to the driver circuits 520 and 530. The start pulse GSP and the clock signal GCLK are supplied to the driver circuit 520, so that pixels 511 in a certain row are selected by the driver circuit 520. The start pulse SSP and the clock signal SCLK are supplied to the driver circuit 530, so that the signals SS are supplied to the pixels 511 selected by the driver circuit 520.

On the other hand, in the display device 500b, the supply of the power supply potential VDD to the driver circuits 520 and 530 is stopped. Furthermore, the supply of the start pulse GSP and the clock signal GCLK to the driver circuit 520 is stopped and the supply of the start pulse SSP and the clock signal SCLK to the driver circuit 530 is stopped. Accordingly, the driver circuits 520 and 530 are in a resting state. Here, the pixel 511 keeps display of an image of the previous frame.

Next, when the signal FS is set to high level in the period T2, in the display device 500a, the supply of the power supply potential VDD to the driver circuits 520 and 530 is stopped. Furthermore, the supply of the start pulse GSP and the clock signal GCLK to the driver circuit 520 is stopped and the supply of the start pulse SSP and the clock signal SCLK to the driver circuit 530 is stopped. Accordingly, the driver circuits 520 and 530 are in a resting state. Here, the pixel 511 keeps display of an image of the previous frame.

On the other hand, in the display device 500b, the power supply potential VDD is supplied to the driver circuits 520 and 530. The start pulse GSP and the clock signal GCLK are supplied to the driver circuit 520, so that pixels 511 in a certain row are selected by the driver circuit 520. The start pulse SSP and the clock signal SCLK are supplied to the driver circuit 530, so that the signals SS are supplied to the pixels 511 selected by the driver circuit 520.

In this manner, in the case where there is a display device which does not perform image rewriting in the display portion 50 illustrated in FIG. 1, the circuit 41 for controlling the display device can be in a resting state. Thus, the power consumption of the driver circuit 40 can be reduced.

The display device 500 can include various display elements. For example, an element including display media whose contrast, luminance, reflectivity, transmittance, or the like is changed by electrical or magnetic effect can be used as the display element. Examples of the display element include an electroluminescent (EL) element (e.g., an organic EL element, an inorganic EL element, or an EL element including organic and inorganic materials), an LED (e.g., a white LED, a red LED, a green LED, and a blue LED), a transistor which emits light when current flows, an electron emitter, a liquid crystal element, electronic ink, an electrophoretic element, a grating light valve (GLV), a digital micromirror device (DMD), a digital micro shutter (DMS), MIRASOL (registered trademark), an interferometric modulator (IMOD) element, a microelectromechanical systems (MEMS) display element, an electrowetting element, a piezoelectric ceramic display, and a display element including a carbon nanotube. Alternatively, quantum dots may be used as the display element.

Examples of display devices having EL elements include an EL display. Display devices having electron emitters include a field emission display (FED), an SED-type flat panel display (SED: surface-conduction electron-emitter display), and the like. Examples of display devices including quantum dots include a quantum dot display. Examples of display devices including liquid crystal elements are a liquid crystal display (e.g., a transmissive liquid crystal display, a transflective liquid crystal display, a reflective liquid crystal display, a direct-view liquid crystal display, and a projection liquid crystal display). Examples of a display device including electronic ink, electronic liquid powder (registered trademark), or electrophoretic elements include electronic paper. The display device may be a plasma display panel (PDP) or a retinal projector.

In the case of a transflective liquid crystal display or a reflective liquid crystal display, some of or all of pixel electrodes function as reflective electrodes. For example, some or all of pixel electrodes are formed to contain aluminum, silver, or the like. In such a case, a memory circuit such as an SRAM can be provided under the reflective electrodes. In that case, power consumption can be reduced.

Note that in the case of using an LED, graphene or graphite may be provided under an electrode or a nitride semiconductor of the LED. Graphene or graphite may be a multilayer film in which a plurality of layers are stacked. As described above, provision of graphene or graphite enables easy formation of a nitride semiconductor film thereover, such as an n-type GaN semiconductor layer including crystals. Furthermore, a p-type GaN semiconductor layer including crystals or the like can be provided thereover, and thus the LED can be formed. Note that an AlN layer may be provided between the n-type GaN semiconductor layer including crystals and graphene or graphite. The GaN semiconductor layers included in the LED may be formed by MOCVD. Note that when the graphene is provided, the GaN semiconductor layers included in the LED can also be formed by a sputtering method.

Configuration examples of a pixel in which a liquid crystal element is provided as a display element and a pixel in which an EL element is provided as a display element are described.

<Configuration Example 1 of Pixel>

Figure 12A:
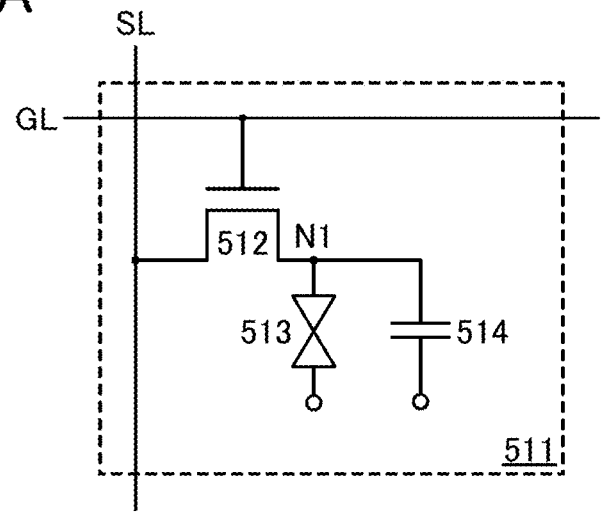
FIGS. 12A to 12C each illustrate a configuration example of a pixel.

FIG. 12A illustrates a configuration example of the pixel 511. The pixel 511 includes a transistor 512, a liquid crystal element 513, and a capacitor 514.

A gate of the transistor 512 is connected to the wiring GL and one of a source and a drain of the transistor 512 is connected to one of electrodes of the liquid crystal element 513 and one of electrodes of the capacitor 514. The other of the source and the drain of the transistor 512 is connected to the wiring SL. The other electrode of the liquid crystal element 513 and the other electrode of the capacitor 514 are each connected to a terminal to which a predetermined potential is supplied. A node which is connected to one of the source and the drain of the transistor 512, one of the electrodes of the liquid crystal element 513, and one of the electrodes of the capacitor 514 is a node N1.

The potential of the other of the electrodes of the liquid crystal element 513 may be a common potential among the plurality of pixels 511 or may be the same potential as the other electrode of the capacitor 514. The potential of the other electrode of the liquid crystal element 513 may differ between the pixels 511. The capacitor 514 has a function as a storage capacitor for holding a potential of the node N1.

Although the transistor 512 is an n-channel transistor here, the transistor 512 may be a p-channel transistor. The capacitor 514 can be omitted. Note that the pixel 511 may further include an element such as a transistor, a diode, a resistor, a capacitor, or an inductor, as needed.

Note that a source of a transistor in this specification and the like means a source region that is part of a semiconductor layer functioning as an active layer, a source electrode connected to the semiconductor layer, or the like. Similarly, a "drain" of a transistor means a drain region that is part of the semiconductor layer, a drain electrode connected to the semiconductor layer, or the like. A gate of a transistor means a gate electrode or the like.

The terms "source" and "drain" of a transistor interchange with each other depending on the conductivity type of the transistor or levels of potentials applied to the terminals. In general, in an n-channel transistor, a terminal to which a lower potential is applied is called a source, and a terminal to which a higher potential is applied is called a drain. Furthermore, in a p-channel transistor, a terminal to which a lower potential is applied is called a drain, and a terminal to which a higher potential is applied is called a source. In this specification, although connection relation of the transistor is described assuming that the source and the drain are fixed in some cases for convenience, actually, the names of the source and the drain interchange with each other depending on the relation of the potentials.

Furthermore, the transistor 512 controls supply of the potential of the wiring SL to the node N1. Specifically, the potential of the wiring GL is controlled to turn on the transistor 512, whereby the potential of the wiring SL is supplied to the node N1 and is written to the pixel 511. Then, the potential of the wiring GL is controlled to turn off the transistor 512, whereby the potential of the node N1 is held.

The liquid crystal element 513 includes a pair of electrodes and a liquid crystal layer containing a liquid crystal material to which the a voltage between the pair of electrodes is applied. The alignment of the liquid crystal molecules included in the liquid crystal element 513 changes in accordance with the value of the voltage applied between the pair of electrodes, and thus the transmittance of the liquid crystal layer is changed. Therefore, when the potential supplied from the wiring SL to the node N1 is controlled, the gray level of the pixel 511 can be controlled.

Figure 12B:
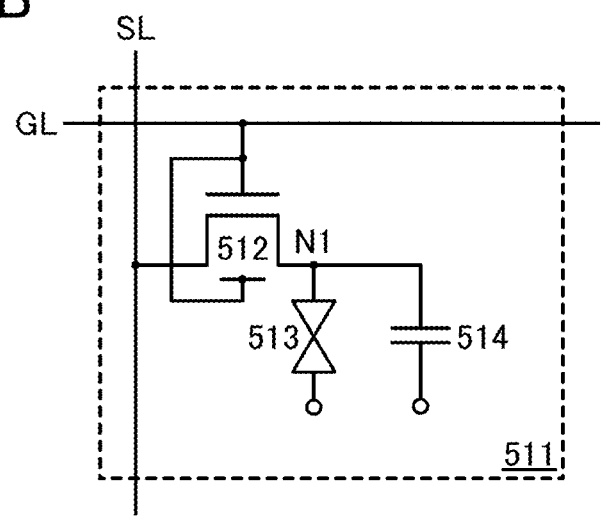
Figure 12C:
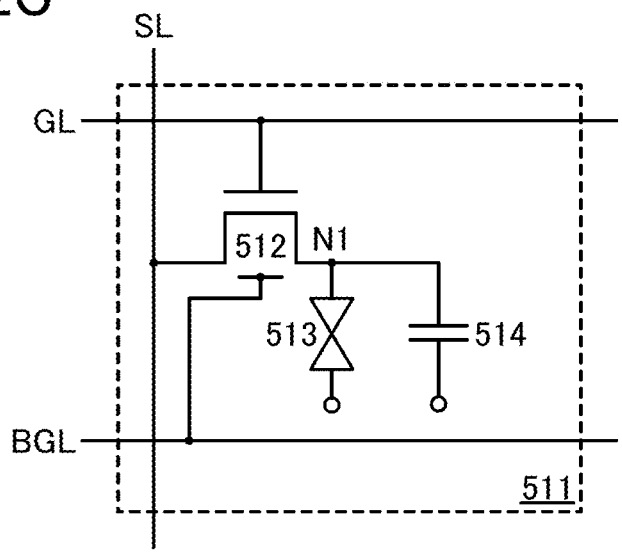

The transistor 512 may include a pair of gates. FIGS. 12B and 12C illustrate structures of the transistor 512 including a pair of gates. In the case where the transistor includes a pair of gates, one of the gates can be referred to as a front gate or simply as a gate, and the other of the gates can be referred to as a back gate.

The transistor 512 illustrated in FIG. 12B includes a back gate, and the back gate is connected to a front gate. In this case, the potential of the front gate is equal to the potential of the back gate.

The back gate of the transistor 512 illustrated in FIG. 12C is connected to a wiring BGL. The wiring BGL has a function of supplying a predetermined potential to the back gate. The threshold voltage of the transistor 512 can be controlled by controlling the potential of the wiring BGL. Note that the wiring BGL can be connected to the driver circuit 520 (see FIG. 10A), and the potential of the wiring BGL can be controlled by the driver circuit 520. The wiring BGL is shared by the pixels 511 in one row.

Figure 39A:
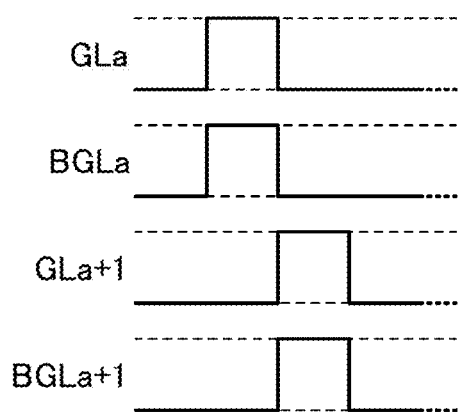
FIGS. 39A and 39B illustrate operation examples of a transistor.
Figure 39B:

FIGS. 39A and 39B are timing charts showing operation examples of the transistor 512 provided with a back gate. FIG. 39A shows an operation at the time when image data is written to the pixel 511. FIG. 39B shows an operation at the time when image data is stored in the pixel 511. A wiring GLa is a wiring GL in the a-th row (a is an integer greater than or equal to 1 and less than or equal to x), and a wiring GLa+1 is a wiring GL in the a+1-th row. A wiring BGLa is a wiring BGL in the a-th row, and a wiring BGLa+1 is a wiring BGL in the a+1-th row.

When the image data is written to the pixel 511, the wirings GL are scanned, and the potentials of wirings GLa and GLa+1 are set to high level in this order as illustrated in FIG. 39A. The potentials of the wirings BGLa and BGLa+1 are set to high level in this order in synchronization with the wirings GLa and GLa+1. Here, when the potential of the wiring GL is set to high level to turn on the transistor 512, the potential of the wiring BGL in the same row is also set to high level. Accordingly, when image data is written, the threshold voltage of the transistor 512 can be shifted to the negative side and the amount of current of the transistor 512 in an on state can be increased.

On the other hand, in a period in which image data stored in the pixel 511 is kept, the potential of the wiring GL is set to low level to turn off the transistor 512 as illustrated in FIG. 39B. Here, the potential of the wiring BGL in the same row is also set to low level. Accordingly, in a period for storing image data, the threshold voltage of the transistor 512 is shifted to the positive side, so that the off-state current of the transistor 512 can be reduced.

The operations in FIGS. 39A and 39B can be performed in the pixel 511 illustrated in FIG. 12B. Note that, in the pixel 511 illustrated in FIG. 12B, an opening for connecting the front gate and the back gate of the transistor 512 needs to be provided in the pixel 511, so that the area of the pixel 511 is increased in some cases. In contrast, as illustrated in FIG. 12C, in the case where potentials of the pair of gates of the transistor 512 are controlled by different wirings, the opening does not need to be provided in the pixel 511. Thus, an increase in the area of the pixel 511 can be suppressed.

Next, an operation example of the pixel 511 illustrated in FIGS. 12A to 12C is described.

First, in a first frame period, a predetermined potential is supplied from the driver circuit 520 to the wiring GL1, whereby the pixels 511 in the first row are selected. The transistors 512 in the selected pixels 511 are turned on. The potential corresponding to a gray level to be displayed on the pixel 511 is supplied from the driver circuit 530 to each of the wirings SL1 to SLy. Then, the potential of each of the wirings SL1 to SLy is supplied to the node N1 through the transistor 512. Thus, the transmittance of the liquid crystal element 513 is controlled, whereby the gray level of each of the pixels 511 is controlled.

Then, a predetermined potential is supplied from the driver circuit 520 to the wiring GL1, whereby the pixels 511 in the first row are deselected. Accordingly, in the pixels 511 in the first row, the transistors 512 are turned off and thus the potentials of the nodes N1 are stored. Thus, rewriting of the pixels 511 in the first row is completed.

In a similar manner, the wirings GL2 to GLx are sequentially selected, and the operations similar to the above are repeated. Thus, an image of the first frame can be displayed on the pixel portion 510.

The selection of the wirings GL may be performed by either progressive scan or interlaced scan. The supply of the signals SS from the driver circuit 530 to the wirings SL1 to SLy may be performed by dot sequential driving in which the signals SS are sequentially supplied to the wirings SL1 to SLy, or line sequential driving in which the signals SS are concurrently supplied to the wirings SL1 to SLy. Alternatively, a driving method in which the signals SS are sequentially supplied to every plural wirings SL may be employed.

Next, in a second frame period, an image is displayed by an operation similar to that of the first frame period. Thus, the image displayed on the pixel portion 510 is rewritten. Note that the image rewriting is performed at a rate high enough to prevent a change in an image due to the rewriting from being recognized by a viewer of the pixel portion 510. For example, image rewriting is performed at a frequency of higher than or equal to 60 times per second. Accordingly, a smooth moving image can be displayed on the pixel portion 510.

On the other hand, for example, in the case of displaying a still image or a moving image which does not change or changes within a predetermined range on the pixel portion 510, it is preferable not to rewrite the image and to keep the image of the previous frame. In this way, power consumption associated with image rewriting can be reduced. In this case, for example, the frequency of the image rewriting is more than or equal to once per day and less than 0.1 times per second, preferably more than or equal to once per hour and less than once per second, and further preferably more than or equal to once per 30 seconds and less than once per second.

In a period in which image rewriting is not performed, the supply of a power supply potential and a signal to the driver circuit 520 and the driver circuit 530 can be stopped. Thus, power consumption of the driver circuits 520 and 530 can be reduced.

When the frequency of image rewriting is reduced, flickers in displaying an image can be reduced. Accordingly, eye strain of an observer of the pixel portion 510 can be reduced.

When the frequency of image rewriting is reduced, the potential of the node N1 is preferably stored for a long time. For this reason, a transistor with low off-state current is preferably used as the transistor 512.

Here, an oxide semiconductor can have a wider band gap and a lower carrier density than other semiconductors such as silicon. Therefore, the off-state current of a transistor including an oxide semiconductor in a channel formation region (hereinafter also referred to as an OS transistor) is extremely low. Thus, when an OS transistor is used as the transistor 512, the potential of the node N1 can be held for an extremely long time, and the display state of an image can be maintained even when the frequency of image rewriting is reduced. An oxide semiconductor and an OS transistor will be described in detail in Embodiment 5.

Note that to maintain a display state is to keep the amount of change in display state within a given range. This given range can be set as appropriate, and is preferably set so that a user viewing displayed images can recognize the displayed images as the same image.

A transistor whose channel formation region is formed in a film including a semiconductor other than an oxide semiconductor can also be used as the transistor 512. Examples of a semiconductor other than an oxide semiconductor include silicon, germanium, silicon germanium, silicon carbide, gallium arsenide, aluminum gallium arsenide, indium phosphide, gallium nitride, and an organic semiconductor. Each of the above semiconductors other than an oxide semiconductor may be a single crystal semiconductor or a non-single-crystal semiconductor such as an amorphous semiconductor, a microcrystalline semiconductor, or a polycrystalline semiconductor.

<Pixel Configuration Example 2>

Figure 13A:
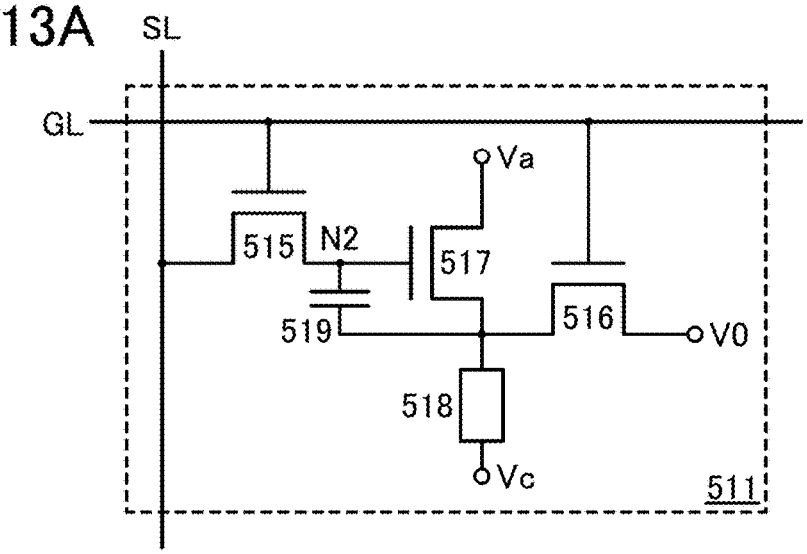
FIGS. 13A to 13C each illustrate a configuration example of a pixel.

FIG. 13A shows another configuration example of the pixel 511. The pixel 511 illustrated in FIG. 13A includes transistors 515 to 517, a light-emitting element 518, and a capacitor 519.

A gate of the transistor 515 is connected to the wiring GL. One of a source and a drain of the transistor 515 is connected to a gate of the transistor 517 and one of electrodes of the capacitor 519. The other of the source and the drain of the transistor 515 is connected to the wiring SL. One of the source and the drain of the transistor 517 is connected to the other electrode of the capacitor 519, one of electrodes of the light-emitting element 518, and one of a source and a drain of the transistor 516. The other of the source and the drain of the transistor 516 is connected to a wiring to which a potential Va is supplied. The other electrode of the light-emitting element 518 is connected to a wiring to which a potential Vc is supplied. A gate of the transistor 516 is connected to the wiring GL, and the other of the source and the drain thereof is connected to a wiring to which a potential V0 is supplied. Here, a node which is connected to one of the source and the drain of the transistor 515, the gate of the transistor 517, and the one electrode of the capacitor 519 is referred to as a node N2.

Note that the transistors 515 to 517 are n-channel transistors here; however, each of the transistors 515 to 517 may be an n-channel transistor or a p-channel transistor. A semiconductor material which is similar to that of the transistor 512 can be used for the transistors 515 to 517. Note that the semiconductor materials of the transistors 515 to 517 may be the same or different from each other. For example, a transistor including silicon in a channel formation region (hereinafter also referred to as a Si transistor) may be used as the transistor 515, and an OS transistor may be used for the transistor 517. Alternatively, an OS transistor may be used as the transistor 515, and a Si transistor may be used as the transistor 517. When an OS transistor is used as the transistor 515, the transistor 515 enables the potential of the node N2 to be retained for an extremely long time.

The capacitor 519 can be omitted. Note that the pixel 511 may further include an element such as a transistor, a diode, a resistor, a capacitor, or an inductor, as needed.

As the light-emitting element 518, an organic EL element, an inorganic EL element, or the like can be used. One of the potential Va and the potential Vb can be a high power supply potential, and the other can be a low power supply potential. The capacitor 519 functions as a storage capacitor for holding the potential of the node N2.

Furthermore, the transistor 515 controls supply of a potential of the wiring SL to the node N2. Specifically, the potential of the wiring GL is controlled to turn on the transistor 515, whereby the potential of the wiring SL is supplied to the node N2 and is written to the pixel 511. Then, the potential of the wiring GL is controlled to turn off the transistor 515, whereby the potential of the node N2 is held.

The amount of current flowing between the source and the drain of the transistor 517 is controlled in accordance with the potential of the node N2. The light-emitting element 518 emits light with a luminance corresponding to the amount of flowing current. Accordingly, the gray level of the pixel 511 can be controlled.

The operation of the driver circuits 520 and 530 in writing of the pixel 511 is similar to the operation of the pixel 511 shown in FIGS. 12A to 12C.

Figure 13B:
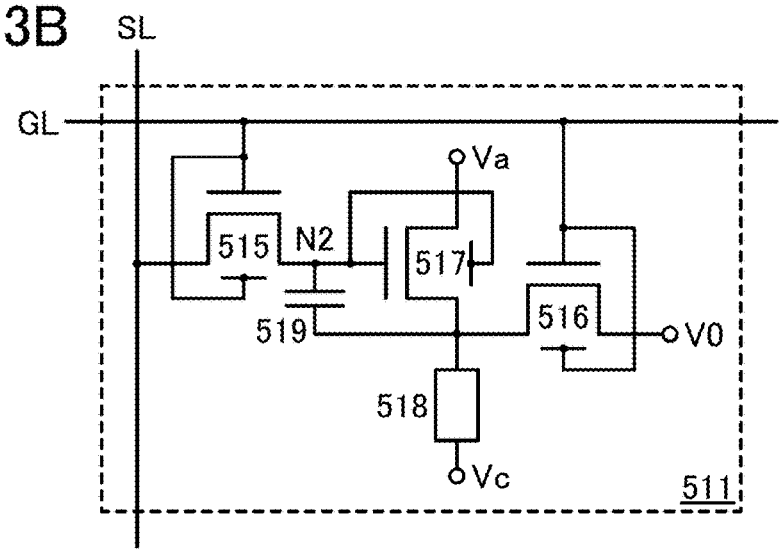
Figure 13C:
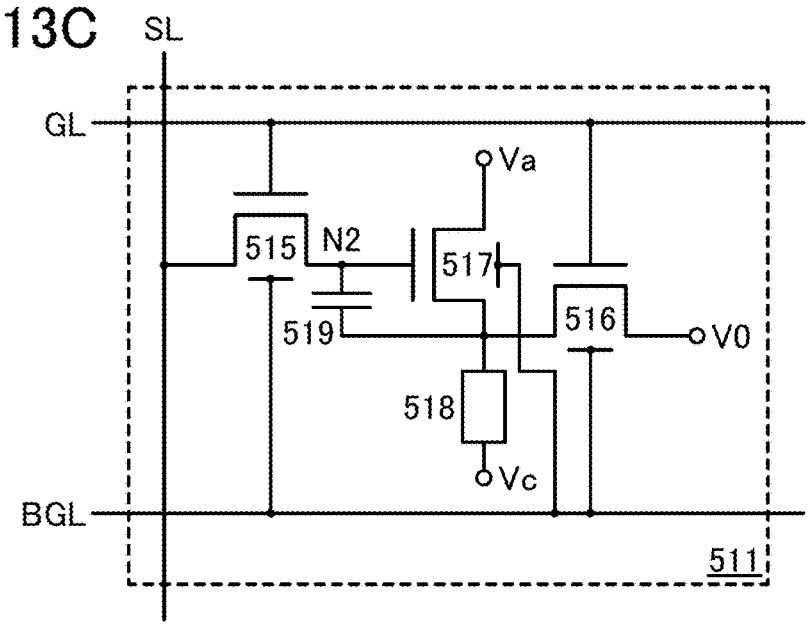

As illustrated in FIG. 13B, the transistors 515 to 517 may each include a back gate. In each of the transistors 515 to 517 illustrated in FIG. 13B, the gate is connected to the back gate. Thus, the potential of the gate is equal to the potential of the back gate. As illustrated in FIG. 13C, the back gates of the transistors 515 to 517 may be connected to the wiring BGL to which a predetermined potential is supplied.

As described above, in one embodiment of the present invention, the supply of power and a signal to the driver circuit can be stopped in a period where image rewriting is unnecessary. Thus, the power consumption of the display device 500 can be reduced.

This embodiment can be combined with any of the other embodiments as appropriate.

(Embodiment 3)

In this embodiment, a configuration example of the circuit for controlling the operation of the device according to one embodiment of the present invention is described.

In this embodiment, in a period where image rewriting is not performed, the supply of power and signals to the predetermined circuits (e.g., the circuits 41 shown in FIG. 1 or the driver circuits 520 and 530 shown in FIG. 10) can be stopped. A configuration for controlling power supply to the predetermined circuits is described below.

<Configuration Example of Power Switch>

FIGS. 14A to 14C and FIGS. 15A to 15F each illustrate a configuration example of a circuit provided with a switch for controlling power supply (i.e., a power switch).

Figure 14A:
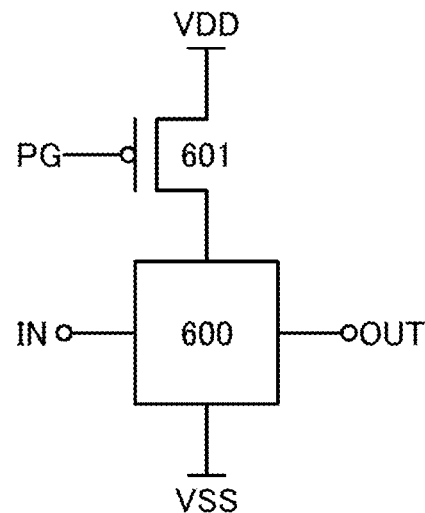
FIGS. 14A to 14C each illustrate a configuration example of a circuit.

In FIG. 14A, a circuit 600 is connected to a power switch which controls the power supply. Here, a transistor 601 is used as the power switch.

The circuit 600 is driven using a power supply potential, and there is no particular limitation on configuration and function. For example, the circuit 600 may be an arithmetic circuit or a memory circuit. In the case where the circuit 600 is used as an arithmetic circuit, a circuit including a combinational circuit such as an inverter circuit, an AND circuit, a NAND circuit, an OR circuit, or a NOR circuit can be used. Alternatively, the circuit 600 may include a sequential circuit such as a flip-flop circuit or a latch circuit. In the drawings, IN and OUT denote an input terminal and an output terminal, respectively, of the circuit 600.

The circuit 600 is connected to a wiring to which the low power supply potential VSS is supplied and to one of a source and a drain of the transistor 601. The other of the source and the drain of the transistor 601 is connected to a wiring to which the high power supply potential VDD is supplied. A gate of the transistor 601 is connected to a wiring to which a signal PG is supplied. Note that the signal PG is a signal for controlling power supply to the circuit 600.

When a low-level signal is input as the signal PG, the transistor 601 is turned on, the high power supply potential VDD is supplied to the circuit 600, and thus, the circuit 600 operates. On the other hand, when a high-level signal is input as the signal PG, the transistor 601 is turned off and the supply of the high power supply potential VDD to the circuit 600 is stopped.

As the circuit 600, the circuit 41 illustrated in FIG. 1, the driver circuit 520, the shift register 521, the buffer 522, the driver circuit 530, the shift register 531, the latch circuit 532, or the buffer 533 illustrated in FIGS. 10A to 10C, or the like can be used, for example. Thus, power supply to the above circuit can be controlled.

The signal PG can be controlled on the basis of the signal RC shown in FIG. 1, for example. Therefore, the power supply to the circuit 600 can be controlled on the basis of whether or not an image is rewritten.

Figure 14B:
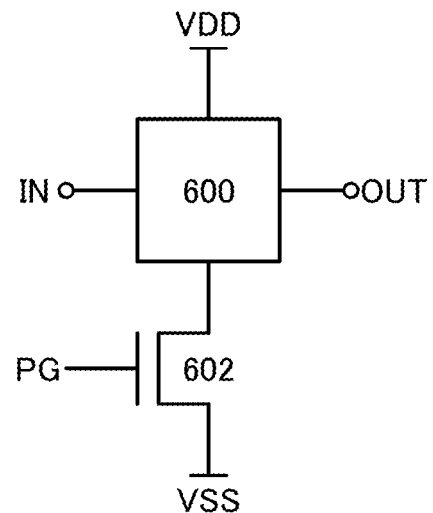

As illustrated in FIG. 14B, a switch may be provided between the circuit 600 and the wiring to which the low power supply potential VSS is supplied. Here, a transistor 602 is used as the switch. When a high-level signal is input as the signal PG, the transistor 602 is turned on, the low power supply potential VSS is supplied to the circuit 600, and thus, the circuit 600 operates. On the other hand, when a low-level signal is input as the signal PG, the transistor 602 is turned off and the supply of the low power supply potential VSS to the circuit 600 is stopped.

Figure 14C:
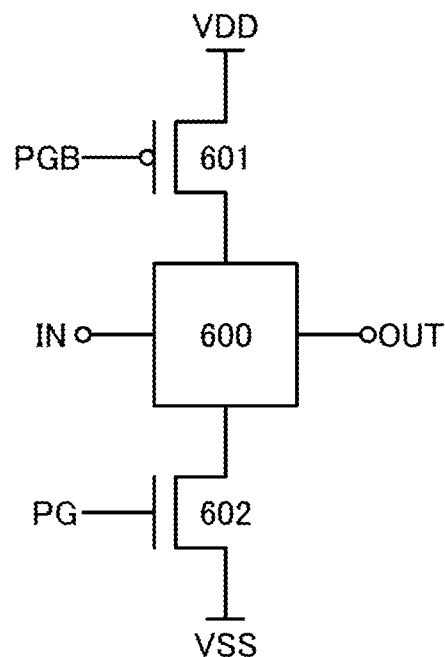

As illustrated in FIG. 14C, switches may be provided between the circuit 600 and the wiring to which the high power supply potential VDD is supplied and between the circuit 600 and the wiring to which the low power supply potential VSS is supplied. Here, a signal PGB is an inverted signal of the signal PG. When a high-level signal is input as the signal PG, the high power supply potential VDD and the low power supply potential VSS are supplied to the circuit 600.

Figure 15A:
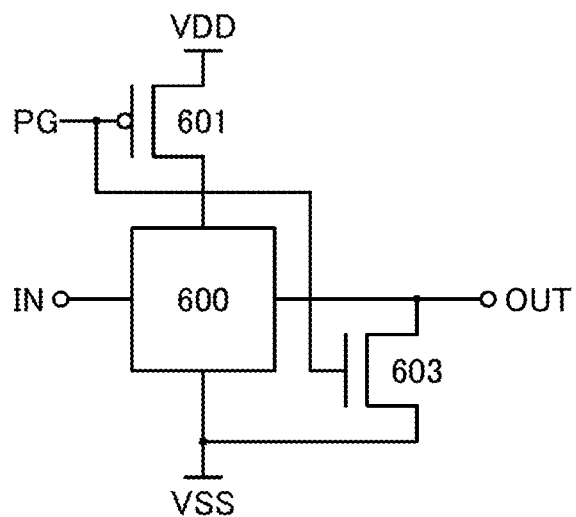
FIGS. 15A to 15F each illustrate a configuration example of a circuit.

As illustrated in FIG. 15A, a transistor 603 can be added to the configuration in FIG. 14A. A gate of the transistor 603 is connected to the wiring to which the signal PG is supplied. One of a source and a drain of the transistor 603 is connected to an output terminal "OUT". The other of the source and the drain of the transistor 603 is connected to the wiring to which the low power supply potential VSS is supplied.

The transistor 603 is in an on state in a period where a high-level signal is input as the signal PG. Thus, the potential of the output terminal "OUT" can be kept at a low level in a period where power supply to the circuit 600 is stopped. This can prevent the output of the circuit 600 from having an undefined value.

Figure 15B:
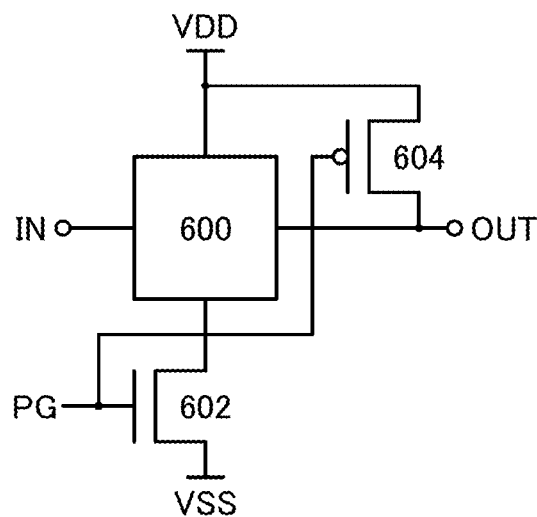

As illustrated in FIG. 15B, a transistor 604 can be added to the configuration in FIG. 14B. A gate of the transistor 604 is connected to the wiring to which the signal PG is supplied. One of a source and a drain of the transistor 604 is connected to the output terminal "OUT". The other of the source and the drain of the transistor 604 is connected to the wiring to which the high power supply potential VDD is supplied.

The transistor 604 is in an on state in a period where a low-level signal is input as the signal PG. Thus, the potential of the output terminal "OUT" can be kept at a high level in a period where power supply to the circuit 600 is stopped. This can prevent the output of the circuit 600 from having an undefined value.

Figure 15C:
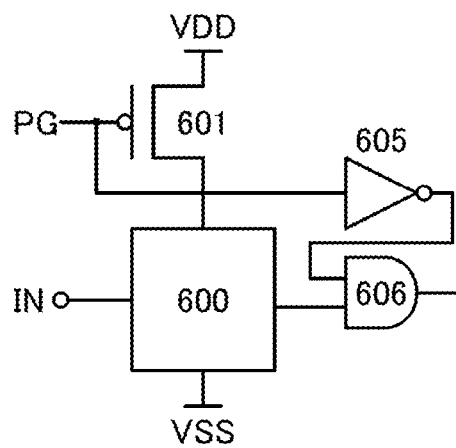
Figure 15D:
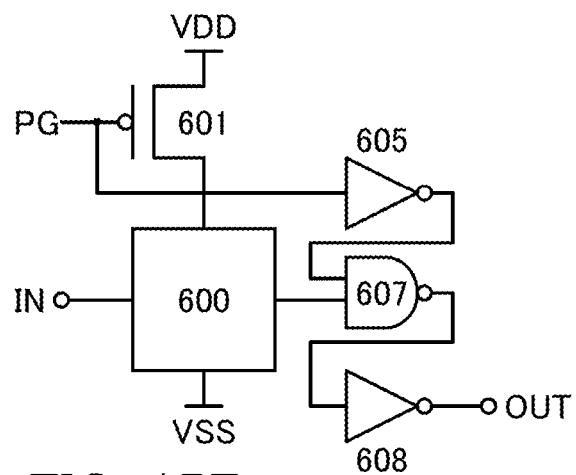

Note that a logic circuit may be provided instead of the transistor 603 in FIG. 15A. FIG. 15C illustrates a configuration in which an inverter 605 and an AND 606 are provided instead of the transistor 603. FIG. 15D illustrates a configuration in which the inverter 605, a NAND 607, and an inverter 608 are provided instead of the transistor 603.

Figure 15E:
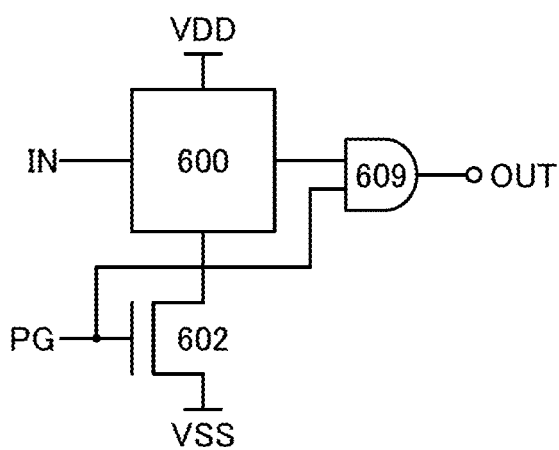
Figure 15F:
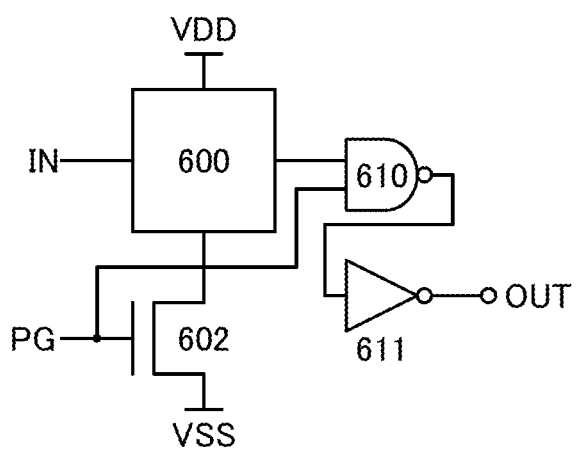

A logic circuit may be provided instead of the transistor 604 in FIG. 15B. FIG. 15E illustrates a configuration in which an AND 609 is provided instead of the transistor 604. FIG. 15F illustrates a configuration in which a NAND 610 and an inverter 611 are provided instead of the transistor 604.

In FIGS. 15C to 15F, the potential of the output terminal "OUT" can be kept at a low level in a period where power supply to the circuit 600 is stopped. This can prevent the output of the circuit 600 from having an undefined value.

Instead of controlling ON/OFF of the power switch, power supply may be stopped by changing the high power supply potential VDD to the low power supply potential VSS. In that case, the circuit 600 is connected to the two wirings supplied with the low power supply potential VSS, and current does not flow to the circuit 600. Similarly, power supply may be stopped by changing the low power supply potential VSS to the high power supply potential VDD.

A material of the transistors in FIGS. 14A to 14C and FIGS. 15A to 15F (such as the transistors 601 to 604 and transistors included in the inverter, the AND, and the NAND) is not particularly limited, and for example, OS transistors can be used. In particular, when OS transistors are used as the transistors 601 and 602, power consumption can be extremely low in a period where the transistors 601 and 602 are turned off and power supply is stopped.

OS transistors can be stacked over other transistors. Therefore, transistors illustrated in FIGS. 14A to 14C and FIGS. 15A to 15F can be OS transistors, and the transistors can be stacked over transistors included the circuit 600. This can suppress an increase in area due to presence of the power switch.

Note that the transistors in FIGS. 14A to 14C and FIGS. 15A to 15F are not limited to OS transistors and can be transistors in each of which a channel formation region is formed in a single crystal semiconductor substrate, transistors in each of which a channel formation region is formed in a film including a semiconductor other than an oxide semiconductor, or the like.

<Configuration Example of Circuit>

FIGS. 16A and 16B and FIGS. 17A and 17B illustrate examples of a specific configuration of the circuit 600.

Figure 16A:
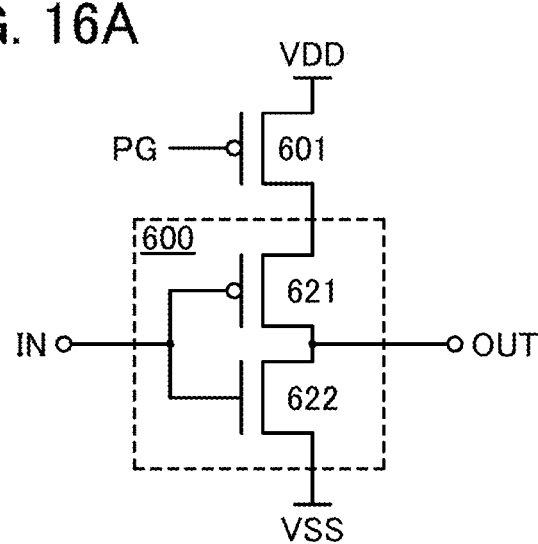
FIGS. 16A and 16B each illustrate a configuration example of a circuit.

FIG. 16A illustrates a configuration in which the circuit 600 in FIG. 14A is an inverter. The circuit 600 includes a transistor 621 and a transistor 622.

A gate of the transistor 621 is connected to the input terminal "IN", one of a source and a drain of the transistor 621 is connected to the one of the source and the drain of the transistor 601, the other of the source and the drain of the transistor 621 is connected to one of a source and a drain of the transistor 622. A gate of the transistor 622 is connected to the input terminal "IN". The other of the source and the drain of the transistor 622 is connected to the wiring to which the low power supply potential VSS is supplied. Although the configuration in which the circuit 600 in FIG. 14A is the inverter is described here, any of the circuits 600 in FIGS. 14B and 14C and FIGS. 15A to 15F may be an inverter.

Figure 16B:
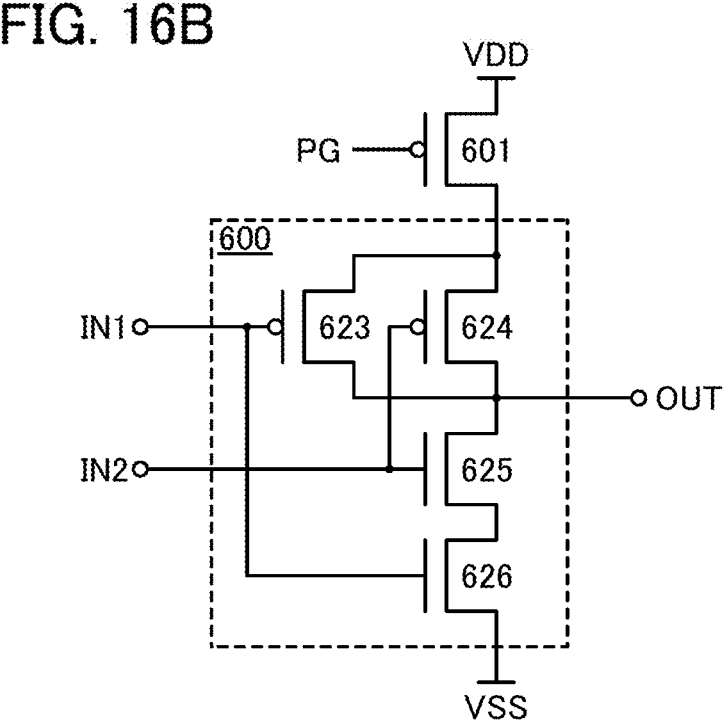

FIG. 16B illustrates a configuration in which the circuit 600 in FIG. 14A is a NAND. The circuit 600 includes transistors 623, 624, 625, and 626.

A gate of the transistor 623 is connected to an input terminal IN1. One of a source and a drain of the transistor 623 is connected to one of a source and a drain of the transistor 624 and the one of the source and the drain of the transistor 601. The other of the source and the drain of the transistor 623 is connected to the other of the source and the drain of the transistor 624 and one of a source and a drain of the transistor 625. A gate of the transistor 624 is connected to an input terminal IN2. A gate of the transistor 625 is connected to the input terminal IN2. The other of the source and the drain of the transistor 625 is connected to one of a source and a drain of the transistor 626. A gate of the transistor 626 is connected to the input terminal IN1. The other of the source and the drain of the transistor 626 is connected to the wiring to which the low power supply potential VSS is supplied. Although the configuration in which the circuit 600 in FIG. 16A is the NAND is described here, any of the circuits 600 in FIGS. 14B and 14C and FIGS. 15A to 15F can be a NAND. In addition, the circuit 600 can be an AND which is formed by combining the inverter in FIG. 16A with the NAND in FIG. 16B.

With the configurations illustrated in FIGS. 16A and 16B, power supply can be controlled in each logic element.

Figure 17A:
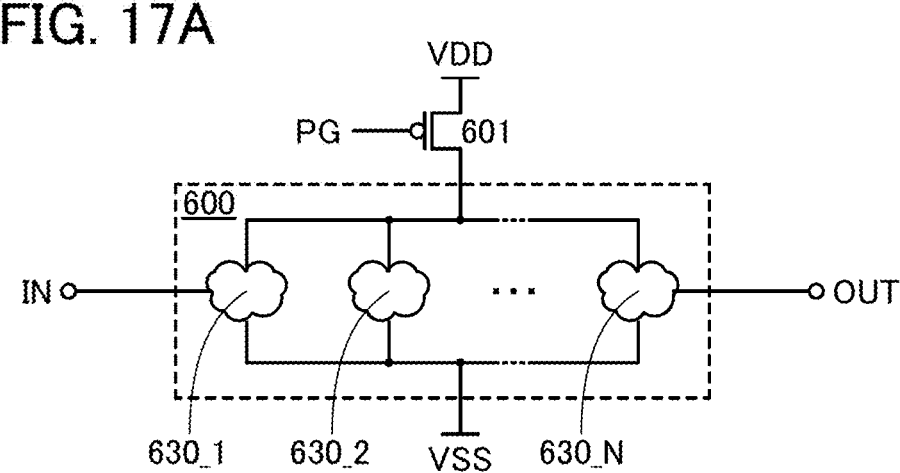
FIGS. 17A and 17B each illustrate a configuration example of a circuit.
Figure 17B:
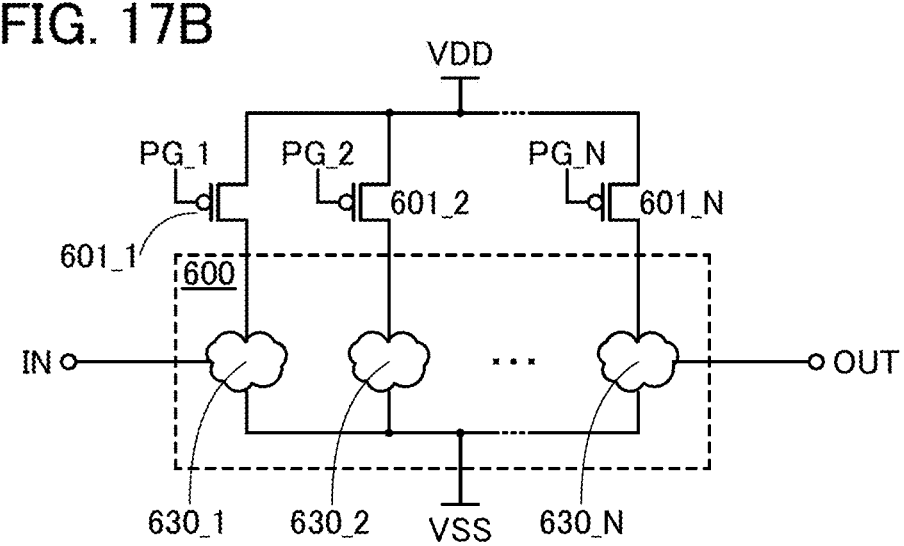

Note that any of the circuits 600 in FIGS. 14A to 14C and FIGS. 15A to 15F may be formed using a plurality of logic elements. FIGS. 17A and 17B each illustrate a configuration in which the circuit 600 in FIG. 14A includes a plurality of logic circuits 630.

The circuit 600 in FIG. 17A includes N logic circuits 630 (logic circuits 630_1 to 630_N) (N is an integer of two or more). Each of the logic circuits 630 is connected to the wiring supplied with the high power supply potential VDD through the transistor 601. Each of the logic circuits 630 is also connected to the wiring to which the low power supply potential VSS is supplied. When a low-level signal is supplied as the signal PG, the high power supply potential VDD is supplied to the logic circuits 630_1 to 630_N. Accordingly, power supply to the logic circuits 630_1 to 630_N can be collectively controlled.

The logic circuit 630 may include a combinational circuit such as an inverter circuit, an AND circuit, a NAND circuit, an OR circuit, or a NOR circuit or a sequential circuit such as a flip-flop circuit or a latch circuit.

As illustrated in FIG. 17B, the logic circuits 630 may be provided with respective transistors 601. In that case, power supply to each of the logic circuits 630 can be controlled separately.

Note that in each of the circuits 600 in FIGS. 17A and 17B, the output terminal of one logic circuit 630 may be connected to the input terminal of another logic circuit 630. This allows the logic circuits 630 to be combined to form a logic circuit.

Each of the circuits 600 in FIGS. 17A and 17B can be used as any of the circuits 600 in FIGS. 14B and 14C and FIGS. 15A to 15F.

As described above, in one embodiment of the present invention, the supply of power to a predetermined circuit can be controlled by a power switch.

This embodiment can be combined with any of the other embodiments as appropriate.

(Embodiment 4)

In this embodiment, a structural example where the device 10 described in the above embodiment is used in a broadcast system will be described.

Figure 18:
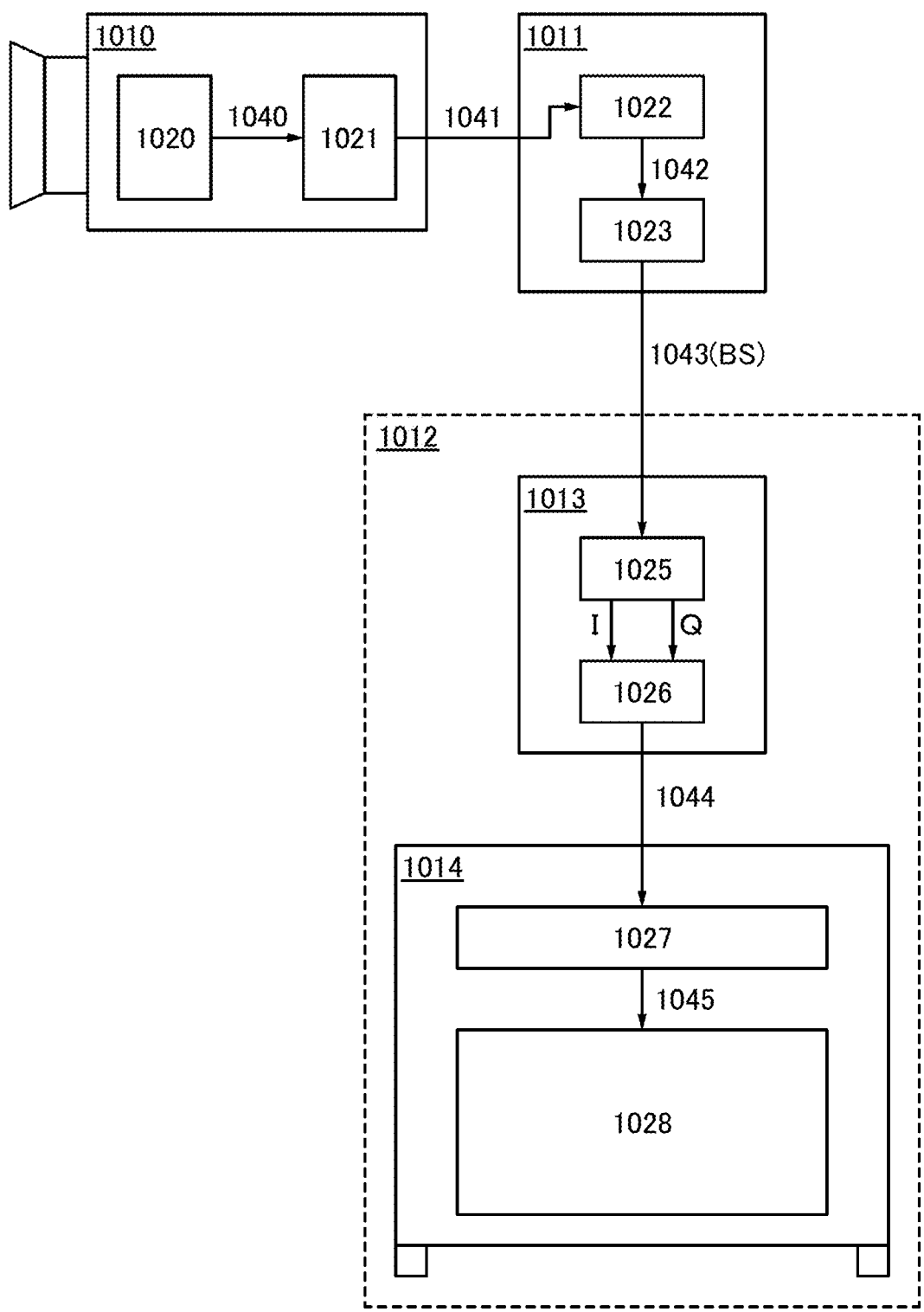
FIG. 18 illustrates an example of a broadcast system.

FIG. 18 is a block diagram that schematically illustrates a configuration example of the broadcasting system. A broadcasting system 1000 includes a camera 1010, a transceiver 1011, and a television system 1012. The television system 1012 includes a receiver 1013 and a display device 1014. The camera 1010 includes an image sensor 1020 and an image processor 1021. The transceiver 1011 includes an encoder 1022 and a modulator 1023. The receiver 1013 includes a demodulator 1025 and a decoder 1026. The display device 1014 includes a driver circuit 1027 and a display portion 1028.

As the television system 1012, the device 10 illustrated in FIG. 1 can be used. In that case, the demodulator 1025 corresponds to the front end portion 20 in FIG. 1, the decoder 1026 corresponds to the decoder 30 in FIG. 1, the driver circuit 1027 corresponds to the driver circuit 40 in FIG. 1, and the display portion 1028 corresponds to the display portion 50 in FIG. 1.

When the camera 1010 captures an 8K video, the image sensor 1020 includes at least 7680×4320 pixels for capturing an 8K color image. When the camera 1010 is a camera for capturing a 4K image, the image sensor 1020 includes at least 3840×2160 pixels. When the camera 1010 is a camera for capturing a 2K video, the image sensor 1020 includes at least 1920×1080 pixels. Each pixel can include a red sub-pixel, a green sub-pixel, and a blue sub-pixel.

The image sensor 1020 generates a Raw data 1040 which is unprocessed. The image processor 1021 performs image processing (such as noise removal or interpolation processing) on the Raw data 1040 and generates image data 1041. The image data 1041 is output to the transceiver 1011.

The transceiver 1011 processes the image data 1041 and generates a broadcast signal (carrier wave) 1043 that accords with a broadcast band. The encoder 1022 processes the image data 1041 and generates encoded data 1042. The encoder 1022 performs operations such as encoding of the image data 1041, addition of data for broadcasting control (e.g. authentication data) to the image data 1041, encryption, and scrambling (data rearrangement for spread spectrum).

The modulator 1023 generates and outputs the broadcasting signal 1043 to the television system 1012 by performing IQ modulation (orthogonal amplitude modulation) on the encoded data 1042. The broadcasting signal 1043 is a composite signal that has an I (identical phase) component and a Q (quadrature phase) component. A TV broadcasting station is tasked with obtaining the video data 1041, and supplying the broadcasting signal 1043. Note that the broadcasting signal 1043 corresponds to the signal BS in FIG. 1.

The receiver 1013 receives the broadcast signal 1043. The receiver 1013 has a function of converting the broadcasting signal 1043 to image data 1044 that can be displayed on the display device 1013. The demodulator 1025 demodulates the broadcasting signal 1043, and decomposes the broadcasting signal 1043 to two analog signals, i.e., an I signal and a Q signal.

The decoder 1026 has a function of converting the I signal and the Q signal into digital signals. Moreover, the decoder 1026 performs various processing on the digital signal and generates bitstream data. The description of the decoder 30 in FIG. 1 can be referred to for the decoder 1026.

The image data 1044 is input to the driver circuit 1027. The driver circuit 1027 processes the image data 1044 and generates a signal 1045 that can be input to the display portion 1028. The signal 1045 corresponds to the signal SS or the like in FIG. 1. The description of the driver circuit 40 in FIG. 1 can be referred to for the driver circuit 1027.

Figure 19:
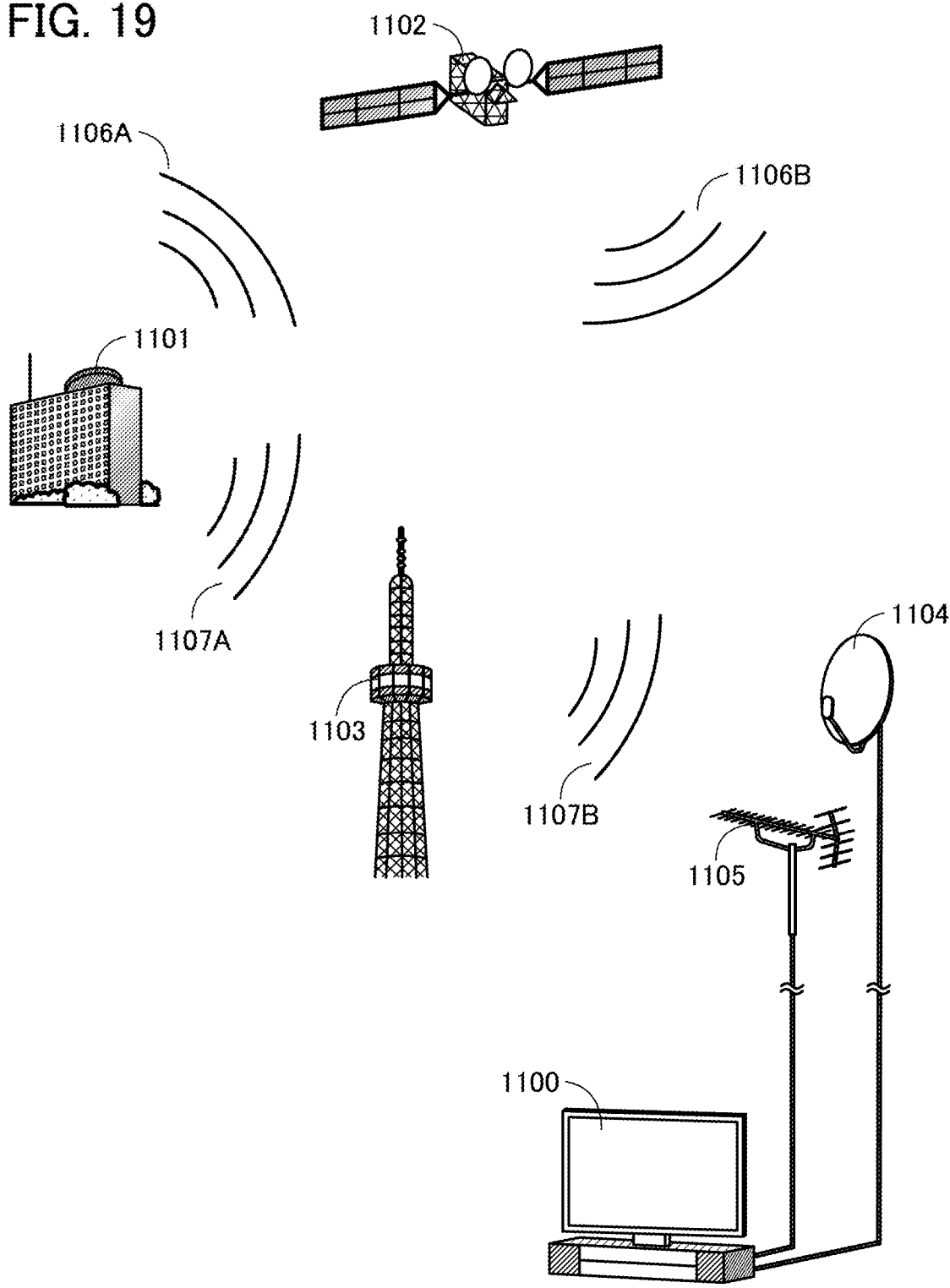
FIG. 19 illustrates an example of data transmission.

A schematic representation of the data transfer within a broadcasting system is shown in FIG. 19. FIG. 19 illustrates paths that radio waves (broadcasting signals) transmitted from a broadcasting station 1101 take to television receivers (TV 1100) 1100 in each household. The TV 1100 is equipped with the television system 1012. Examples of an artificial satellite 1102 include a communication satellite (CS) and a broadcasting satellite (BS). Examples of an antenna 1104 include a BS/110° CS antenna and a CS antenna. Examples of an antenna 1105 include an ultra-high frequency (UHF) antenna.

Radio waves 1106A and 1106B are broadcasting signals for satellite broadcasting. When the artificial satellite 1102 receives the radio wave 1106A, the artificial satellite 1102 transmits the radio wave 1106B to the ground. The radio wave 1106B is received by the antenna 1104 in each household, which enables the viewing of satellite TV broadcasting on the TV 1100. Alternatively, the radio wave 1106B is received by an antenna of another broadcasting station, where a receiver processes the radio wave 1106B into a signal that can be transmitted to an optical cable. The broadcasting station then sends the broadcasting signal to the TV 1100 in each household using an optical cable network. Radio waves 1107A and 1107B are broadcasting signals for terrestrial broadcasting. A radio tower 1103 amplifies the received radio wave 1107A, and transmits the radio wave 1107B. Each household can view terrestrial TV broadcasting on the TV 1100 by receiving the radio wave 1107B with the antenna 1105.

Furthermore, the video distribution system according to this embodiment is not limited to a system for TV broadcasting. In addition, the image data to be distributed may be either video data or still image data.

Figure 20:
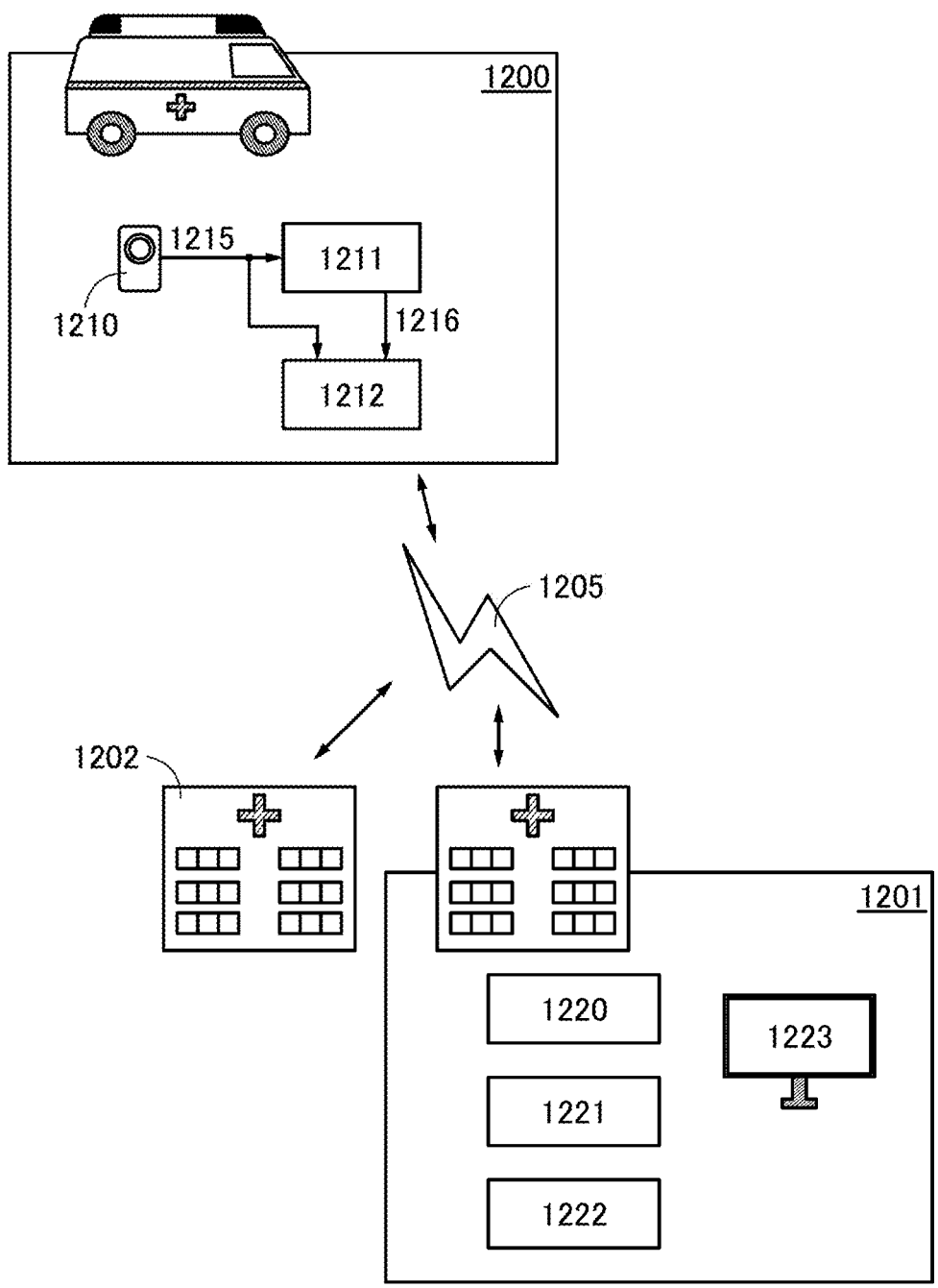
FIG. 20 illustrates an example of an emergency medical system.

For example, the image data 1041 of the camera 1010 may be distributed through a high-speed IP network. For example, a system for distributing the image data 1041 can be used in the medical field for giving out medical care and diagnoses remotely. Images with higher resolution are demanded for accurate image diagnoses and medical care; images with high resolution, such as 8K, 4K, and 2K images, are thus demanded for images for medical use. FIG. 20 schematically illustrates an emergency medical system that utilizes the video data distribution system.

The communication between an emergency transportation vehicle (an ambulance) 1200 and a medical institution 1201 and between the medical institution 1201 and a medical institution 1202 is performed using a high-speed network 1205. The ambulance 1200 is equipped with a camera 1210, an encoder 1211, and a communication device 1212.

The camera 1210 is used to capture images of a patient being transported to the medical institution 1201. Video data 1215 obtained by the camera 1210 may be transmitted without compression by the communication device 1212. This enables the transmission of the high-resolution video data 1215 to the medical institution 1201 with little delay. When the high-speed network 1205 cannot be used for the communication between the ambulance 1200 and the medical institution 1201, the video data can be encoded with the encoder 1211, and encoded video data 1216 can be transmitted to the medical institution 1201 via the communication device 1212.

In the medical institution 1201, the video data transmitted from the ambulance 1200 is received by a communication device 1220. When the received video data is uncompressed data, the video data is transmitted through the communication device 1220 to the device 1223, where the video data is displayed. When the video data is compressed data, the data is decompressed in a decoder 1221, and then is transmitted to the device 1223, where the video data is displayed. Medical practitioners give instructions to a crew of the ambulance 1200, or to staff members in the medical institution 1201 who treat the patient, based on the image on the device 1223. The distribution system illustrated in FIG. 20 can transmit high-resolution images; this allows the medical practitioners in the medical institution 1201 to inspect the patient being transported in detail. Therefore, the doctors can give instructs to the ambulance crews or the staff members appropriately in a short time, resulting in improvement of a lifesaving rate of patients.

The communication of video data between the medical institutions 1201 and 1202 is similar to that described above. The medical images obtained with an image diagnosis tool such as CT, and MRI in the medical institution 1201 can be transmitted to the medical institution 1202. Here, the ambulance 1200 is used as an example. However, the methods for transporting the patient may be aircrafts such as helicopters, or ships.

Figure 21A:
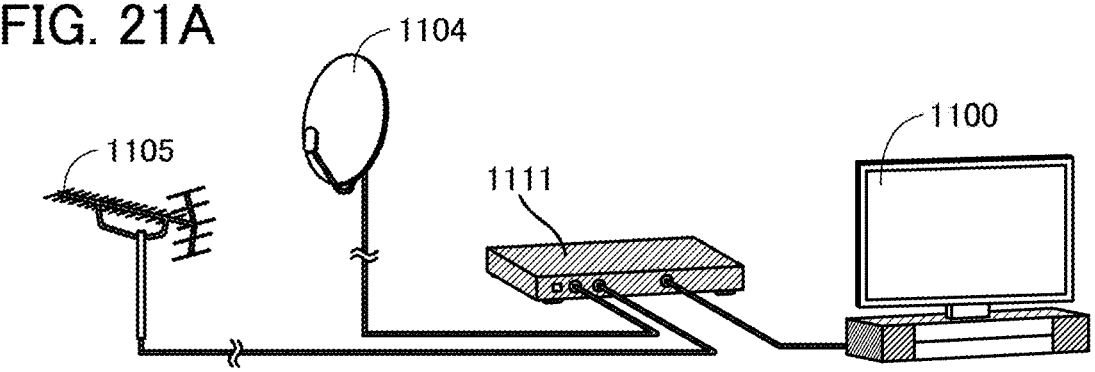
FIGS. 21A to 21D each illustrate a structure example of a receiver device.
Figure 21B:
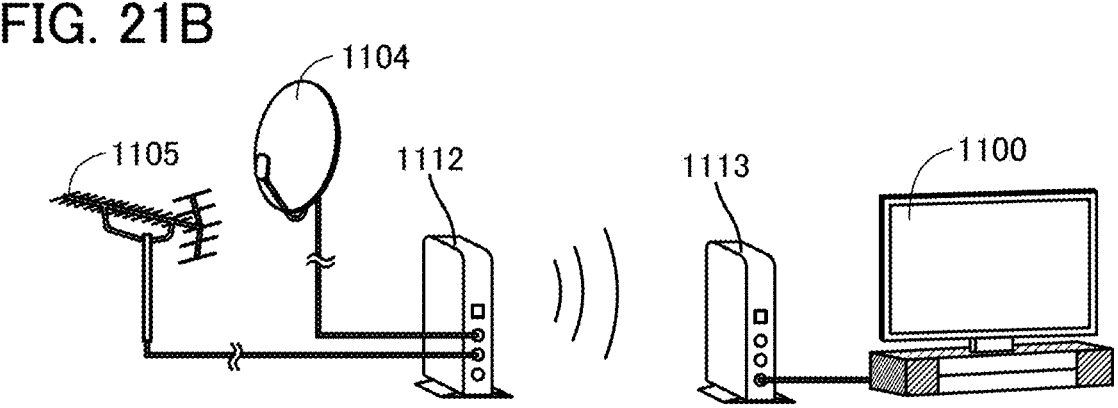
Figure 21C:
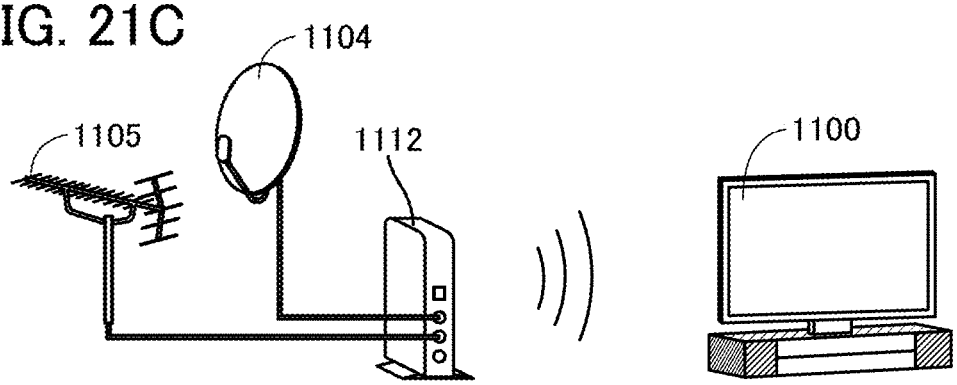
Figure 21D:
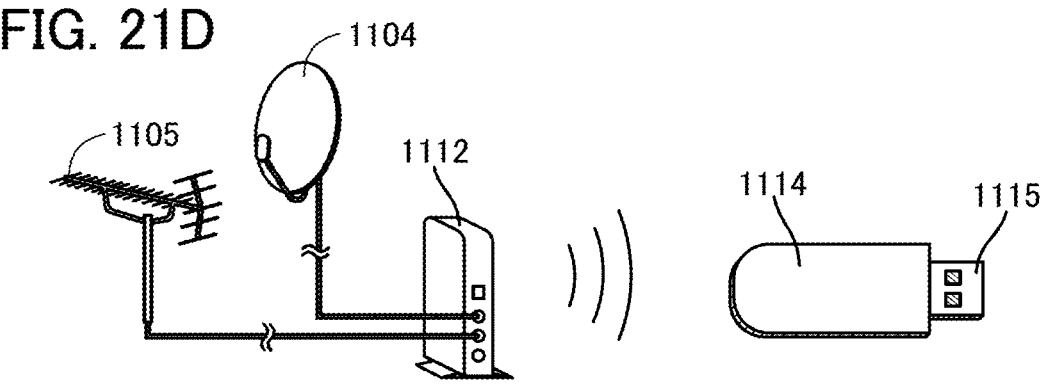

FIG. 19 illustrates an example in which a receiver is included in the TV 1100. A configuration in which a stand-alone receiver is used to receive signals to display images on the TV 1100 is also possible. An example of such a case is shown in FIGS. 21A to 21D. As illustrated in FIG. 21A, a receiver 1111 may be provided on the outside of the TV 1100. As illustrated in FIG. 21B, the antennae 1104 and 1105 and the TV 1100 may transmit data to, and receive data from each other through wireless transmitters 1112 and 1113. In this case, the wireless transmitters 1112 and 1113 also serve as receivers. As illustrated in FIG. 21C, the wireless transmitter 1113 may be incorporated in the TV 1100.

The receiver can be of a portable size. A receiver 1114 illustrated in FIG. 21D includes a connector portion 1115. If an electronic device such as a display device or an information terminal (e.g., a personal computer, a smartphone, a cellular phone, and a tablet-type terminal) is equipped with a terminal that is capable of connecting with the connector portion 1115, they can be used to watch satellite and terrestrial broadcasting.

In the broadcast system 1000 in FIG. 18, the decoder 1026 can be formed by combining a dedicated IC and a processor (e.g., GPU and CPU), for example. It is also possible to integrate the decoder 1026 into one dedicated IC chip. Such a dedicated IC can be formed by a PLD. The same applies to the encoder 1022.

This embodiment can be combined with any of the other embodiments as appropriate.

(Embodiment 5)

In this embodiment, a structure example of a transistor that can be used for the device described in the above embodiment will be described.

<Structure Example 1>

FIG. 22A1 is a cross-sectional view of a channel-protective transistor 710 that is a type of bottom-gate transistor. The transistor 710 includes an electrode 866 over a substrate 871 with an insulating layer 872 positioned therebetween. The transistor 710 includes a semiconductor layer 842 over the electrode 866 with an insulating layer 826 provided therebetween. The electrode 866 can function as a gate electrode. The insulating layer 826 can function as a gate insulating layer.

The transistor 710 includes an insulating layer 822 over a channel formation region in the semiconductor layer 842. The transistor 710 includes an electrode 844a and an electrode 844b which are partly in contact with the semiconductor layer 842 and over the insulating layer 826. Part of the electrode 844a and part of the electrode 844b are formed over the insulating layer 822.

The insulating layer 822 can function as a channel protective layer. With the insulating layer 822 provided over the channel formation region, the semiconductor layer 842 can be prevented from being exposed at the time of forming the electrodes 844a and 844b. Thus, the channel formation region in the semiconductor layer 842 can be prevented from being etched at the time of forming the electrodes 844a and 844b. According to one embodiment of the present invention, a transistor with favorable electrical characteristics can be provided.

The transistor 710 includes an insulating layer 828 over the electrode 844a, the electrode 844b, and the insulating layer 822 and further includes an insulating layer 829 over the insulating layer 828.

In the case where an oxide semiconductor is used for the semiconductor layer 842, a material that is capable of removing oxygen from part of the semiconductor layer 842 to generate oxygen vacancies is preferably used at least for regions of the electrodes 844a and 844b that are in contact with the semiconductor layer 842. The carrier concentration of the regions of the semiconductor layer 842 in which oxygen vacancies are generated is increased, so that the regions become n-type regions (n$^+$layers). Accordingly, the regions can function as a source region and a drain region. Examples of the material which is capable of removing oxygen from the oxide semiconductor to generate oxygen vacancies include tungsten and titanium.

Formation of the source region and the drain region in the semiconductor layer 842 makes it possible to reduce contact resistance between the semiconductor layer 842 and each of the electrodes 844a and 844b. Accordingly, the electrical characteristics of the transistor, such as the field-effect mobility and the threshold voltage, can be favorable.

In the case where a semiconductor such as silicon is used for the semiconductor layer 842, a layer that functions as an n-type semiconductor or a p-type semiconductor is preferably provided between the semiconductor layer 842 and the electrode 844a and between the semiconductor layer 842 and the electrode 844b. The layer that functions as an n-type semiconductor or a p-type semiconductor can function as a source region or a drain region in a transistor.

The insulating layer 829 is preferably formed using a material that can prevent or reduce diffusion of impurities into the transistor from the outside. The formation of the insulating layer 829 may also be omitted.

When an oxide semiconductor is used for the semiconductor layer 842, heat treatment may be performed before and/or after the insulating layer 829 is formed. The heat treatment can fill oxygen vacancies in the semiconductor layer 842 by diffusing oxygen contained in the insulating layer 829 or other insulating layers into the semiconductor layer 842. Alternatively, the insulating layer 829 may be formed while the heat treatment is performed, so that oxygen vacancies in the semiconductor layer 842 can be filled.

A transistor 711 illustrated in FIG. 22A2 is different from the transistor 710 in that an electrode 823 that can function as a back gate is provided over the insulating layer 829. The electrode 823 can be formed using a material and a method similar to those of the electrode 866.

In general, the back gate is formed using a conductive layer. The gate and the back gate are located so that a channel formation region in a semiconductor layer is sandwiched therebetween. Thus, the back gate can function like the gate. The potential of the back gate may be the same as that of the gate electrode or may be a GND potential or a predetermined potential. By changing the potential of the back gate independently of the potential of the gate, the threshold voltage of the transistor can be changed.

The electrode 866 and the electrode 823 can each function as a gate. Thus, the insulating layers 826, 828, and 829 can each function as a gate insulating layer. The electrode 823 may also be provided between the insulating layers 828 and 829.

In the case where one of the electrode 866 and the electrode 823 is simply referred to as a "gate" or a "gate electrode", the other can be referred to as a "back gate" or a "back gate electrode". For example, in the transistor 711, in the case where the electrode 823 is referred to as a "gate electrode", the electrode 866 is referred to as a "back gate electrode". In the case where the electrode 823 is used as a "gate electrode", the transistor 711 can be regarded as a kind of top-gate transistor. Alternatively, one of the electrode 866 and the electrode 823 may be referred to as a "first gate" or a "first gate electrode", and the other may be referred to as a "second gate" or a "second gate electrode".

By providing the electrode 866 and the electrode 823 with the semiconductor layer 842 provided therebetween and setting the potentials of the electrode 866 and the electrode 823 to be the same, a region of the semiconductor layer 842 through which carriers flow is enlarged in the film thickness direction; thus, the number of transferred carriers is increased. As a result, the on-state current and the field-effect mobility of the transistor 711 are increased.

Therefore, the transistor 711 has large on-state current for the area occupied thereby. That is, the area occupied by the transistor 711 can be small for required on-state current. With one embodiment of the present invention, the area occupied by a transistor can be reduced. Therefore, a device having a high degree of integration can be provided.

Furthermore, the gate and the back gate are formed using conductive layers and thus each have a function of preventing an electric field generated outside the transistor from influencing the semiconductor layer in which the channel is formed (in particular, an electric field blocking function against static electricity and the like). When the back gate is formed larger than the semiconductor layer such that the semiconductor layer is covered with the back gate, the electric field blocking function can be enhanced.

Since the electrode 866 (gate) and the electrode 823 (back gate) each have a function of blocking an electric field from the outside, electric charge of charged particles and the like generated on the insulating layer 872 side or above the electrode 823 do not influence the channel formation region in the semiconductor layer 842. Thus, degradation by a stress test (e.g., a negative gate bias temperature (−GBT) stress test in which negative charges are applied to a gate) can be reduced. Furthermore, a change in gate voltage (rising voltage) at which on-state current starts flowing at different drain voltages can be reduced. Note that this effect is obtained when the electrodes 866 and 823 have the same potential or different potentials.

The GBT stress test is one kind of acceleration test and can evaluate, in a short time, a change by long-term use (i.e., a change over time) in characteristics of a transistor. In particular, the amount of change in threshold voltage of the transistor between before and after the GBT stress test is an important indicator when examining the reliability of the transistor. As the change in the threshold voltage is smaller, the transistor has higher reliability.

By providing the electrodes 866 and 823 and setting the potentials of the electrodes 866 and 823 to be the same, the amount of change in threshold voltage is reduced. Accordingly, a variation in electrical characteristics among a plurality of transistors is also reduced.

The transistor including the back gate has a smaller change in threshold voltage by a positive GBT stress test in which positive electric charge is applied to a gate than a transistor including no back gate.

When the back gate is formed using a light-blocking conductive film, light can be prevented from entering the semiconductor layer from the back gate side. Therefore, photodegradation of the semiconductor layer can be prevented and deterioration in electrical characteristics of the transistor, such as a shift of the threshold voltage, can be prevented.

With one embodiment of the present invention, a transistor with high reliability can be provided. Moreover, a driver circuit, a pixel, or the like with high reliability can be provided.

FIG. 22B1 is a cross-sectional view of a channel-protective transistor 720 that is a type of bottom-gate transistor. The transistor 720 has substantially the same structure as the transistor 710 but is different from the transistor 710 in that the insulating layer 822 having openings 831*a* and 831*b* covers the semiconductor layer 842. The openings 831*a* and 831*b* are formed by selectively removing part of the insulating layer 822 which overlaps with the semiconductor layer 842.

The semiconductor layer 842 is electrically connected to the electrode 844a in the opening 831*a*. The semiconductor layer 842 is electrically connected to the electrode 844*b* in the opening 831*b*. With the insulating layer 822, the semiconductor layer 842 can be prevented from being exposed at the time of forming the electrodes 844*a* and 844*b*. Thus, the semiconductor layer 842 can be prevented from being reduced in thickness at the time of forming the electrodes 844*a* and 844*b*. A region of the insulating layer 822 which overlaps with the channel formation region can function as a channel protective layer.

A transistor 721 illustrated in FIG. 22B2 is different from the transistor 720 in that the electrode 823 that can function as a back gate is provided over the insulating layer 829.

The distance between the electrodes 844*a* and 866 and the distance between the electrodes 844*b* and 866 in the transistors 720 and 721 are longer than those in the transistors 710 and 711. Thus, the parasitic capacitance generated between the electrodes 844*a* and 866 can be reduced. Furthermore, the parasitic capacitance generated between the electrodes 844*b* and 866 can be reduced. According to one embodiment of the present invention, a transistor with favorable electrical characteristics can be provided.

A transistor 725 illustrated in FIG. 22C1 is a channel-etched transistor that is a type of bottom-gate transistor. In the transistor 725, the insulating layer 822 is not provided and the electrodes 844*a* and 844*b* are formed to be in contact with the semiconductor layer 842. Thus, part of the semiconductor layer 842 that is exposed when the electrodes 844a and 844b are formed is etched in some cases. However, since the insulating layer 822 is not provided, the productivity of the transistor can be increased.

A transistor 726 illustrated in FIG. 22C2 is different from the transistor 725 in that the electrode 823 which can function as a back gate is provided over the insulating layer 829.

<Structure Example 2>

FIG. 23A1 is a cross-sectional view of a transistor 730 that is a type of top-gate transistor. The transistor 730 includes the semiconductor layer 842 over the substrate 871 with the insulating layer 872 therebetween, the electrodes 844*a* and 844*b* that are over the semiconductor layer 842 and the insulating layer 872 and in contact with part of the semiconductor layer 842, the insulating layer 826 over the semiconductor layer 842 and the electrodes 844*a* and 844*b*, and the electrode 866 over the insulating layer 826.

Since the electrode 866 overlaps with neither the electrode 844*a* nor the electrode 844*b* in the transistor 730, the parasitic capacitance generated between the electrodes 866 and 844*a* and the parasitic capacitance generated between the electrodes 866 and 844*b* can be reduced. After the formation of the electrode 866, an impurity 855 is introduced into the semiconductor layer 842 using the electrode 866 as a mask, so that an impurity region can be formed in the semiconductor layer 842 in a self-aligned manner (see FIG. 23A3). According to one embodiment of the present invention, a transistor with favorable electrical characteristics can be provided.

The introduction of the impurity 855 can be performed with an ion implantation apparatus, an ion doping apparatus, or a plasma treatment apparatus.

As the impurity 855, for example, at least one element of a Group 13 element, a Group 15 element, and the like can be used. In the case where an oxide semiconductor is used for the semiconductor layer 842, it is possible to use at least one kind of element of a rare gas and hydrogen as the impurity 855.

A transistor 731 illustrated in FIG. 23A2 is different from the transistor 730 in that the electrode 823 and the insulating layer 827 are included. The transistor 731 includes the electrode 823 formed over the insulating layer 872 and the insulating layer 827 formed over the electrode 823. The electrode 823 can function as a back gate. Thus, the insulating layer 827 can function as a gate insulating layer. The insulating layer 827 can be formed using a material and a method similar to those of the insulating layer 826.

The transistor 731 as well as the transistor 711 has large on-state current for the area occupied thereby. That is, the area occupied by the transistor 731 can be small for required on-state current. With one embodiment of the present invention, the area occupied by a transistor can be reduced. Therefore, with one embodiment of the present invention, a semiconductor device having a high degree of integration can be provided.

A transistor 740 shown in FIG. 23B1 as an example is a type of top-gate transistor. The transistor 740 is different from the transistor 730 in that the semiconductor layer 842 is formed after the formation of the electrodes 844a and 844b. A transistor 741 illustrated in FIG. 23B2 is different from the transistor 740 in that the electrode 823 and the insulating layer 827 are included. Thus, in the transistors 740 and 741, part of the semiconductor layer 842 is formed over the electrode 844a and another part of the semiconductor layer 842 is formed over the electrode 844b.

The transistor 741 as well as the transistor 711 has a high on-state current for its area. That is, the area occupied by the transistor 741 can be small for required on-state current. With one embodiment of the present invention, the area occupied by a transistor can be reduced. Therefore, a semiconductor device having a high degree of integration can be provided.

<Structure Example 3>

A transistor 742 illustrated in FIG. 24A1 as an example is a type of top-gate transistor. The transistor 742 has the electrodes 844a and 844b over the insulating layer 829. The electrodes 844a and 844b are electrically connected to the semiconductor layer 842 through openings formed in the insulating layers 828 and 829.

Part of the insulating layer 826 that does not overlap with the electrode 866 is removed. The insulating layer 826 included in the transistor 742 is partly extended across the ends of the electrode 866.

The impurity 855 is added to the semiconductor layer 842 using the electrode 866 and the insulating layer 826 as masks, so that an impurity region can be formed in the semiconductor layer 842 in a self-aligned manner (see FIG. 24A3).

At this time, the impurity 855 is not added to the semiconductor layer 842 in a region overlapping with the electrode 866, and the impurity 855 is added to the semiconductor layer 842 in a region that does not overlap with the electrode 866. The semiconductor layer 842 in a region into which the impurity 855 is introduced through the insulating layer 826 has a lower impurity concentration than the semiconductor layer 842 in a region into which the impurity 855 is introduced without through the insulating layer 826. Thus, a lightly doped drain (LDD) region is formed in the semiconductor layer 842 in a region adjacent to the electrode 866 when seen from the above.

A transistor 743 illustrated in FIG. 24A2 is different from the transistor 742 in that the transistor 743 includes the electrode 823 under the semiconductor layer 842. The electrode 823 and the semiconductor layer 842 overlap with each other with the insulating layer 872 positioned therebetween. The electrode 823 can function as a back gate electrode.

As in a transistor 744 illustrated in FIG. 24B1 and a transistor 745 illustrated in FIG. 24B2, the insulating layer 826 in a region that does not overlap with the electrode 866 may be wholly removed. Alternatively, as in a transistor 746 illustrated in FIG. 24C1 and a transistor 747 illustrated in FIG. 24C2, the insulating layer 826 except for the openings may be left without being removed.

In the transistors 744 to 747, after the formation of the electrode 866, the impurity 855 is added to the semiconductor layer 842 using the electrode 866 as a mask, so that an impurity region can be formed in the semiconductor layer 842 in a self-aligned manner.

<Structure Example 4>

Figures 25A, 25B, 25C:
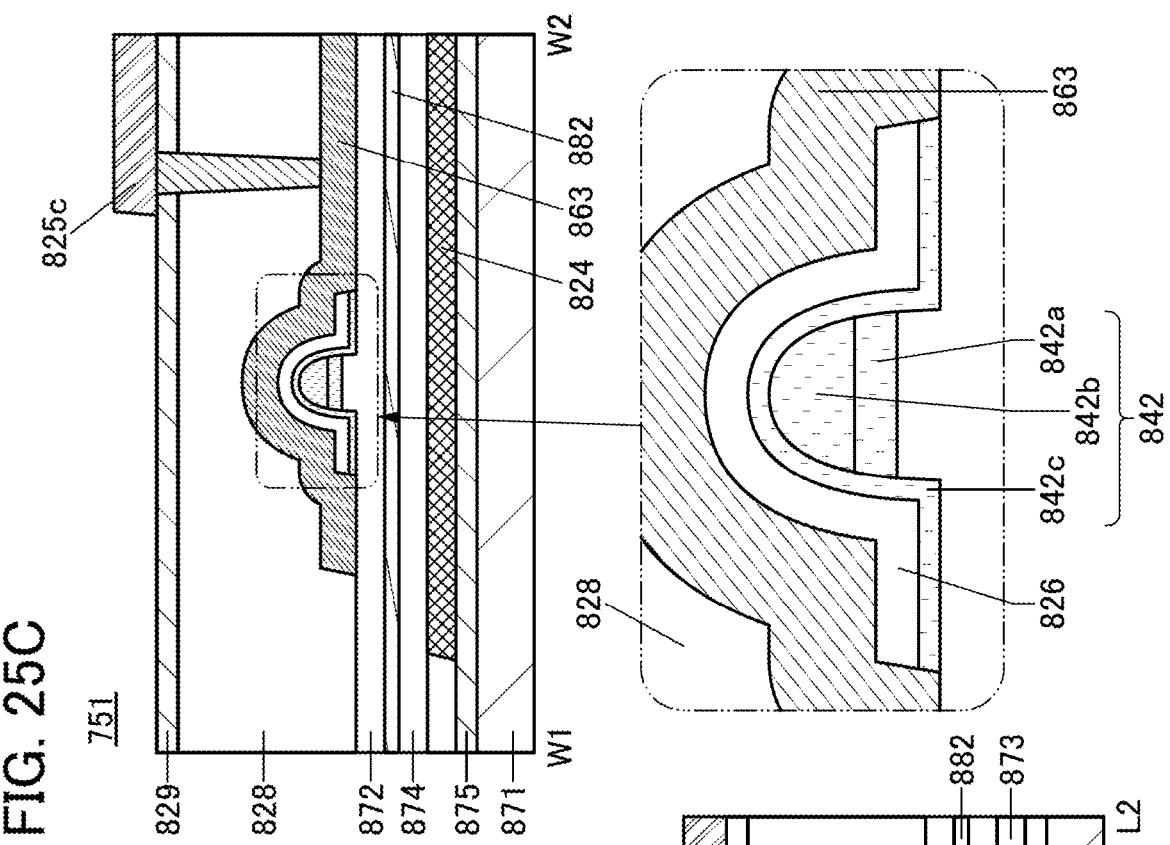
FIGS. 25A to 25C illustrate a structure example of a transistor.

FIGS. 25A to 25C illustrate an example of a structure of a transistor including an oxide semiconductor for the semiconductor layer 842. FIG. 25A is a top view of a transistor 751. FIG. 25B is a cross-sectional view (in the channel length direction) of a portion along the dashed-dotted line L1-L2 in FIG. 25A. FIG. 25C is a cross-sectional view (in the channel width direction) of a portion along the dash-dotted line W1-W2 in FIG. 25A.

The transistor 751 includes the semiconductor layer 842, the insulating layer 826, the insulating layer 872, an insulating layer 882, an insulating layer 874, an electrode 863, an electrode 824, the electrode 844a, and the electrode 844b. The electrode 863 can function as a gate, and the electrode 824 can function as a back gate. The insulating layer 826, the insulating layer 872, the insulating layer 882, and the insulating layer 874 each can function as a gate insulating layer. The electrode 844a can function as one of a source electrode and a drain electrode. The electrode 844b can function as the other of the source electrode and the drain electrode.

An insulating layer 875 is provided over the substrate 871, and the electrode 824 and an insulating layer 873 are provided over the insulating layer 875. Over the electrode 824 and the insulating layer 873, the insulating layer 874 is provided. Over the insulating layer 874, the insulating layer 882 is provided, and over the insulating layer 882, the insulating layer 872 is provided.

A semiconductor layer 842a is provided over a projection formed in the insulating layer 872, and a semiconductor layer 842b is provided over the semiconductor layer 842a. The electrode 844a and the electrode 844b are provided over the semiconductor layer 842b. A region in the semiconductor layer 842b which overlaps with the electrode 844a can function as one of a source and a drain of the transistor 751. A region in the semiconductor layer 842b which overlaps with the electrode 844b can function as the other of the source and the drain of the transistor 751.

In addition, a semiconductor layer 842c is provided to be in contact with part of the semiconductor layer 842b. The insulating layer 826 is provided over the semiconductor layer 842c, and the electrode 863 is provided over the insulating layer 826.

The transistor 751 has a structure in which a top surface and a side surface of the semiconductor layer 842b and a side surface of the semiconductor layer 842a are covered with the semiconductor layer 842c in the portion along W1-W2. With the semiconductor layer 842b provided on the projection of the insulating layer 872, the side surface of the semiconductor layer 842b can be covered with the electrode 863. Thus, the transistor 751 has a structure in which the semiconductor layer 842b can be electrically surrounded by electric field of the electrode 863. In this way, the structure of a transistor in which the semiconductor layer in which the channel is formed is electrically surrounded by the electric field of the conductive film is called a surrounded channel (s-channel) structure. A transistor having an s-channel structure is referred to as an s-channel transistor.

In the s-channel structure, a channel can be formed in the whole (bulk) of the semiconductor layer 842b. In the s-channel structure, the drain current of the transistor is increased, so that a larger amount of on-state current can be obtained. Furthermore, the entire channel formation region of the semiconductor layer 842b can be depleted by the electric field of the electrode 863. Accordingly, off-state current of the transistor with an s-channel structure can be further reduced.

When the projection of the insulating layer 872 is increased in height, and the channel width is shortened, the effects of the s-channel structure for increasing the on-state current and reducing the off-state current can be enhanced. Part of the semiconductor layer 842a exposed in the formation of the semiconductor layer 842b may be removed. In this case, the side surfaces of the semiconductor layer 842a and the semiconductor layer 842b may be aligned to each other.

The insulating layer 828 is provided over the transistor 751 and the insulating layer 829 is provided over the insulating layer 828. An electrode 825a, an electrode 825b, and an electrode 825c are provided over the insulating layer 829. The electrode 825a is electrically connected to the electrode 844a via a contact plug through an opening in the insulating layer 829 and the insulating layer 828. The electrode 825b is electrically connected to the electrode 844b via a contact plug through an opening in the insulating layer 829 and the insulating layer 828. The electrode 825c is electrically connected to the electrode 863 via a contact plug through an opening in the insulating layer 829 and the insulating layer 828.

Note that when the insulating layer 882 is formed using hafnium oxide, aluminum oxide, tantalum oxide, aluminum silicate, or the like, the insulating layer 882 can function as a charge trap layer. The threshold voltage of the transistor can be changed by injecting electrons into the insulating layer 882. For example, the injection of electrons into the insulating layer 882 can be performed with use of the tunnel effect. By applying a positive voltage to the electrode 824, tunnel electrons can be injected into the insulating layer 882.

<Energy Band Structure 1>

Figure 33A:
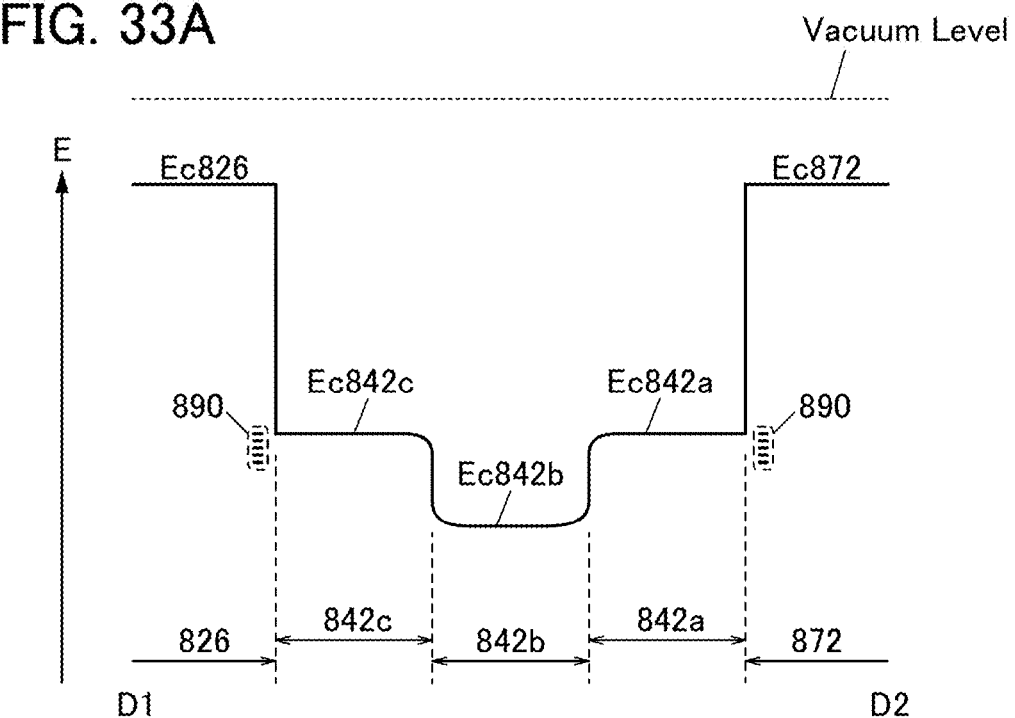
FIGS. 33A and 33B are energy band diagrams.

The function and effect of the semiconductor layer 842 that is a stacked layer including the semiconductor layers 842a, 842b, and 842c are described with an energy band structure diagrams shown in FIG. 33A. FIG. 33A illustrates the energy band structure of a portion along a circle D1-D2 in FIG. 25B. In other words, FIG. 33A illustrates the energy band structure of a channel formation region of the transistor 751.

In FIG. 33A, Ec872, Ec842a, Ec842b, Ec842c, and Ec826 indicate the energy of the conduction band minimum of the insulating layer 872, that of the semiconductor layer 842a, that of the semiconductor layer 842b, that of the semiconductor layer 842c, and that of the insulating layer 826, respectively.

Here, an electron affinity corresponds to a value obtained by subtracting a band gap from a difference in energy between the vacuum level and the valence band maximum (the difference is also referred to as "ionization potential"). Note that the band gap can be measured using a spectroscopic ellipsometer (UT-300 manufactured by HORIBA JOBIN YVON S.A.S.). The energy difference between the vacuum level and the valence band maximum can be measured using an ultraviolet photoelectron spectroscopy (UPS) device (VersaProbe manufactured by ULVAC-PHI, Inc.).

In the case of an In—Ga—Zn oxide formed using a target whose atomic ratio is In:Ga:Zn=1:3:2, the band gap is about 3.5 eV, and the electron affinity is about 4.5 eV. In the case of an In—Ga—Zn oxide formed using a target whose atomic ratio is In:Ga:Zn=1:3:4, the band gap is about 3.4 eV, and the electron affinity is about 4.5 eV. In the case of an In—Ga—Zn oxide formed using a target whose atomic ratio is In:Ga:Zn=1:3:6, the band gap is about 3.3 eV, and the electron affinity is about 4.5 eV. In the case of an In—Ga—Zn oxide formed using a target whose atomic ratio is In:Ga:Zn=1:6:2, the band gap is about 3.9 eV, and the electron affinity is about 4.3 eV. In the case of an In—Ga—Zn oxide formed using a target whose atomic ratio is In:Ga:Zn=1:6:8, the band gap is about 3.5 eV, and the electron affinity is about 4.4 eV. In the case of an In—Ga—Zn oxide formed using a target whose atomic ratio is In:Ga:Zn=1:6:10, the band gap is about 3.5 eV, and the electron affinity is about 4.5 eV. In the case of an In—Ga—Zn oxide formed using a target whose atomic ratio is In:Ga:Zn=1:1:1, the band gap is about 3.2 eV, and the electron affinity is about 4.7 eV. In the case of an In—Ga—Zn oxide formed using a target whose atomic ratio is In:Ga:Zn=3:1:2, the band gap is about 2.8 eV, and the electron affinity is about 5.0 eV.

Since the insulating layer 872 and the insulating layer 826 are insulators, Ec872 and Ec826 are closer to the vacuum level (have a smaller electron affinity) than Ec842a, Ec842b, and Ec842c.

Further, Ec842a is closer to the vacuum level than Ec842b is. Specifically, Ec842a is preferably located closer to the vacuum level than Ec842b by greater than or equal to 0.07 eV and less than or equal to 1.3 eV, further preferably greater than or equal to 0.1 eV and less than or equal to 0.7 eV, still further preferably greater than or equal to 0.15 eV and less than or equal to 0.4 eV.

Further, Ec842c is closer to the vacuum level than Ec842b is. Specifically, Ec842c is preferably located closer to the vacuum level than Ec842b by greater than or equal to 0.07 eV and less than or equal to 1.3 eV, further preferably greater than or equal to 0.1 eV and less than or equal to 0.7 eV, still further preferably greater than or equal to 0.15 eV and less than or equal to 0.4 eV.

Here, a mixed region of the semiconductor layer 842a and the semiconductor layer 842b exists between the semiconductor layer 842a and the semiconductor layer 842b in some cases. In addition, a mixed region of the semiconductor layer 842b and the semiconductor layer 842c exists between the semiconductor layer 842b and the semiconductor layer 842c in some cases. The mixed region has a low density of interface states. For that reason, the stack including the semiconductor layers 842a, 842b, and 842c has a band structure where energy at each interface and in the vicinity of the interface is changed continuously (continuous junction).

In this state, electrons move mainly in the semiconductor layer 842b, not in the semiconductor layers 842a and 842c. Thus, when the interface state density at the interface between the semiconductor layer 842a and the semiconductor layer 842b and the interface state density at the interface between the semiconductor layer 842b and the semiconductor layer 842c are decreased, electron movement in the semiconductor layer 842b is less likely to be inhibited and the on-state current of the transistor 751 can be increased.

Note that although trap states 890 due to impurities or defects might be formed in the vicinity of the interface between the semiconductor layer 842a and the insulating layer 872 and in the vicinity of the interface between the semiconductor layer 842c and the insulating layer 826, the semiconductor layer 842b can be apart from the trap states owing to the existence of the semiconductor layer 842a and the semiconductor layer 842c.

In the case where the transistor 751 has an s-channel structure, a channel is formed in the whole of the semiconductor layer 842b seen in the portion along W1-W2. Therefore, as the thickness of the semiconductor layer 842b is increased, the size of the channel region is increased. In other words, as the thickness of the semiconductor layer 842b is increased, the on-state current of the transistor 751 can be increased. For example, the semiconductor layer 842b has a region with a thickness greater than or equal to 10 nm, preferably greater than or equal to 40 nm, further preferably greater than or equal to 60 nm, still further preferably greater than or equal to 100 nm. Note that the semiconductor layer 842b has a region with a thickness of, for example, less than or equal to 300 nm, preferably less than or equal to 200 nm, or further preferably less than or equal to 150 nm because the productivity of the semiconductor device including the transistor 751 might be decreased. In some cases, when the channel formation region is reduced in size, the electrical characteristics of the transistor with a smaller thickness of the semiconductor layer 842b are higher than those of the transistor with a larger thickness of the semiconductor layer 842b. Therefore, the semiconductor layer 842b may have a thickness less than 10 nm.

Moreover, the thickness of the semiconductor layer 842c is preferably as small as possible to increase the on-state current of the transistor 751. For example, the semiconductor layer 842c may have a region with a thickness less than 10 nm, preferably less than or equal to 5 nm, further preferably less than or equal to 3 nm. Meanwhile, the semiconductor layer 842c has a function of blocking entry of elements other than oxygen (such as hydrogen and silicon) included in the adjacent insulator into the semiconductor layer 842b where a channel is formed. For this reason, it is preferable that the semiconductor layer 842c have a certain thickness. The semiconductor layer 842c may have a region with a thickness greater than or equal to 0.3 nm, preferably greater than or equal to 1 nm, further preferably greater than or equal to 2 nm, for example.

To improve the reliability, preferably, the thickness of the semiconductor layer 842a is large and the thickness of the semiconductor layer 842c is small. For example, the semiconductor layer 842a may have a region with a thickness greater than or equal to 10 nm, preferably greater than or equal to 20 nm, further preferably greater than or equal to 40 nm, still further preferably greater than or equal to 60 nm. When the thickness of the semiconductor layer 842a is made large, a distance from an interface between the adjacent insulator and the semiconductor layer 842a to the semiconductor layer 842b in which a channel is formed can be large. Since the productivity of the semiconductor device including the transistor 751 might be decreased, the semiconductor layer 842a has a region with a thickness, for example, less than or equal to 200 nm, preferably less than or equal to 120 nm, or further preferably less than or equal to 80 nm.

Note that silicon contained in the oxide semiconductor might serve as a carrier trap or a carrier generation source. Therefore, the silicon concentration in the semiconductor layer 842b is preferably as low as possible. For example, a region with the silicon concentration lower than $1 \times 10^{19}$ atoms/cm$^3$, preferably lower than $5 \times 10^{18}$ atoms/cm$^3$, further preferably lower than $2 \times 10^{18}$ atoms/cm$^3$ which is measured by secondary ion mass spectrometry (SIMS) is provided between the semiconductor layer 842b and the semiconductor layer 842a. A region with the silicon concentration of lower than $1 \times 10^{19}$ atoms/cm$^3$, preferably lower than $5 \times 10^{18}$ atoms/cm$^3$, further preferably lower than $2 \times 10^{18}$ atoms/cm$^3$ which is measured by SIMS is provided between the semiconductor layer 842b and the semiconductor layer 842c.

It is preferable to reduce the concentrations of hydrogen in the semiconductor layer 842a and the semiconductor layer 842c in order to reduce the concentration of hydrogen in the semiconductor layer 842b. The semiconductor layer 842a and the semiconductor layer 842c each have a region in which the concentration of hydrogen measured by SIMS is lower than or equal to $2 \times 10^{20}$ atoms/cm$^3$, preferably lower than or equal to $5 \times 10^{19}$ atoms/cm$^3$, further preferably lower than or equal to $1 \times 10^{19}$ atoms/cm$^3$, still further preferably lower than or equal to $5 \times 10^{18}$ atoms/cm$^3$. It is preferable to reduce the concentration of nitrogen in the semiconductor layer 842a and the semiconductor layer 842c in order to reduce the concentration of nitrogen in the semiconductor layer 842b. The semiconductor layer 842a and the semiconductor layer 842c each have a region in which the concentration of nitrogen measured by SIMS is lower than $5 \times 10^{19}$ atoms/cm$^3$, preferably less than or equal to $5 \times 10^{18}$ atoms/cm$^3$, further preferably less than or equal to $1 \times 10^{18}$ atoms/cm$^3$, still further preferably less than or equal to $5 \times 10^{17}$ atoms/cm$^3$.

Note that when copper enters the oxide semiconductor, an electron trap might be generated. The electron trap might shift the threshold voltage of the transistor in the positive direction. Therefore, the concentration of copper on the surface of or in the semiconductor layer 842b is preferably as low as possible. For example, the semiconductor layer 842b preferably has a region in which the concentration of copper is lower than or equal to $1 \times 10^{19}$ atoms/cm$^3$, lower than or equal to $5 \times 10^{18}$ atoms/cm$^3$, or lower than or equal to $1 \times 10^{18}$ atoms/cm$^3$.

The above three-layer structure is an example. For example, a two-layer structure without either one of the semiconductor layer 842a and the semiconductor layer 842c may be employed. A four-layer structure in which any one of the semiconductors described as examples of the semiconductor layer 842a, the semiconductor layer 842b, and the semiconductor layer 842c is provided below or over the semiconductor layer 842a or below or over the semiconductor layer 842c may be employed. A g-layer structure (g is an integer of 5 or more) may be included in which any one of the semiconductors described as examples of the semiconductor layers 842a, 842b, and 842c is provided at two or more of the following positions: over the semiconductor layer 842a, below the semiconductor layer 842a, over the semiconductor layer 842c, and below the semiconductor layer 842c may be employed.

In particular, in the transistor 751 described in this embodiment, an upper surface and a side surface of the semiconductor layer 842b are in contact with the semiconductor layer 842c, and a bottom surface of the semiconductor layer 842b is in contact with the semiconductor layer 842a. In this manner, the semiconductor layer 842b is surrounded by the semiconductor layer 842a and the semiconductor layer 842c, whereby the influence of the trap state can be further reduced.

Each of the band gaps of the semiconductor layer 842a and the semiconductor layer 842c is preferably larger than that of the semiconductor layer 842b.

With one embodiment of the present invention, a transistor with a small variation in electrical characteristics can be provided. Accordingly, a semiconductor device with a small variation in electrical characteristics can be provided. With one embodiment of the present invention, a transistor with high reliability can be provided. Accordingly, a semiconductor device with high reliability can be provided.

An oxide semiconductor has a band gap of 2 eV or more; thus, the off-state current of an OS transistor can be extremely small. Specifically, the off-state current per micrometer in channel width at room temperature (25° C.) and at a source—drain voltage of 3.5 V can be lower than $1\times10^{-20}$ A, lower than $1\times10^{-22}$ A, or lower than $1\times10^{-24}$ A. That is, the on/off ratio of the transistor can be greater than or equal to 20 digits and less than or equal to 150 digits. An OS transistor has high withstand voltage between its source and drain. With use of the OS transistor, a semiconductor device with high output voltage and high withstand voltage can be achieved.

With one embodiment of the present invention, a transistor with small power consumption can be provided. Accordingly, a semiconductor device with small power consumption can be provided.

Figure 26C:
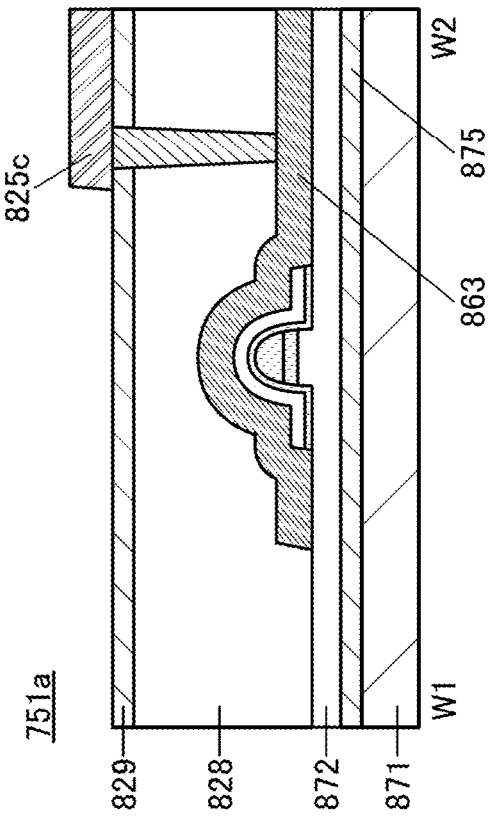
FIGS. 26A to 26C illustrate a structure example of a transistor.
Figure 26A:
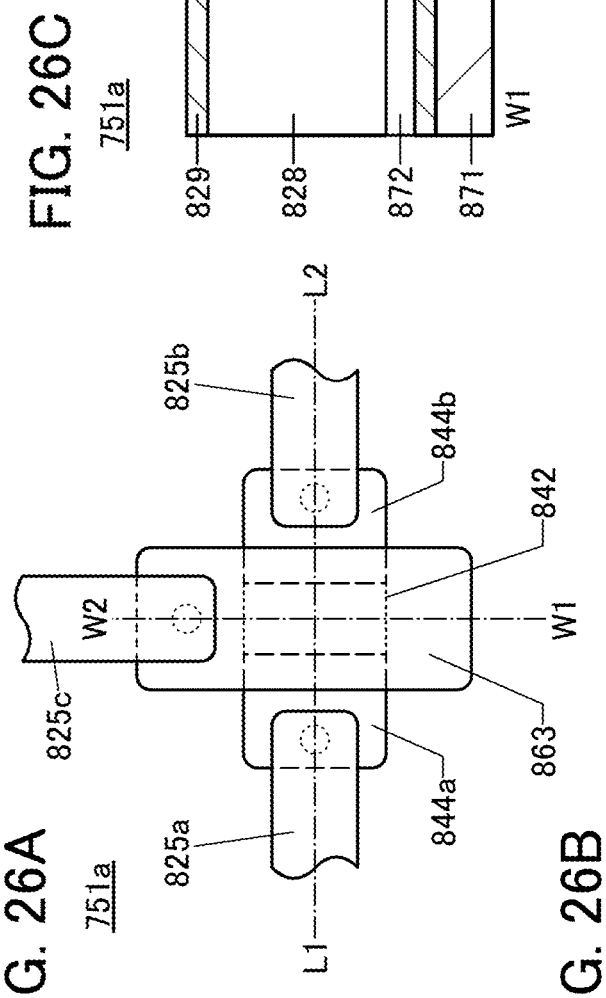
Figure 26B:
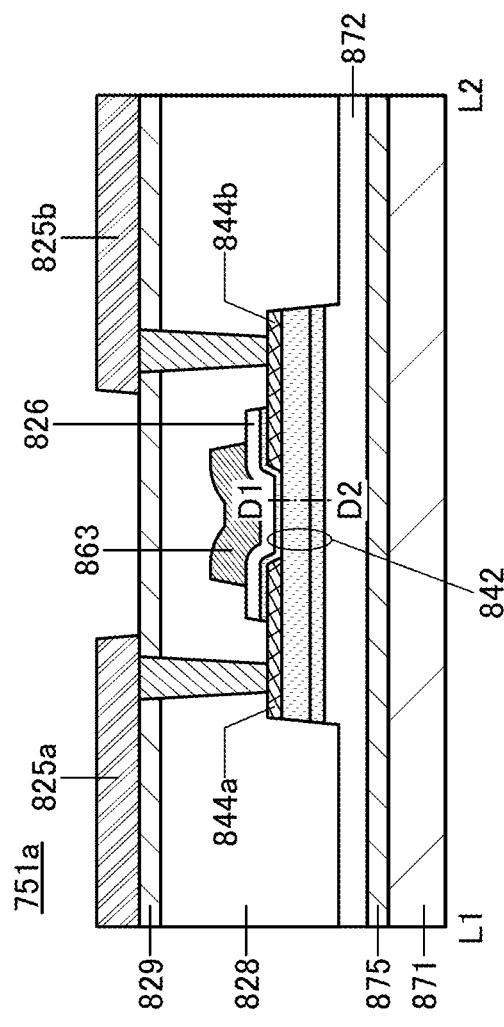

The electrode 824 that can function as a back gate is not necessary provided, depending on the purpose. FIG. 26A is a top view of a transistor 751a. FIG. 26B is a cross-sectional view of a portion indicated by the dashed-dotted line L1-L2 in FIG. 26A. FIG. 26C is a cross-sectional view of a portion indicated by the dashed-dotted line W1-W2 in FIG. 26A. The transistor 751a has a structure in which the electrode 824, the insulating layer 873, the insulating layer 874, and the insulating layer 882 are removed from the transistor 751. The productivity of the transistor can be improved by omission of the electrode and the insulating layers. Thus, the productivity of the semiconductor device can be improved.

Figure 27C:
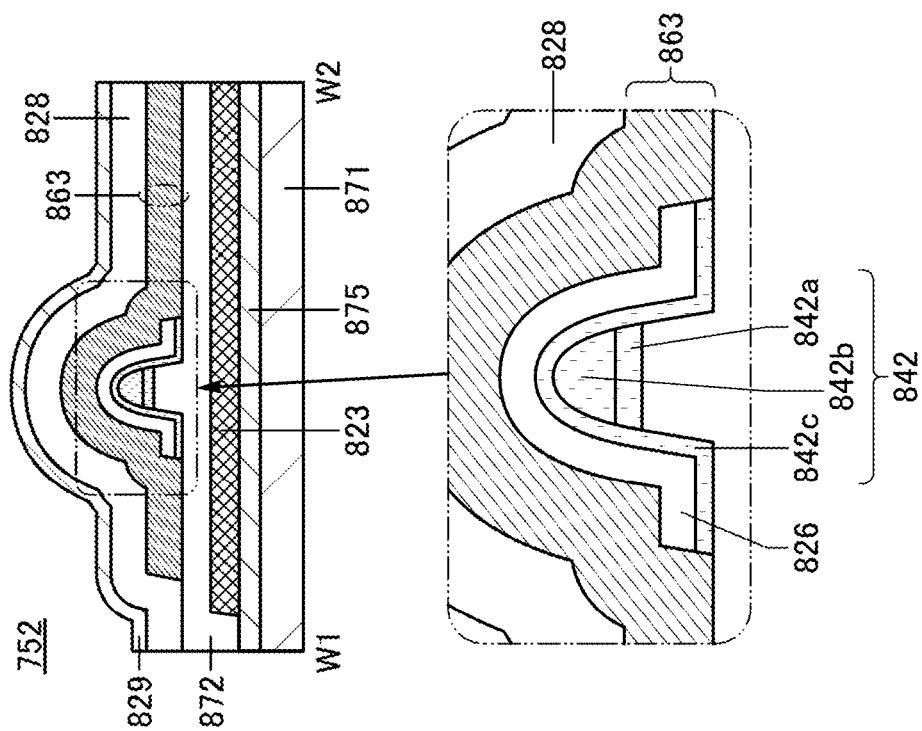
FIGS. 27A to 27C illustrate a structure example of a transistor.
Figure 27A:
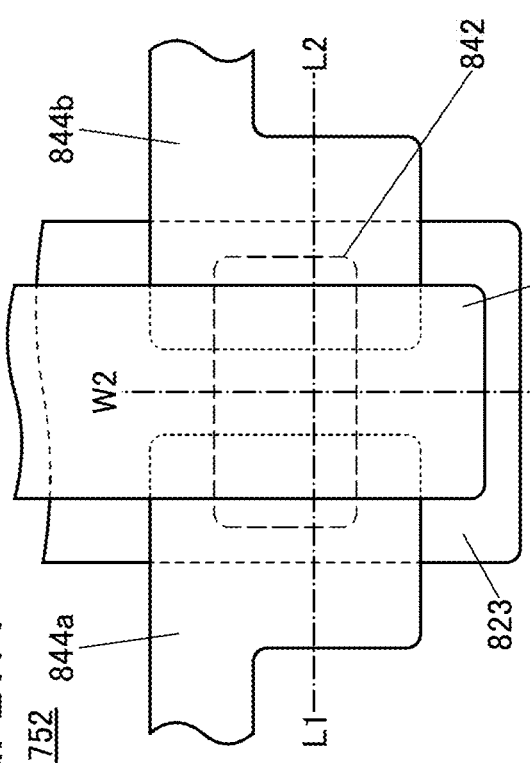
Figure 27B:
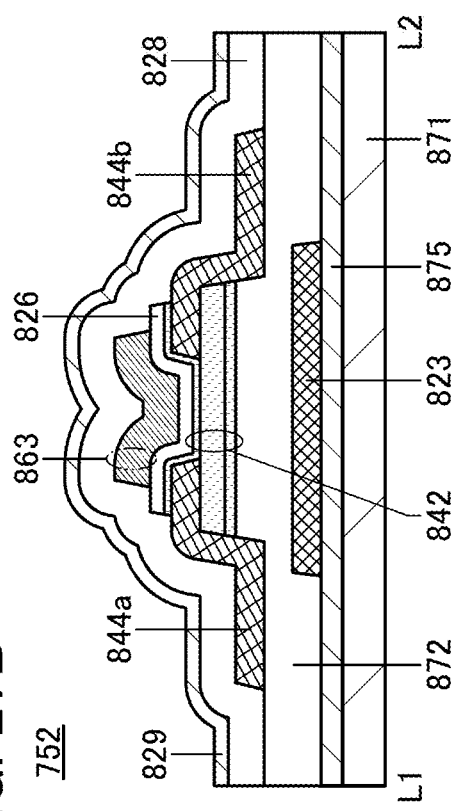

FIGS. 27A to 27C illustrate another example of an s-channel transistor. FIG. 27A is a top view of the transistor 752. FIG. 27B is a cross-sectional view of portions indicated by the dashed-dotted line L1-L2 and the dashed-dotted line W1-W2 in FIG. 27A.

Although the transistor 752 has a structure similar to that of the transistor 751, there is a different point in that the electrode 844a and the electrode 844b are in contact with the side surfaces of the semiconductor layer 842a and the semiconductor layer 842b. As the insulating layer 828 covering the transistor 752, an insulating layer with a flat surface such as that in the transistor 751 may be used. In addition, the electrode 825a, the electrode 825b, and the electrode 825c may be provided over the insulating layer 829.

Figure 28A:
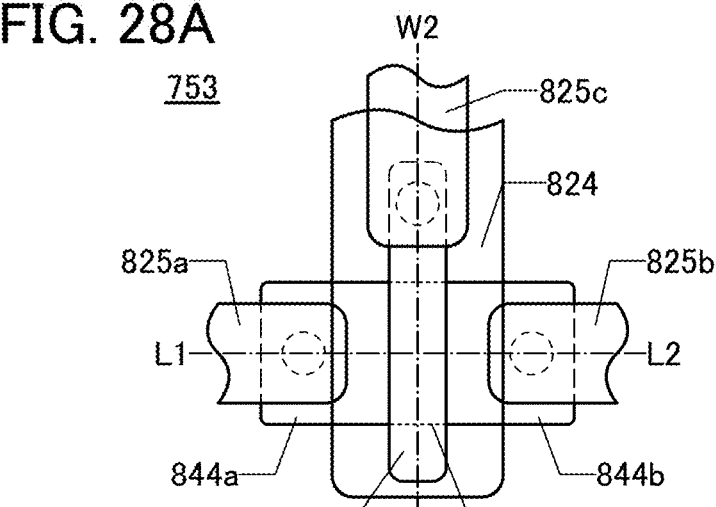
FIGS. 28A and 28B illustrate a structure example of a transistor.
Figure 28B:
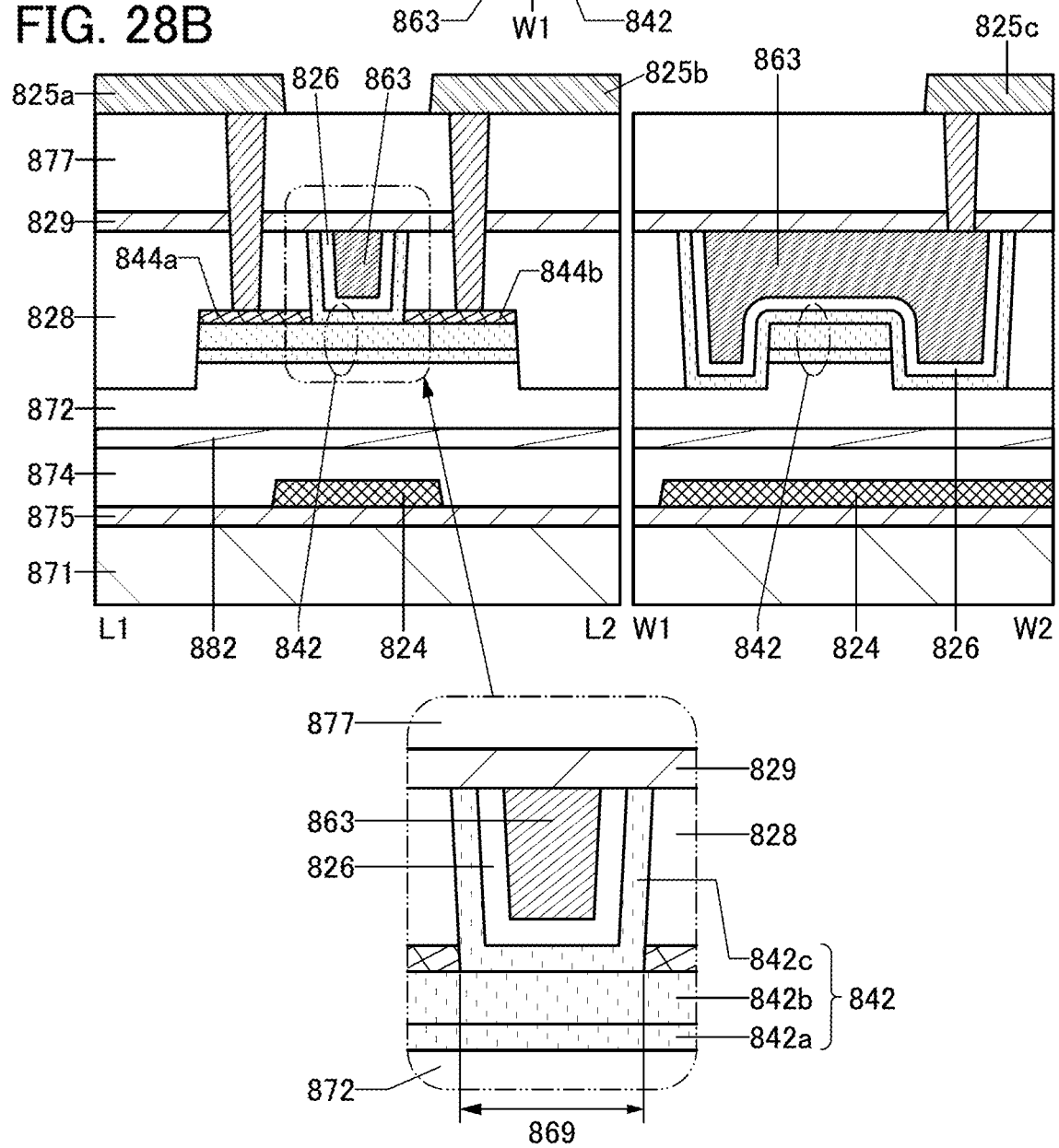

FIGS. 28A and 28B illustrate another example of an s-channel transistor. FIG. 28A is the top view of the transistor 753. FIG. 28B is a cross-sectional view of portions indicated by the dashed-dotted line L1-L2 and the dashed-dotted line W1-W2 in FIG. 28A. As in the transistor 751, the transistor 753 includes the semiconductor layer 842a and the semiconductor layer 842b over the projection of the insulating layer 872. The electrode 844a and the electrode 844b are provided over the semiconductor layer 842b. A region of the semiconductor layer 842b which overlaps with the electrode 844a can function as one of a source and a drain of the transistor 753. A region of the semiconductor layer 842b which overlaps with the electrode 844b can function as the other of the source and the drain of the transistor 753. Thus, a region 869 of the semiconductor layer 842b that is located between the electrodes 844a and 844b can function as a channel formation region.

In the transistor 753, an opening is provided in a region overlapping with the region 869 by removing part of the insulating layer 828, and the semiconductor layer 842c is provided along a side and bottom surfaces of the opening. In the opening, the insulating layer 826 is provided along the side and bottom surfaces of the opening with the oxide semiconductor layer 842c located therebetween. In the opening, the electrode 863 is provided along the side and bottom surfaces of the opening with the semiconductor layer 842c and the insulating layer 826 located therebetween.

Note that the opening is wider than the semiconductor layer 842a and the semiconductor layer 842b in the cross section in the channel width direction. Accordingly, the side surfaces of the semiconductor layers 842a and 842b in the region 869 are covered with the semiconductor layer 842c.

Over the insulating layer 828, the insulating layer 829 is provided, and over the insulating layer 829, the insulating layer 877 is provided. An electrode 825a, an electrode 825b, an electrode 825c are provided over the insulating layer 877. The electrode 825a is electrically connected to the electrode 844a via a contact plug in an opening formed by removing part of the insulating layers 877, 829, and 828. The electrode 825b is electrically connected to the electrode 844b via a contact plug in an opening formed by removing part of the insulating layers 877, 829, and 828. The electrode 825c is electrically connected to the electrode 863 via a contact plug in an opening formed by removing part of the insulating layers 877 and 829.

Figure 29A:
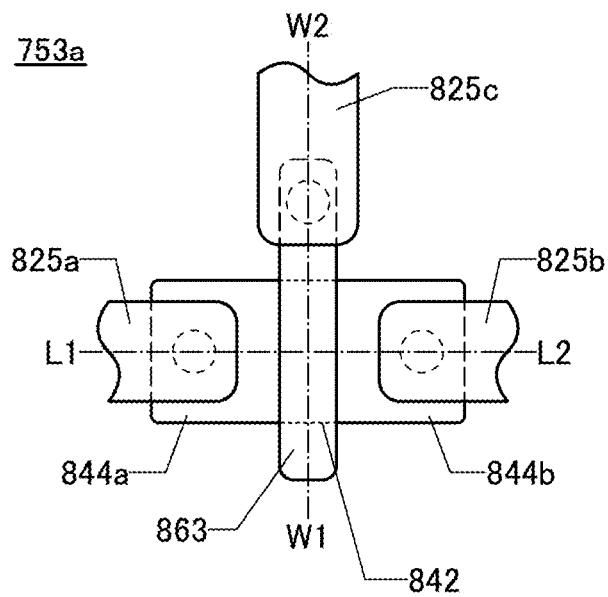
FIGS. 29A and 29B illustrate a structure example of a transistor.
Figure 29B:
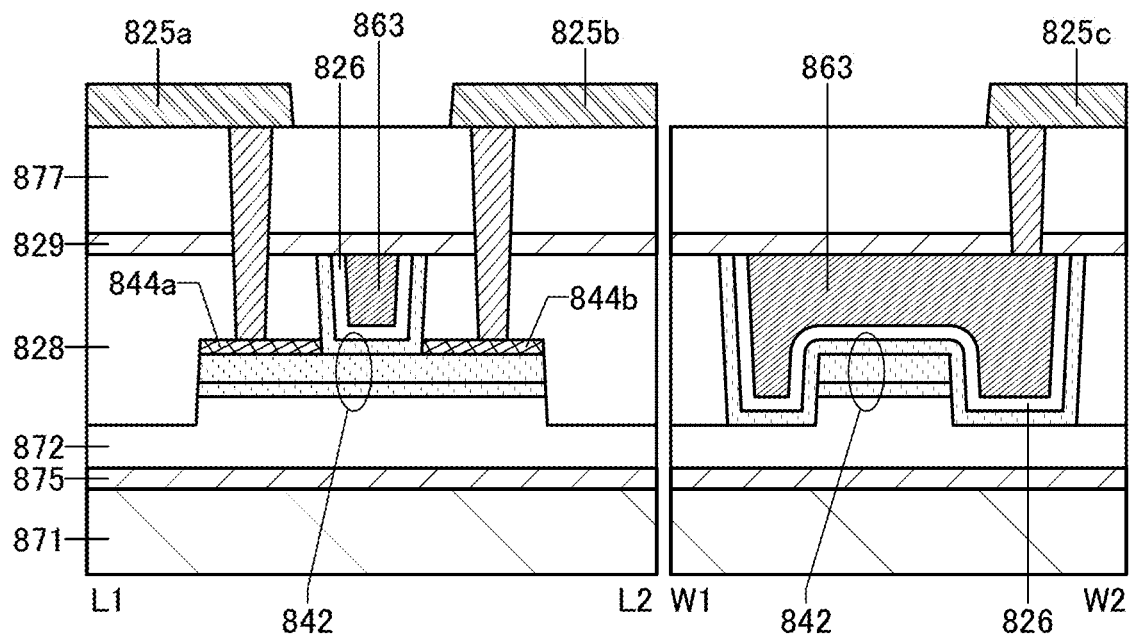

The electrode 824 that can function as a back gate is not necessarily provided, depending on the purpose. FIG. 29A is the top view of the transistor 753a. FIG. 29B is a cross-sectional view of portions indicated by the dashed-dotted line L1-L2 and the dashed-dotted line W1-W2 in FIG. 29A. The transistor 753a has a structure in which the electrode 824, the insulating layer 874, and the insulating layer 882 are removed from the transistor 753. The productivity of transistor can be improved by omission of the electrode and insulating layer. Accordingly, the productivity of the semiconductor device can be increased.

Figure 30A:
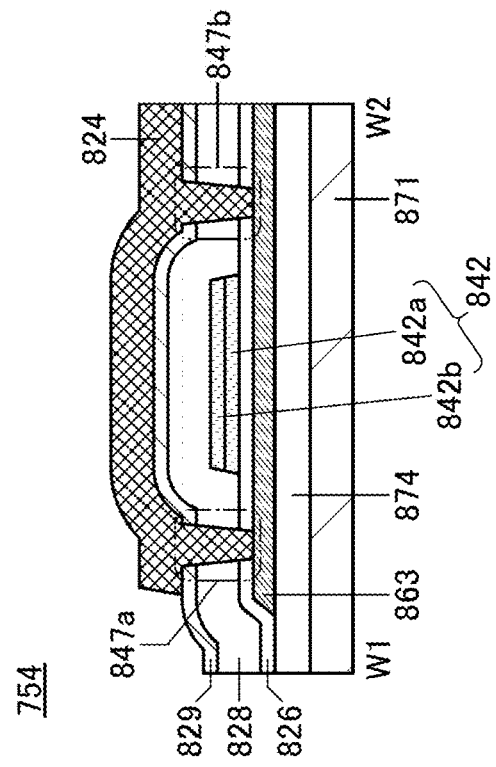
FIGS. 30A to 30C illustrate a structure example of a transistor.
Figure 30B:
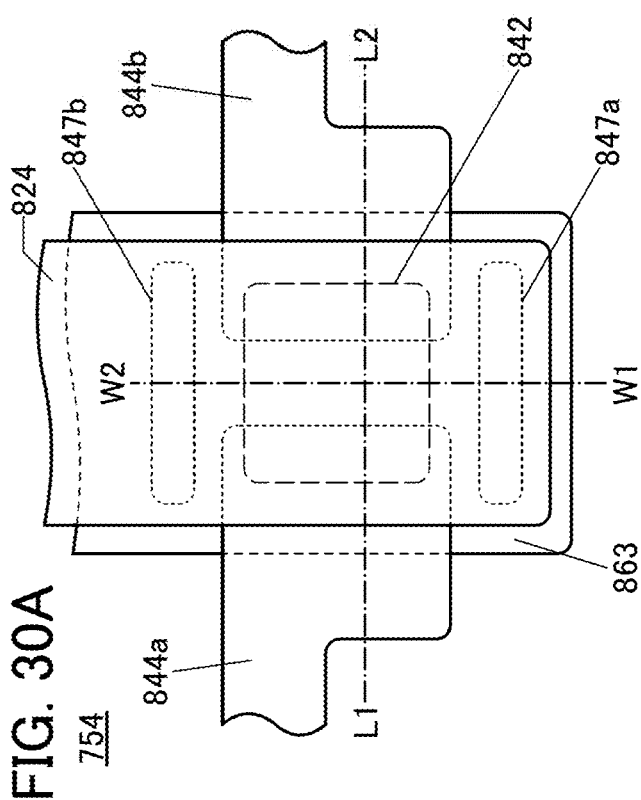
Figure 30C:
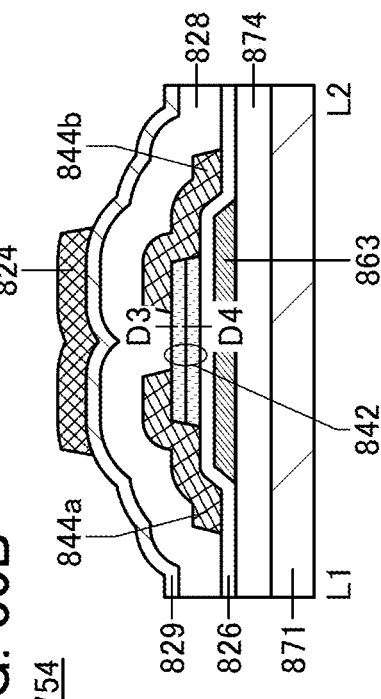

FIGS. 30A to 30C illustrate another example of an s-channel transistor. FIG. 30A is a top view of a transistor 754. FIG. 30B is a cross-sectional view of a portion indicated by the dashed-dotted line L1-L2 in FIG. 30A. FIG. 30C is a cross-sectional view of a portion indicated by the dashed-dotted line W1-W2 in FIG. 30A.

The transistor 754 is a kind of bottom-gate transistor having a back-gate electrode. In the transistor 754, the electrode 863 is formed over the insulating layer 874, and the insulating layer 826 is provided to cover the electrode 863. The semiconductor layer 842 is formed in a region that is over the insulating layer 826 and overlaps with the electrode 863. The semiconductor layer 842 in the transistor 754 has a stacked structure of the semiconductor layer 842a and the semiconductor layer 842b.

The electrode 844a and the electrode 844b are formed so as to be partly in contact with the semiconductor layer 842 and be over the insulating layer 826. The insulating layer 828 is formed so as to be partly in contact with the semiconductor layer 842 and be over the electrode 844a and the electrode 844b. The insulating layer 829 is formed over the insulating layer 828. The electrode 824 is formed in a region that is over the insulating layer 829 and overlaps with the semiconductor layer 842.

The electrode 824 provided over the insulating layer 829 is electrically connected to the electrode 863 in an opening 847a and an opening 847b provided in the insulating layer 829, the insulating layer 828, and the insulating layer 826.

Accordingly, the same potential is supplied to the electrodes 824 and 863. Furthermore, either or both of the openings 847*a* and 847*b* may be omitted. In the case where neither the opening 847*a* nor the opening 847*b* is provided, different potentials can be supplied to the electrode 824 and the electrode 863.

<Energy Band Structure 2>

Figure 33B:
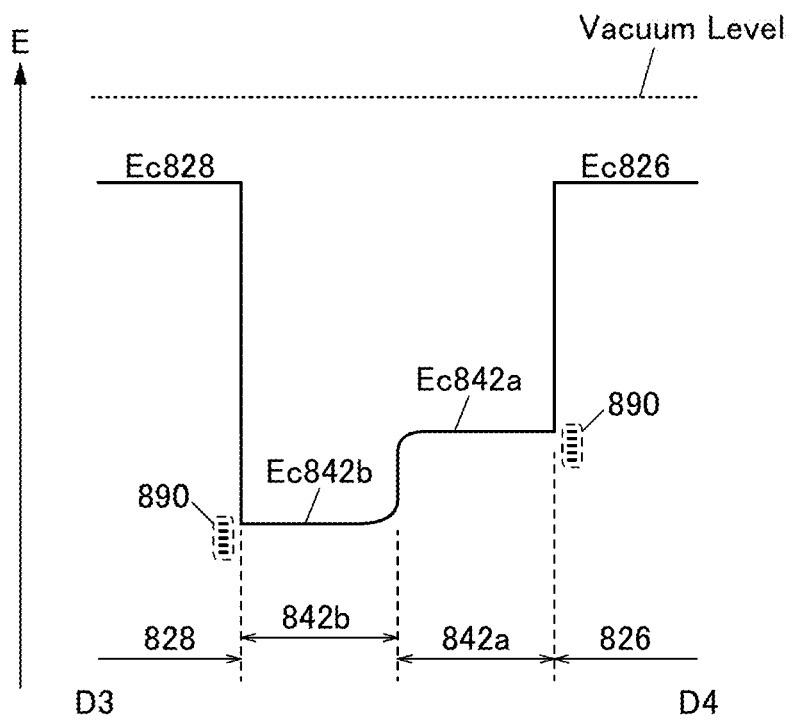

FIG. 33B is an energy band structure diagram showing a portion along a circle D3-D4 in FIG. 30B. FIG. 33B shows the energy band structure of a channel formation region of the transistor 754.

In FIG. 33B, Ec828 represents the energy of the conduction band minimum of the insulating layer 828. The semiconductor layer 842 is formed using two layers, the semiconductor layers 842*a* and 842*b*; thus, the transistor can be manufactured with improved productivity. Since the semiconductor layer 842*c* is not provided, the transistor including the two semiconductor layers may be easily affected by the trap states 890 but can have higher field-effect mobility than a transistor including one semiconductor layer as the semiconductor layer 842.

Figure 31A:
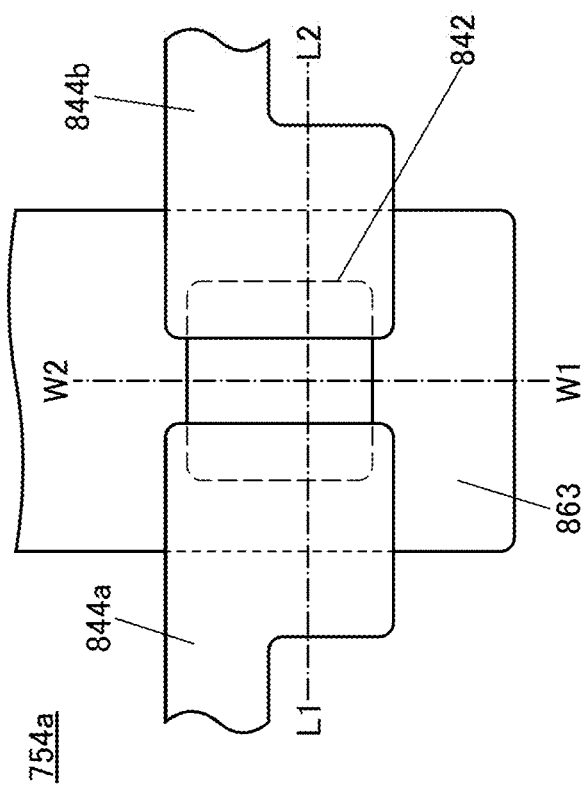
FIGS. 31A to 31C illustrate a structure example of a transistor.
Figure 31B:
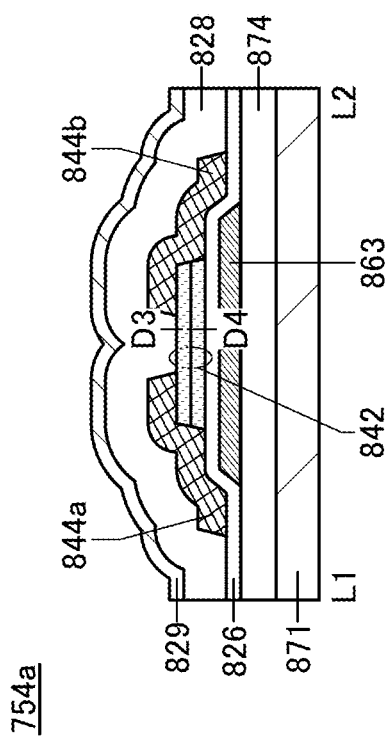
Figure 31C:
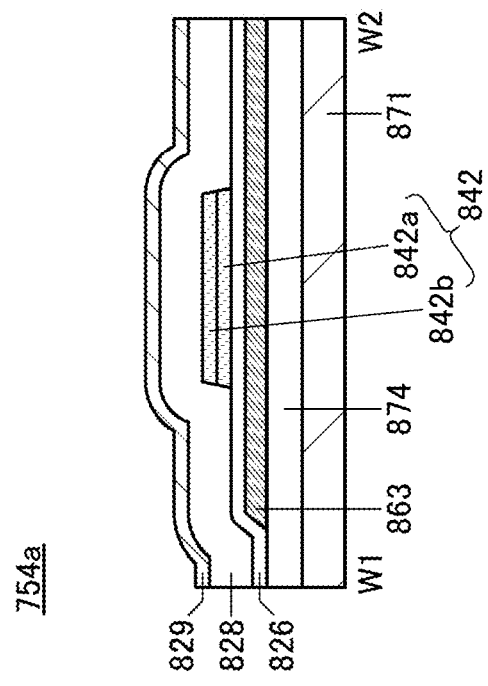

The electrode 824 that can function as a back gate is not necessarily provided, depending on the purpose. FIG. 31A is a top view of a transistor 754*a*. FIG. 31B and FIG. 31C are cross-sectional views of portions indicated by the dashed-dotted line L1-L2 and the dashed-dotted line W1-W2 in FIG. 31A. The transistor 754*a* has a structure in which the electrode 824, the opening 847*a*, and the opening 847*b* are removed from the transistor 754. The productivity of the transistor can be improved by omission of the electrode and the openings. Accordingly, the productivity of the semiconductor device can be improved.

FIGS. 32A to 32C illustrate an example of a transistor with an s-channel structure. A transistor 748 in FIGS. 32A to 32C has almost the same structure as the transistor 747. The transistor 748 is a kind of top-gate transistor having a back gate. FIG. 32A is a top view of the transistor 748. FIG. 32B is a cross-sectional view of a portion indicated by the dashed-dotted line L1-L2 in FIG. 32A. FIG. 32C is a cross-sectional view of a portion indicated by the dashed-dotted line W1-W2 in FIG. 32A.

FIGS. 32A to 32C illustrate an example in which an inorganic semiconductor layer such as a silicon layer is used as the semiconductor layer 842 in the transistor 748. In FIGS. 32A to 32C, the electrode 824 is provided over the substrate 871, and the insulating layer 872 is provided over the electrode 824. In addition, the semiconductor layer 842 is formed over a projection of the insulating layer 872.

The semiconductor layer 842 includes a semiconductor layer 842*i*, two semiconductor layers 842*t*, and two semiconductor layers 842*u*. The semiconductor layer 842*i* is sandwiched between the two semiconductor layers 842*t*. The semiconductor layer 842*i* and the two semiconductor layers 842*t* are sandwiched between the two semiconductor layers 842*u*. The electrode 863 is provided in a region overlapping with the semiconductor layer 842*i*.

A channel is formed in the semiconductor layer 842*i* when the transistor 748 is on. Therefore, the semiconductor layer 842*i* serves as a channel formation region. The semiconductor layers 842*t* serve as low concentration impurity regions (i.e., LDD regions). The semiconductor layers 842*u* serve as high concentration impurity regions. Note that one or both of the two semiconductor layers 842*t* are not necessarily provided. One of the two semiconductor layers 842*u* serves as a source region, and the other semiconductor layer 842*u* serves as a drain region.

The electrode 844*a* provided over the insulating layer 829 is electrically connected to one of the semiconductor layers 842*u* in an opening 847*c* formed in the insulating layers 826, 828, and 829. The electrode 844*b* provided over the insulating layer 829 is electrically connected to the other of the semiconductor layers 842*u* in an opening 847*d* formed in the insulating layers 826, 828, and 829.

The electrode 863 provided over the insulating layer 826 is electrically connected to the electrode 824 in the opening 847*a* and the opening 847*b* formed in the insulating layers 826 and 872. Accordingly, the same potential is supplied to the electrodes 863 and 824. Furthermore, either or both of the openings 847*a* and 847*b* may be omitted. In the case where neither the opening 847*a* nor the opening 847*b* is provided, different potentials can be applied to the electrodes 863 and 824.

<Film Formation Method>

The conductive layer such as the electrode, the insulating layer, and the semiconductor layer in this specification and the like can be formed by a chemical vapor deposition (CVD) method, an evaporation method, a sputtering method, or the like. The CVD method generally includes a plasma enhanced CVD (PECVD) method using plasma, a thermal CVD (TCVD) method using heat, and the like. In addition, there is an atmospheric pressure CVD (APCVD) for performing deposition under an atmospheric pressure. The CVD method can be further classified into a metal CVD (MCVD) method, a metal organic CVD (MOCVD) method, and the like according to a source gas to be used.

Furthermore, the evaporation method can be typically classified into a resistance heating evaporation method, an electron beam evaporation method, a molecular beam epitaxy (MBE) method, a pulsed laser deposition (PLD) method, an ion beam assisted deposition (IAD) method, an atomic layer deposition (ALD) method, and the like.

By using the PECVD method, a high-quality film can be formed at a relatively low temperature. By using a deposition method that does not use plasma for deposition, such as the MOCVD method or the evaporation method, a film can be formed with few defects because damage is not easily caused on a surface on which the film is deposited.

A sputtering method is generally classified into a DC sputtering method, a magnetron sputtering method, an RF sputtering method, an ion beam sputtering method, an electron cyclotron resonance (ECR) sputtering method, a facing-target sputtering method, and the like.

In the facing-target sputtering method, plasma is confined between the targets; thus, plasma damage to a substrate can be reduced. Furthermore, step coverage can be improved because an incident angle of a sputtered particle to the substrate can be made smaller depending on the inclination of the target.

Different from a film formation method whereby particles released from a target are deposited, a CVD method and an ALD method are film formation methods whereby a film is formed by a reaction at a surface of an object of the treatment. Thus, a CVD method and an ALD method enable favorable step coverage almost regardless of the shape of an object. In particular, an ALD method enables excellent step coverage and excellent thickness uniformity and can be favorably used for covering a surface of an opening with a high aspect ratio, for example. On the other hand, an ALD method has a relatively low deposition rate; thus, it is sometimes preferable to combine an ALD method with another deposition method with a high deposition rate such as a CVD method.

When a CVD method or an ALD method is used, composition of a film to be formed can be controlled with a flow rate ratio of the source gases. For example, by a CVD method or an ALD method, a film with a certain composition can be formed depending on a flow rate ratio of the source gases. Moreover, with a CVD method or an ALD method, by changing the flow rate ratio of the source gases while forming the film, a film whose composition is continuously changed can be formed. In the case where the film is formed while changing the flow rate ratio of the source gases, as compared to the case where the film is formed using a plurality of deposition chambers, time taken for the film formation can be reduced because time taken for transfer and pressure adjustment is skipped. Thus, transistors or semiconductor devices can be manufactured with improved productivity.

<Substrate>

There is no great limitation on a material used for the substrate 871. The material may be determined in accordance with the required characteristics; for example, whether it has light-transmitting property or not or heat resistance that can endure heat treatment or not is taken into consideration for the determination. For example, a glass substrate of barium borosilicate glass, aluminoborosilicate glass, or the like, a ceramic substrate, a quartz substrate, or a sapphire substrate can be used. Alternatively, a semiconductor substrate, a flexible substrate, an attachment film, a base film, or the like may be used as the substrate 871.

As the semiconductor substrate, a single material semiconductor substrate of silicon, germanium, or the like or a compound semiconductor substrate of silicon carbide, silicon germanium, gallium arsenide, indium phosphide, zinc oxide, or gallium oxide, or the like is used, for example. The semiconductor substrate may be a single-crystal semiconductor substrate or a polycrystalline semiconductor substrate.

As materials of the flexible substrate, the attachment film, and the base film, the following materials can be used: polyethylene terephthalate (PET), polyethylene naphthalate (PEN), polyether sulfone (PES), polytetrafluoroethylene (PTFE), polypropylene, polyester, polyvinyl fluoride, polyvinyl chloride, polyolefin, polyamide (e.g., nylon or aramid), polyimide, polycarbonate, aramid, an epoxy resin, an acrylic resin, and the like.

The flexible substrate used as the substrate 871 preferably has a lower coefficient of linear expansion because a lower coefficient of linear expansion suppresses deformation due to an environment. The flexible substrate used as the substrate 871 is formed using, for example, a material whose coefficient of linear expansion is lower than or equal to $1 \times 10^{-3}$/K, lower than or equal to $5 \times 10^{-5}$/K, or lower than or equal to $1 \times 10^{-5}$/K. In particular, aramid is preferably used for the flexible substrate because of its low coefficient of linear expansion.

<Insulating Layer>

Each of the insulating layers 822, 826, 828, 829, 872, 873, 874, 875, 877, and 882 can be formed with a single layer or a stack of layers of one or more materials selected from aluminum nitride, aluminum oxide, aluminum nitride oxide, aluminum oxynitride, magnesium oxide, silicon nitride, silicon oxide, silicon nitride oxide, silicon oxynitride, gallium oxide, germanium oxide, yttrium oxide, zirconium oxide, lanthanum oxide, neodymium oxide, hafnium oxide, tantalum oxide, aluminum silicate, and the like. Alternatively, a material in which two or more materials selected from an oxide material, a nitride material, an oxynitride material, and a nitride oxide material are mixed may be used.

Note that in this specification, a nitride oxide refers to a compound that includes more nitrogen than oxygen. An oxynitride refers to a compound that includes more oxygen than nitrogen. The content of each element can be measured by Rutherford backscattering spectrometry (RBS), for example.

It is particularly preferable that the insulating layer 875 and the insulating layer 829 be formed using an insulating material that is relatively impermeable to impurities. The insulating layers 875 and 829 may each be formed to have, for example, a single-layer structure or a stacked-layer structure including an insulating material containing boron, carbon, nitrogen, oxygen, fluorine, magnesium, aluminum, silicon, phosphorus, chlorine, argon, gallium, germanium, yttrium, zirconium, lanthanum, neodymium, hafnium, or tantalum. Examples of such an insulating material that is relatively impermeable to impurities include aluminum oxide, aluminum nitride, aluminum oxynitride, aluminum nitride oxide, gallium oxide, germanium oxide, yttrium oxide, zirconium oxide, lanthanum oxide, neodymium oxide, hafnium oxide, tantalum oxide, and silicon nitride. The insulating layer 875 or 829 may be formed using indium tin zinc oxide (In—Sn—Zn oxide) having an excellent insulating property or the like.

When the insulating material that is relatively impermeable to impurities is used for the insulating layer 875, impurity diffusion from the substrate 871 side can be suppressed, and the reliability of the transistor can be improved. When the insulating material that is relatively impermeable to impurities is used for the insulating layer 829, impurity diffusion from the insulating layer 829 side can be suppressed, and the reliability of the transistor can be improved.

A plurality of insulating layers formed using any of the above-described materials may be stacked as each of the insulating layers 822, 826, 828, 829, 872, 873, 874, 877, and 882. The formation method of the insulating layers 822, 826, 828, 829, 872, 873, 874, 877, and 882 is not particularly limited, and a sputtering method, a CVD method, an MBE method, a PLD method, an ALD method, a spin coating method, or the like can be used.

For example, in the case where aluminum oxide is formed by a thermal CVD method, two kinds of gases, e.g., $H_2O$ as an oxidizer and a source gas which is obtained by vaporizing a solvent and liquid containing an aluminum precursor compound (e.g., trimethylaluminum (TMA)) are used. Note that the chemical formula of trimethylaluminum is $Al(CH_3)_3$. Examples of another material liquid include tris(dimethylamide)aluminum, triisobutylaluminum, and aluminum tris (2,2,6,6-tetramethyl-3,5-heptanedionate).

In the case of forming a silicon oxide or a silicon oxynitride by a PECVD method, a deposition gas containing silicon and an oxidizing gas are preferably used as a source gas. Typical examples of the deposition gas containing silicon include silane, disilane, trisilane, and silane fluoride. Examples of the oxidizing gas include oxygen, ozone, dinitrogen monoxide, and nitrogen dioxide.

A silicon oxynitride film having few defects can be formed under the conditions that the flow rate of the oxidizing gas is greater than or equal to 20 times and less than 100 times, or greater than or equal to 40 times and less than or equal to 80 times the flow rate of the deposition gas and that the pressure in a treatment chamber is lower than or equal to 100 Pa or lower than or equal to 50 Pa.

A dense silicon oxide film or a dense silicon oxynitride film can be formed under the following conditions: the substrate placed in a treatment chamber is held at a temperature higher than or equal to 280° C. and lower than or equal to 400° C.; the pressure in the treatment chamber into which a source gas is introduced is set to be higher than or equal to 20 Pa and lower than or equal to 250 Pa, preferably higher than or equal to 100 Pa and lower than or equal to 250 Pa; and a high-frequency power is supplied to an electrode provided in the treatment chamber.

A silicon oxide or a silicon oxynitride can be formed by a CVD method using an organosilane gas. As the organosilane gas, any of the following silicon-containing compound can be used: tetraethyl orthosilicate (TEOS) (chemical formula: $Si(OC_2H_5)_4$); tetramethylsilane (TMS) (chemical formula: $Si(CH_3)_4$); tetramethylcyclotetrasiloxane (TMCTS); octamethylcyclotetrasiloxane (OMCTS); hexamethyldisilazane (HMDS); triethoxysilane ($SiH(OC_2H_5)_3$); trisdimethylaminosilane ($SiH(N(CH_3)_2)_3$); or the like. By a CVD method using an organosilane gas, the insulating layer having high coverage can be formed.

The insulating layer may be formed by a plasma CVD method using a microwave. A microwave refers to a wave in the frequency range of 300 MHz to 300 GHz. In a microwave, electron temperature is low and electron energy is low. Furthermore, in supplied power, the proportion of power used for acceleration of electrons is low, and therefore, power can be used for dissociation and ionization of more molecules. Thus, plasma with high density (high-density plasma) can be excited. This method causes little plasma damage to the deposition surface or a deposit, so that the insulating layer having few defects can be formed.

When an oxide semiconductor is used for the semiconductor layer 842, the hydrogen concentration in the insulating layers is preferably lowered in order to prevent an increase in the hydrogen concentration in the semiconductor layer 842. It is particularly preferable to lower the hydrogen concentration in the insulating layer in contact with the semiconductor layer 842. Specifically, the hydrogen concentration in the insulating layers, which is measured by SIMS, is lower than or equal to $2\times10^{20}$ atoms/cm$^3$, preferably lower than or equal to $5\times10^{19}$ atoms/cm$^3$, further preferably lower than or equal to $1\times10^{19}$ atoms/cm$^3$, still further preferably lower than or equal to $5\times10^{18}$ atoms/cm$^3$. Furthermore, the nitrogen concentration in the insulating layers is preferably lowered in order to prevent an increase in the nitrogen concentration in the semiconductor layer 842. It is particularly preferable to lower the nitrogen concentration of the insulating layer in contact with the semiconductor layer 842. Specifically, the nitrogen concentration in the insulating layers, which is measured by SIMS, is lower than $5\times10^{19}$ atoms/cm$^3$, preferably lower than or equal to $5\times10^{18}$ atoms/cm$^3$, further preferably lower than or equal to $1\times10^{18}$ atoms/cm$^3$, still further preferably lower than or equal to $5\times10^{17}$ atoms/cm$^3$.

The concentration measured by SIMS analysis may include a variation within a range of ±40%.

When an oxide semiconductor is used for the semiconductor layer 842, the insulating layers are preferably formed with insulating layers from which oxygen is released by heating (also referred to as an "insulating layer containing excess oxygen"). It is particularly preferable that an insulating layer in contact with the semiconductor layer 842 be an insulating layer containing excess oxygen. For example, the insulating layer is preferably an insulating layer of which the amount of released oxygen converted into oxygen atoms is greater than or equal to $1.0\times10^{18}$ atoms/cm$^3$, preferably greater than or equal to $3.0\times10^{20}$ atoms/cm$^3$ in TDS analysis in which heat treatment is performed so that the surface temperature of the insulating layer is higher than or equal to 100° C. and lower than or equal to 700° C., preferably higher than or equal to 100° C. and lower than or equal to 500° C.

The insulating layer containing excess oxygen can be formed by performing treatment for adding oxygen to an insulating layer. The treatment for adding oxygen can be performed by heat treatment under an oxygen atmosphere or performed with an ion implantation apparatus, an ion doping apparatus, or a plasma treatment apparatus. As a gas for adding oxygen, an oxygen gas of $^{16}O_2$, $^{18}O_2$, or the like, a nitrous oxide gas, an ozone gas, or the like can be used. In the case where oxygen is added by plasma treatment in which oxygen is excited by a microwave to generate high-density oxygen plasma, the amount of oxygen added to the insulating layer can be increased. In this specification, the treatment for adding oxygen is also referred to as "oxygen doping treatment".

The formation of an insulating layer by sputtering in an atmosphere including oxygen allows introduction of oxygen into the insulating layer.

Generally, a capacitor has such a structure that a dielectric is sandwiched between two electrodes that face each other, and as the thickness of the dielectric is smaller (as the distance between the two facing electrodes is shorter) or as the dielectric constant of the dielectric is higher, the capacitance becomes higher. However, if the thickness of the dielectric is reduced in order to increase the capacitance of the capacitor, because of a tunnel effect or the like, current unintentionally flowing between the two electrodes (hereinafter also referred to as "leakage current") tends to increase and the withstand voltage of the capacitor tends to be lower.

A portion where a gate electrode, a gate insulating layer, and a semiconductor layer of a transistor overlap with each other functions as the capacitor (hereinafter also referred to as "gate capacitor"). A channel is formed in a region in the semiconductor layer, which overlaps with the gate electrode with the gate insulating layer provided therebetween. That is, the gate electrode and the channel formation region function as two electrodes of the capacitor. Furthermore, the gate insulating layer functions as a dielectric of the capacitor. Although it is preferable that the capacitance of the gate capacitor be as high as possible, a reduction in the thickness of the gate insulating layer for the purpose of increasing the capacitance increases the probability of occurrence of an increase in the leakage current or a reduction in the withstand voltage.

In the case where a high-k material such as hafnium silicate ($HfSi_xO_y$ (x>0, y>0)), hafnium silicate to which nitrogen is added ($HfSi_xO_yN_z$ (x>0, y>0, z>0)), hafnium aluminate to which nitrogen is added ($HfAl_xO_yN_z$ (x>0, y>0, z>0)), hafnium oxide, or yttrium oxide is used as the dielectric, even if the thickness of the dielectric is made thick, sufficient capacitance of the capacitor can be ensured.

For example, in the case where a high-k material with a high dielectric constant is used as the dielectric, even when the dielectric is made thick, a capacitance equivalent to that in the case of using silicon oxide as the dielectric can be obtained. This enables a reduction in leakage current between the two electrodes of the capacitor. The dielectric may have a stacked-layer structure of the high-k material and another insulating material.

The insulating layer 828 has a flat surface. As the insulating layer 828, an organic material having heat resistance, such as polyimide, an acrylic-based resin, a benzocyclobutene-based resin, polyamide, or an epoxy-based resin, can be used as well as the above-mentioned insulating materials. Other than such organic materials, it is possible to use a low-dielectric constant material (a low-k material), a siloxane-based resin, phosphosilicate glass (PSG), borophosphosilicate glass (BPSG), or the like. Note that a plurality of insulating layers formed of these materials may be stacked to form the insulating layer 828.

Note that the siloxane-based resin corresponds to a resin including an Si—O—Si bond formed using a siloxane-based material as a starting material. The siloxane-based resin may include, as a substituent, an organic group (e.g., an alkyl group or an aryl group) or a fluoro group. The organic group may include a fluoro group.

There is no particular limitation on the method for forming the insulating layer 828, and any of the following methods that depend on a material thereof can be used: a sputtering method; an SOG method; spin coating; dipping; spray coating; a droplet discharging method (e.g., an ink-jet method); a printing method (e.g., screen printing, or offset printing); or the like.

The sample surface may be subjected to CMP treatment. The CMP treatment can reduce unevenness of the surface, whereby coverage with an insulating layer or a conductive layer to be formed later can be increased.

<Semiconductor Layer>

A single-crystal semiconductor, a polycrystalline semiconductor, a microcrystalline semiconductor, an amorphous semiconductor, or the like may be used for the semiconductor layer 842. As a semiconductor material, silicon, germanium, or the like can be used. Alternatively, a compound semiconductor of silicon germanium, silicon carbide, gallium arsenide, an oxide semiconductor, a nitride semiconductor, or the like, an organic semiconductor, or the like may be used.

In the case of using an organic semiconductor for the semiconductor layer 842, a low molecular organic material having an aromatic ring, a π-electron conjugated conductive polymer, or the like can be used. For example, rubrene, tetracene, pentacene, perylenediimide, tetracyanoquinodimethane, polythiophene, polyacetylene, or polyparaphenylene vinylene can be used.

As described above, the band gap of an oxide semiconductor is 2 eV or wider; thus, when the oxide semiconductor is used for the semiconductor layer 842, a transistor with an extremely low off-state current can be provided. An OS transistor has high withstand voltage between its source and drain. Thus, a transistor with high reliability can be provided. Furthermore, a transistor with high output voltage and high withstand voltage can be provided. Furthermore, a semiconductor device or the like with high reliability can be provided. Furthermore, a semiconductor device with high output voltage and high withstand voltage can be provided.

Alternatively, for example, a transistor including silicon having crystallinity in a semiconductor layer in which a channel is formed (also referred to as a "crystalline Si transistor") tends to obtain relatively high mobility as compared to the OS transistor. On the other hand, the crystalline Si transistor has difficulty in obtaining extremely small off-state current unlike the OS transistor. Thus, it is important that the semiconductor material used for the semiconductor layer be selected depending on the purpose and the usage. For example, depending on the purpose and the usage, the OS transistor and the crystalline Si transistor may be used in combination.

In this embodiment, the case where an oxide semiconductor is used for the semiconductor layer 842 is described. For the oxide semiconductor used for the semiconductor layer 842, an oxide semiconductor containing, for example, indium (In) is preferably used. An oxide semiconductor can have a high carrier mobility (electron mobility) by containing indium, for example. An oxide semiconductor preferably contains an element M.

The element M is preferably aluminum, gallium, yttrium, tin, or the like. Other elements which can be used as the element M are boron, silicon, titanium, iron, nickel, germanium, zirconium, molybdenum, lanthanum, cerium, neodymium, hafnium, tantalum, tungsten, magnesium, and the like. Note that two or more of the above elements may be used in combination as the element M The element M is an element having a high bonding energy with oxygen, for example. The element M increases the energy gap of the oxide semiconductor, for example. Furthermore, the oxide semiconductor preferably contains zinc. When the oxide semiconductor contains zinc, the oxide semiconductor is easily crystallized in some cases.

Note that the oxide semiconductor used for the semiconductor layer 842 is not limited to the oxide containing indium. The oxide semiconductor may be, for example, an oxide semiconductor which does not contain indium and contains zinc, an oxide semiconductor which does not contain indium and contains gallium, or an oxide semiconductor which does not contain indium and contains tin, e.g., a zinc tin oxide, a gallium tin oxide, or gallium oxide.

For example, in the case where an InGaZnO$_x$ (X>0) film is formed by a thermal CVD method as the semiconductor layer 842, trimethylindium (In(CH$_3$)$_3$), trimethylgallium (Ga(CH$_3$)$_3$), and dimethylzinc (Zn(CH$_3$)$_2$) are used. Without limitation to the above combination, triethylgallium (Ga(C$_2$H$_5$)$_3$) can be used instead of trimethylgallium, and diethylzinc (Zn(C$_2$H$_5$)$_2$) can be used instead of dimethylzinc.

For example, in the case where an InGaZnO$_x$ (X>0) film is formed as the semiconductor layer 842 by an ALD method, an In(CH$_3$)$_3$ gas and an O$_3$ gas are used to form an InO$_2$ layer, a Ga(CH$_3$)$_3$ gas and an O$_3$ gas are used to form a GaO layer, and then, a Zn(CH$_3$)$_2$ gas and an O$_3$ gas are used to form a ZnO layer. Note that the order of these layers is not limited to this example. A mixed compound layer such as an InGaO2 layer, an InZnO2 layer, a GaInO layer, a ZnInO layer, or a GaZnO layer may be formed using these gases. Note that although an H$_2$O gas which is obtained by bubbling water with an inert gas such as Ar may be used instead of an O$_3$ gas, it is preferable to use an O$_3$ gas, which does not contain H. Instead of an In(CH$_3$)$_3$ gas, an In(C$_2$H$_5$)$_3$ gas or tris(acetylacetonato)indium may be used. Note that tris(acetylacetonato)indium is also referred to as In(acac)$_3$. Instead of a Ga(CH$_3$)$_3$ gas, a Ga(C$_2$H$_5$)$_3$ gas or tris(acetylacetonato)gallium may be used. Note that tris(acetylacetonato)gallium is also referred to as Ga(acac)$_3$. Furthermore, a Zn(CH$_3$)$_2$ gas or zinc acetate may be used. However, the deposition gas is not limited to these.

In the case where the oxide semiconductor is formed by a sputtering method, a target containing indium is preferably used in order to reduce the number of particles. In addition, if an oxide target having a high atomic ratio of the element M is used, the conductivity of the target may be decreased. Particularly in the case where a target containing indium is used, the conductivity of the target can be increased and DC discharge or AC discharge is facilitated; thus, deposition over a large substrate can be easily performed. Thus, semiconductor devices can be manufactured with improved productivity.

As described above, in the case where the oxide semiconductor is formed by a sputtering method, the atomic ratio of In to M and Zn contained in the target may be 3:1:1, 3:1:2, 3:1:4, 1:1:0.5, 1:1:1, 1:1:2, 1:4:4, 5:1:7, 4:2:4.1, or a ratio close to these ratios, for example.

In the case where an oxide semiconductor is formed by a sputtering method, the oxide semiconductor is deposited at a substrate temperature higher than or equal to 150° C. and lower than or equal to 750° C., higher than or equal to 150° C. and lower than or equal to 450° C., or higher than or equal to 200° C. and lower than or equal to 350° C., whereby the crystallinity of the oxide semiconductor can be increased.

When the oxide semiconductor is formed by a sputtering method, an oxide semiconductor having an atomic ratio different from the atomic ratio of the target may be deposited. Especially for zinc, the atomic ratio of zinc in the deposited film is smaller than the atomic ratio of the target in some cases. Specifically, the film has an atomic ratio of zinc of 40atomic % to 90 atomic % of the atomic ratio of zinc in the target.

Each of the semiconductor layer 842a, the semiconductor layer 842b, and the semiconductor layer 842c is preferably formed using a material containing either In or Ga or both of them. Typical examples are an In—Ga oxide (an oxide containing In and Ga), an In—Zn oxide (an oxide containing In and Zn), and an In—M—Zn oxide (an oxide containing In, an element M, and Zn: the element M is one or more kinds of elements selected from Al, Ti, Ga, Y, Zr, La, Ce, Nd, and Hf and has a higher strength of bonding with oxygen than In has).

The semiconductor layer 842a and the semiconductor layer 842c are preferably formed using a material containing one or more kinds of metal elements contained in the semiconductor layer 842b. With the use of such a material, interface states at interfaces between the semiconductor layer 842a and the semiconductor layer 842b and between the semiconductor layer 842c and the semiconductor layer 842b are less likely to be generated. Accordingly, carriers are not likely to be scattered or captured at the interfaces, which results in an improvement in field-effect mobility of the transistor. Furthermore, threshold-voltage variation of the transistor can be reduced. Thus, a semiconductor device having favorable electrical characteristics can be obtained.

In the case where the semiconductor layer 842b is an In-M-Zn oxide and the semiconductor layers 842a and 842c are each an In-M-Zn oxide, the semiconductor layers 842a and 842c each have the atomic ratio where $In:M:Zn=x_1:y_1:z_1$, and the semiconductor layer 842b has an atomic ratio where $In:M:Zn=x_2:y_2:z_2$, for example. In that case, the compositions of the semiconductor layers 842a, 842c, and 842b can be determined so that $y_1/x_1$ is larger than $y_2/x_2$. It is preferable that the compositions of the semiconductor layer 842a, the semiconductor layer 842c, and the semiconductor layer 842b are determined so that $y_1/x_1$ is 1.5 times or more as large as $y_2/x_2$. It is further preferable that the compositions of the semiconductor layer 842a, the semiconductor layer 842c, and the semiconductor layer 842b are determined so that $y_1/x_1$ is twice or more as large as $y_2/x_2$. It is still further preferable that the compositions of the semiconductor layer 842a, the semiconductor layer 842c, and the semiconductor layer 842b are determined so that $y_1/x_1$ is three times or more as large as $y_2/x_2$. It is preferred that $y_1$ be larger than or equal to $x_1$ because the transistor can have stable electrical characteristics. However, when $y_1$ is three times or more as large as $x_1$, the field-effect mobility of the transistor is reduced; accordingly, $y_1$ is preferably smaller than three times $x_1$. When the semiconductor layer 842a and the semiconductor layer 842c have the above compositions, the semiconductor layer 842a and the semiconductor layer 842c can each be a layer in which oxygen vacancies are less likely to be generated than in the semiconductor layer 842b.

In the case where the semiconductor layers 842a and 842c are each an In-M-Zn oxide, when the summation of In and the element M is assumed to be 100 atomic %, the atomic percentages of In and an element M are preferably as follows: the percentage of In is lower than 50 atomic % and the percentage of M is higher than or equal to 50 atomic %. The percentages of In and M are more preferably as follows: the percentage of In is lower than 25 atomic % and the percentage of M is higher than or equal to 75 atomic %. In the case where the semiconductor layer 842b is an In-M-Zn oxide, when the summation of In and M is assumed to be 100 atomic %, the atomic percentages of In and the element M are preferably more than or equal to 25 atomic % and less than 75 atomic %, respectively, further preferably more than or equal to 34 atomic % and less than 66 atomic %, respectively.

For example, an In—Ga—Zn oxide which is formed using a target having an atomic ratio of In:Ga:Zn=1:3:2, 1:3:4, 1:3:6, 1:4:5, 1:6:4, 1:9:6, or the atomic ratio close to these ratios, an In—Ga oxide which is formed using a target having an atomic ratio of In:Ga=1:9, or gallium oxide can be used for each of the semiconductor layer 842a and the semiconductor layer 842c containing In or Ga. Furthermore, an In—Ga—Zn oxide which is formed using a target having an atomic ratio of In:Ga:Zn=3:1:2, 1:1:1, 5:5:6, 5:1:7, 4:2:4.1, or an atomic ratio close to these ratios can be used for the semiconductor layer 842b. Note that the atomic ratio of each of the semiconductor layer 842a, the semiconductor layer 842b, and the semiconductor layer 842c may vary within a range of ±20% of any of the above-described atomic ratios as an error.

In order to give stable electrical characteristics to the OS transistor, it is preferable that impurities and oxygen vacancies in the oxide semiconductor layer be reduced to highly purify the oxide semiconductor layer so that the semiconductor layer 842 can be regarded as an intrinsic or substantially intrinsic oxide semiconductor layer. Furthermore, it is preferable that at least the channel formation region of the semiconductor layer 842 can be regarded as an intrinsic or substantially intrinsic oxide semiconductor layer.

It is preferable that impurities and oxygen vacancies in the semiconductor layer 842b be reduced to obtain a highly purified oxide semiconductor layer; accordingly, the semiconductor layer 842b can be regarded as an intrinsic or substantially intrinsic oxide semiconductor layer. Furthermore, it is preferable that at least the channel formation region of the semiconductor layer 842b be regarded as an intrinsic or substantially intrinsic semiconductor layer. Note that an intrinsic or substantially intrinsic oxide semiconductor is described later.

When an oxide semiconductor layer is used as the semiconductor layer 842, the layer preferably includes c-axis aligned crystalline oxide semiconductor (CAAC-OS). A CAAC-OS is an oxide semiconductor having a plurality of c-axis aligned crystal parts. Details of the CAAC-OS will be described later.

In the oxide semiconductor layer used as the semiconductor layer 842, a region where CAAC is not formed preferably accounts for less than 20% of the whole oxide semiconductor layer.

The CAAC-OS has dielectric anisotropy. Specifically, the CAAC-OS has a larger dielectric constant in the c-axis direction than in the a-axis direction and the b-axis direction. In a transistor in which a CAAC-OS is used for a semiconductor layer where a channel is formed and a gate electrode is positioned in the c-axis direction, the dielectric constant in the c-axis direction is large; thus, the electric field generated from the gate electrode easily reaches the entire CAAC-OS. The subthreshold swing value (S value) can be made small. In addition, in the transistor in which a CAAC-OS is used for the semiconductor layer, an increase in S value due to miniaturization is less likely to occur.

Moreover, since the dielectric constant in the a-axis direction and the b-axis direction of a CAAC-OS is small, an influence of the electric field generated between a source and a drain is reduced. Thus, a channel length modulation effect, a short-channel effect, or the like is less likely to occur, whereby the reliability of the transistor can be increased.

Here, the channel length modulation effect is a phenomenon in which, when the drain voltage is higher than the threshold voltage, a depletion layer expands from the drain side, so that the effective channel length is decreased. The short-channel effect is a phenomenon in which a channel length is reduced, so that a deterioration in electrical characteristics such as a decrease in threshold voltage is caused. The more a transistor is miniaturized, the more deterioration in electrical characteristics caused by the phenomena is likely to occur.

Note that after the oxide semiconductor layer is formed, oxygen doping treatment may be performed. In order to further decrease impurities such as water or hydrogen in the oxide semiconductor layer to highly purify the oxide semiconductor layer, heat treatment is preferably performed.

For example, the oxide semiconductor layer is subjected to heat treatment in a reduced-pressure atmosphere, an inert gas atmosphere of nitrogen, a rare gas, or the like, an oxidation atmosphere, or an ultra dry air atmosphere (the moisture amount is 20 ppm (−55° C. by conversion into a dew point) or less, preferably 1 ppm or less, further preferably 10 ppb or less, in the case where the measurement is performed by a dew point meter in a cavity ring down laser spectroscopy (CRDS) system). Note that the oxidation atmosphere refers to an atmosphere including an oxidation gas such as oxygen, ozone, or nitrogen oxide at 10 ppm or higher. The inert gas atmosphere refers to an atmosphere including the oxidation gas at lower than 10 ppm and is filled with nitrogen or a rare gas.

By the heat treatment, at the same time as the release of the impurities, oxygen contained in the insulating layer 826 is diffused to the oxide semiconductor layer and oxygen vacancies in the oxide semiconductor layer can be reduced. Note that the heat treatment may be performed in such a manner that heat treatment is performed in an inert gas atmosphere, and then another heat treatment is performed in an atmosphere containing an oxidation gas at 10 ppm or more, 1% or more, or 10% or more in order to compensate for desorbed oxygen. The heat treatment may be performed at any time after the oxide semiconductor layer is formed.

There is no particular limitation on a heat treatment apparatus used for the heat treatment, and the apparatus may be provided with a device for heating an object to be processed by heat conduction or heat radiation from a heating element such as a resistance heating element. For example, an electric furnace, or a rapid thermal annealing (RTA) apparatus such as a lamp rapid thermal annealing (LRTA) apparatus or a gas rapid thermal annealing (GRTA) apparatus can be used. The LRTA apparatus is an apparatus for heating an object to be processed by radiation of light (an electromagnetic wave) emitted from a lamp such as a halogen lamp, a metal halide lamp, a xenon arc lamp, a carbon arc lamp, a high pressure sodium lamp, or a high pressure mercury lamp. The GRTA apparatus is an apparatus for heat treatment using a high-temperature gas.

The heat treatment may be performed at a temperature higher than or equal to 250° C. and lower than or equal to 650° C., preferably higher than or equal to 300° C. and lower than or equal to 500° C. The treatment time is preferably shorter than or equal to 24 hours. Heat treatment for over 24 hours is not preferable because the productivity is reduced.

<Crystal Structure of Oxide Semiconductor>

An oxide semiconductor is classified into a single crystal oxide semiconductor and a non-single-crystal oxide semiconductor. Examples of a non-single-crystal oxide semiconductor include a CAAC-OS, a polycrystalline oxide semiconductor, a nanocrystalline oxide semiconductor (nc-OS), an amorphous-like oxide semiconductor (a-like OS), and an amorphous oxide semiconductor.

From another perspective, an oxide semiconductor is classified into an amorphous oxide semiconductor and a crystalline oxide semiconductor. Examples of a crystalline oxide semiconductor include a single crystal oxide semiconductor, a CAAC-OS, a polycrystalline oxide semiconductor, and an nc-OS.

An amorphous structure is generally thought to be isotropic and have no non-uniform structure, to be metastable and not have fixed positions of atoms, to have a flexible bond angle, and to have a short-range order but have no long-range order, for example.

This means that a stable oxide semiconductor cannot be regarded as a completely amorphous oxide semiconductor. Moreover, an oxide semiconductor that is not isotropic (e.g., an oxide semiconductor that has a periodic structure in a microscopic region) cannot be regarded as a completely amorphous oxide semiconductor. In contrast, an a-like OS, which is not isotropic, has an unstable structure that contains a void. Because of its instability, an a-like OS is close to an amorphous oxide semiconductor in terms of physical properties.

In the following description, the term "parallel" indicates that the angle formed between two straight lines is greater than or equal to −10° and less than or equal to 10°, and accordingly also includes the case where the angle is greater than or equal to −5° and less than or equal to 5°. In addition, the term "substantially parallel" indicates that the angle formed between two straight lines is greater than or equal to −30° and less than or equal to 30°. In addition, the term "perpendicular" means that the angle formed between two straight lines is greater than or equal to 80° and less than or equal to 100°. Thus, the case where the angle is greater than or equal to 85° and less than or equal to 95° is also included. In addition, the term "substantially perpendicular" indicates that the angle formed between two straight lines is greater than or equal to 60° and less than or equal to 120°. In this specification, trigonal and rhombohedral crystal systems are included in a hexagonal crystal system.

[CAAC-OS]

First, a CAAC-OS is described.

A CAAC-OS is one of oxide semiconductors having a plurality of c-axis aligned crystal parts (also referred to as pellets).

Analysis of a CAAC-OS by X-ray diffraction (XRD) is described. For example, when the structure of a CAAC-OS including an $InGaZnO_4$ crystal that is classified into the space group R-3 m is analyzed by an out-of-plane method, a peak appears at a diffraction angle (2θ) of around 31° as shown in FIG. 40A. This peak is derived from the (009) plane of the $InGaZnO_4$ crystal, which indicates that crystals in the CAAC-OS have c-axis alignment, and that the c-axes are aligned in a direction substantially perpendicular to a surface over which the CAAC-OS film is formed (also referred to as a formation surface) or the top surface of the CAAC-OS film. Note that a peak sometimes appears at a 2θ of around 36° in addition to the peak at a 2θ of around 31°. The peak at a 2θ of around 36° is derived from a crystal structure that is classified into the space group Fd-3 m; thus, this peak is preferably not exhibited in a CAAC-OS.

On the other hand, in structural analysis of the CAAC-OS by an in-plane method in which an X-ray is incident on the CAAC-OS in a direction parallel to the formation surface, a peak appears at a 2θ of around 56°. This peak is attributed to the (110) plane of the InGaZnO$_4$ crystal. When analysis (ϕ scan) is performed with 2θ fixed at around 56° and with the sample rotated using a normal vector to the sample surface as an axis (ϕ axis), as shown in FIG. 40B, a peak is not clearly observed. In contrast, in the case where single crystal InGaZnO$_4$ is subjected to ϕ scan with 2θ fixed at around 56°, as shown in FIG. 40C, six peaks that are derived from crystal planes equivalent to the (110) plane are observed. Accordingly, the structural analysis using XRD shows that the directions of a-axes and b-axes are irregularly oriented in the CAAC-OS.

Next, a CAAC-OS analyzed by electron diffraction is described. For example, when an electron beam with a probe diameter of 300 nm is incident on a CAAC-OS including an InGaZnO$_4$ crystal in a direction parallel to the formation surface of the CAAC-OS, a diffraction pattern (also referred to as a selected-area electron diffraction pattern) shown in FIG. 40D can be obtained. In this diffraction pattern, spots derived from the (009) plane of an InGaZnO$_4$ crystal are included. Thus, the electron diffraction also indicates that pellets included in the CAAC-OS have c-axis alignment and that the c-axes are aligned in a direction substantially perpendicular to the formation surface or the top surface of the CAAC-OS. Meanwhile, FIG. 40E shows a diffraction pattern obtained in such a manner that an electron beam with a probe diameter of 300 nm is incident on the same sample in a direction perpendicular to the sample surface. As shown in FIG. 40E, a ring-like diffraction pattern is observed. Thus, the electron diffraction using an electron beam with a probe diameter of 300 nm also indicates that the a-axes and b-axes of the pellets included in the CAAC-OS do not have regular orientation. The first ring in FIG. 40E is considered to be derived from the (010) plane, the (100) plane, and the like of the InGaZnO$_4$ crystal. The second ring in FIG. 40E is considered to be derived from the (110) plane and the like.

In a combined analysis image (also referred to as a high-resolution TEM image) of a bright-field image and a diffraction pattern of a CAAC-OS, which is obtained using a transmission electron microscope (TEM), a plurality of pellets can be observed. However, even in the high-resolution TEM image, a boundary between pellets, that is, a grain boundary is not clearly observed in some cases. Thus, in the CAAC-OS, a reduction in electron mobility due to the grain boundary is less likely to occur.

Figure 41A:
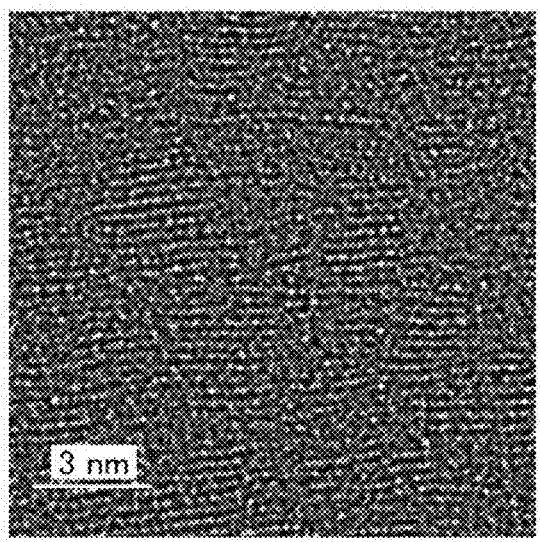
FIGS. 41A to 41E are a cross-sectional TEM image and plan-view TEM images of a CAAC-OS and images obtained through analyses thereof.

FIG. 41A shows a high-resolution TEM image of a cross section of the CAAC-OS that is observed from a direction substantially parallel to the sample surface. The high-resolution TEM image is obtained with a spherical aberration corrector function. The high-resolution TEM image obtained with a spherical aberration corrector function is particularly referred to as a Cs-corrected high-resolution TEM image. The Cs-corrected high-resolution TEM image can be observed with, for example, an atomic resolution analytical electron microscope JEM-ARM200F manufactured by JEOL Ltd.

FIG. 41A shows pellets in which metal atoms are arranged in a layered manner. FIG. 41A proves that the size of a pellet is greater than or equal to 1 nm or greater than or equal to 3 nm. Therefore, the pellet can also be referred to as a nanocrystal (nc). Furthermore, the CAAC-OS can also be referred to as an oxide semiconductor including c-axis aligned nanocrystals (CANC). A pellet reflects unevenness of a formation surface or a top surface of the CAAC-OS, and is parallel to the formation surface or the top surface of the CAAC-OS.

Figure 41B:
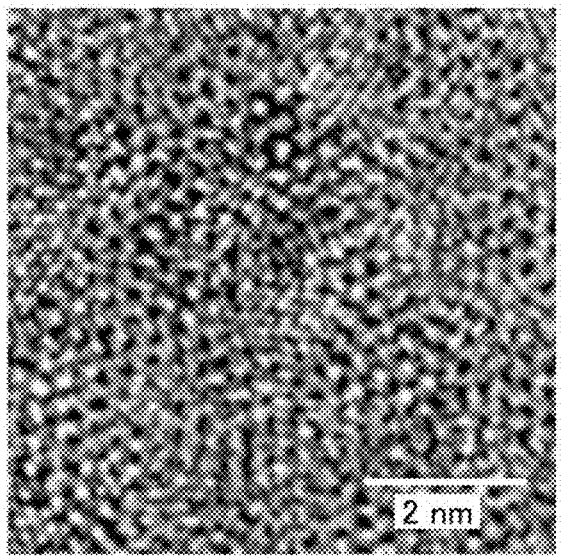
Figure 41C:
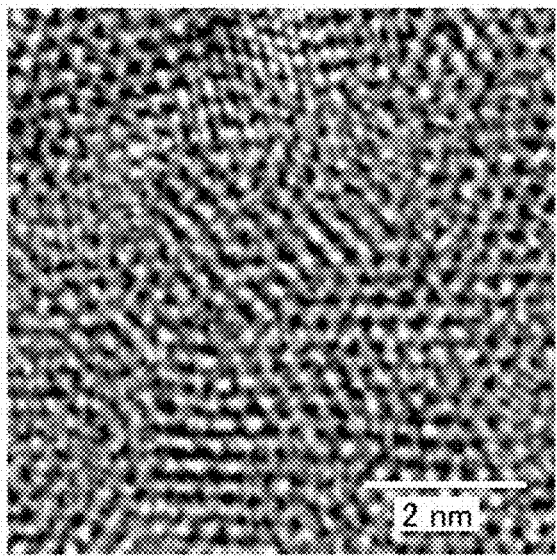
Figure 41D:
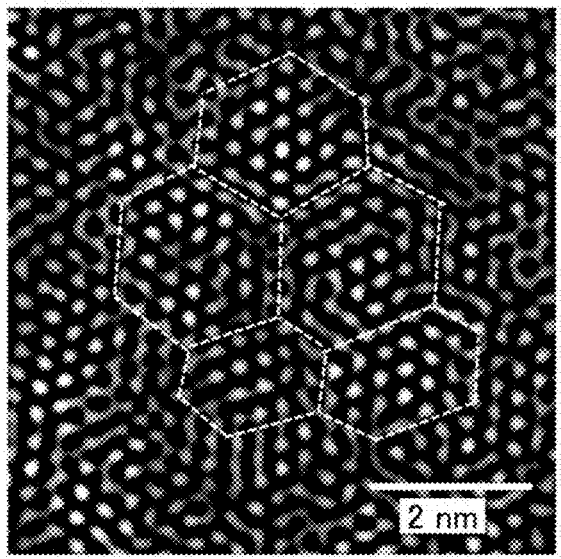
Figure 41E:
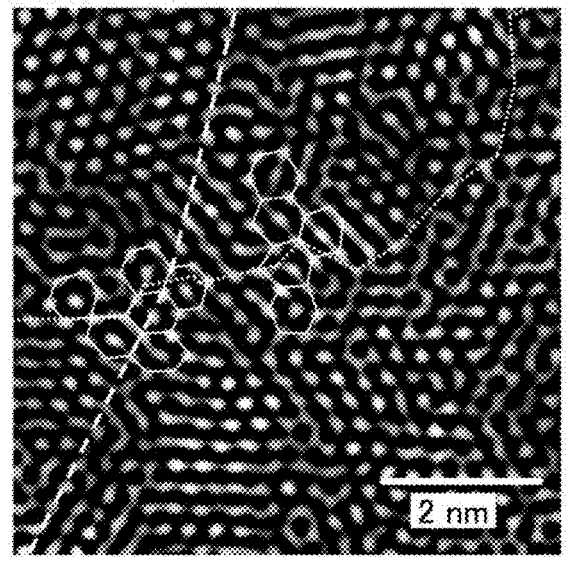

FIGS. 41B and 41C show Cs-corrected high-resolution TEM images of a plane of the CAAC-OS observed from a direction substantially perpendicular to the sample surface. FIGS. 41D and 41E are images obtained through image processing of FIGS. 41B and 41C. The method of image processing is as follows. The image in FIG. 41B is subjected to fast Fourier transform (FFT), so that an FFT image is obtained. Then, mask processing is performed such that a range of from 2.8 nm$^{-1}$ to 5.0 nm$^{-1}$ from the origin point in the obtained FFT image remains. After the mask processing, the FFT image is processed by inverse fast Fourier transform (IFFT) to obtain a processed image. The image obtained in this manner is called an FFT filtering image. The FFT filtering image is a Cs-corrected high-resolution TEM image from which a periodic component is extracted, and shows a lattice arrangement.

In FIG. 41D, a portion where a lattice arrangement is broken is denoted with a dashed line. A region surrounded by a dashed line is one pellet. The portion denoted with the dashed line is a junction of pellets. The dashed line draws a hexagon, which means that the pellet has a hexagonal shape. Note that the shape of the pellet is not always a regular hexagon but is a non-regular hexagon in many cases.

In FIG. 41E, a dotted line denotes a portion where the direction of a lattice arrangement is changed between a region with a regular lattice arrangement and another region with a regular lattice arrangement, and a dashed line denotes the change in the direction of the lattice arrangement. A clear crystal grain boundary cannot be observed even in the vicinity of the dotted line. When a lattice point in the vicinity of the dotted line is regarded as a center and surrounding lattice points are joined, a distorted hexagon, pentagon, and/or heptagon can be formed. That is, a lattice arrangement is distorted so that formation of a crystal grain boundary is inhibited. This is probably because the CAAC-OS can tolerate distortion owing to a low density of the atomic arrangement in an a-b plane direction, the interatomic bond distance changed by substitution of a metal element, and the like.

As described above, the CAAC-OS has c-axis alignment, its pellets (nanocrystals) are connected in an a-b plane direction, and the crystal structure has distortion. For this reason, the CAAC-OS can also be referred to as an oxide semiconductor including a c-axis-aligned a-b-plane-anchored (CAA) crystal.

The CAAC-OS is an oxide semiconductor with high crystallinity. Entry of impurities, formation of defects, or the like might decrease the crystallinity of an oxide semiconductor. This means that the CAAC-OS has small amounts of impurities and defects (e.g., oxygen vacancies).

Note that the impurity means an element other than the main components of the oxide semiconductor, such as hydrogen, carbon, silicon, or a transition metal element. For example, an element (specifically, silicon or the like) having higher strength of bonding to oxygen than a metal element included in an oxide semiconductor extracts oxygen from the oxide semiconductor, which results in disorder of the atomic arrangement and reduced crystallinity of the oxide semiconductor. A heavy metal such as iron or nickel, argon, carbon dioxide, or the like has a large atomic radius (or molecular radius), and thus disturbs the atomic arrangement of the oxide semiconductor and decreases crystallinity.

[nc-OS]

Next, an nc-OS is described.

Analysis of an nc-OS by XRD is described. When the structure of an nc-OS is analyzed by an out-of-plane method, a peak indicating orientation does not appear. That is, a crystal of an nc-OS does not have orientation.

Figure 42A:
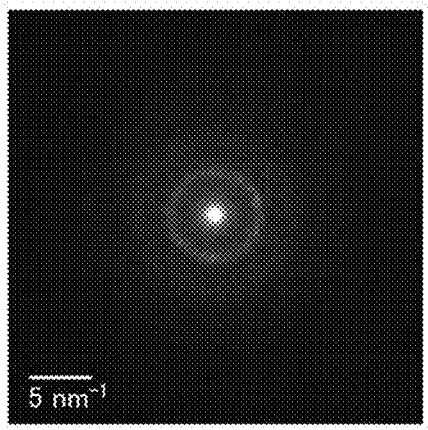
FIGS. 42A to 42D show electron diffraction patterns and a cross-sectional TEM image of an nc-OS.
Figure 42B:
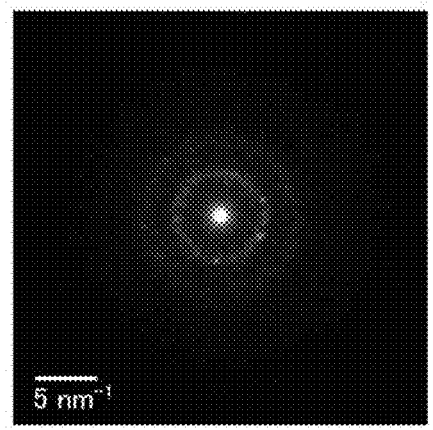

For example, when an electron beam with a probe diameter of 50 nm is incident on a 34-nm-thick region of thinned nc-OS including an $InGaZnO_4$ crystal in a direction parallel to the formation surface, a ring-shaped diffraction pattern (a nanobeam electron diffraction pattern) shown in FIG. 42A is observed. FIG. 42B shows a diffraction pattern obtained when an electron beam with a probe diameter of 1 nm is incident on the same sample. As shown in FIG. 42B, a plurality of spots are observed in a ring-like region. In other words, ordering in an nc-OS is not observed with an electron beam with a probe diameter of 50 nm but is observed with an electron beam with a probe diameter of 1 nm.

Figure 42C:
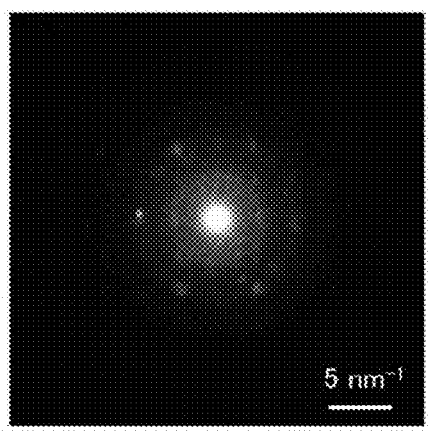

Furthermore, an electron diffraction pattern in which spots are arranged in an approximately regular hexagonal shape is observed in some cases as shown in FIG. 42C when an electron beam having a probe diameter of 1 nm is incident on a region with a thickness of less than 10 nm. This means that an nc-OS has a well-ordered region, i.e., a crystal, in the range of less than 10 nm in thickness. Note that an electron diffraction pattern having regularity is not observed in some regions because crystals are aligned in various directions.

Figure 42D:
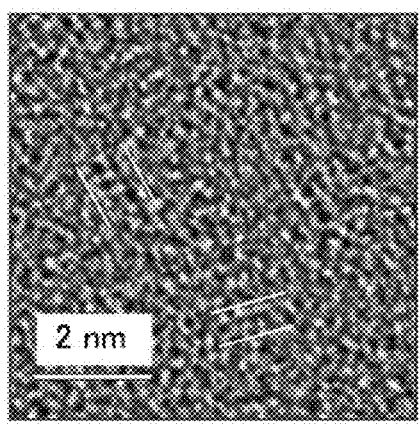

FIG. 42D shows a Cs-corrected high-resolution TEM image of a cross section of an nc-OS observed from the direction substantially parallel to the formation surface. In a high-resolution TEM image, an nc-OS has a region in which a crystal part is observed, such as the part indicated by additional lines in FIG. 42D, and a region in which a crystal part is not clearly observed. In most cases, the size of a crystal part included in the nc-OS is greater than or equal to 1 nm and less than or equal to 10 nm, or specifically, greater than or equal to 1 nm and less than or equal to 3 nm. Note that an oxide semiconductor including a crystal part whose size is greater than 10 nm and less than or equal to 100 nm is sometimes referred to as a microcrystalline oxide semiconductor. In a high-resolution TEM image of the nc-OS, for example, a grain boundary is not clearly observed in some cases. Note that there is a possibility that the origin of the nanocrystal is the same as that of a pellet in a CAAC-OS. Therefore, a crystal part of the nc-OS may be referred to as a pellet in the following description.

As described above, in the nc-OS, a microscopic region (for example, a region with a size greater than or equal to 1 nm and less than or equal to 10 nm, in particular, a region with a size greater than or equal to 1 nm and less than or equal to 3 nm) has a periodic atomic arrangement. There is no regularity of crystal orientation between different pellets in the nc-OS. Thus, the orientation of the whole film is not ordered. Accordingly, the nc-OS cannot be distinguished from an a-like OS or an amorphous oxide semiconductor, depending on an analysis method.

Since there is no regularity of crystal orientation between the pellets (nanocrystals) as mentioned above, the nc-OS can also be referred to as an oxide semiconductor including random aligned nanocrystals (RANC) or an oxide semiconductor including non-aligned nanocrystals (NANC).

The nc-OS is an oxide semiconductor that has high regularity as compared with an amorphous oxide semiconductor. Therefore, the nc-OS is likely to have a lower density of defect states than an a-like OS and an amorphous oxide semiconductor. Note that there is no regularity of crystal orientation between different pellets in the nc-OS. Therefore, the nc-OS has a higher density of defect states than the CAAC-OS.

[a-like OS]

An a-like OS has a structure between those of the nc-OS and the amorphous oxide semiconductor.

Figure 43A:
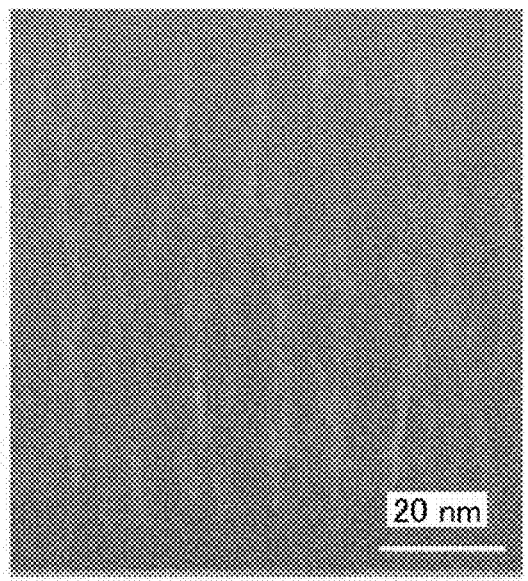
FIGS. 43A and 43B are cross-sectional TEM images of an a-like OS.
Figure 43B:
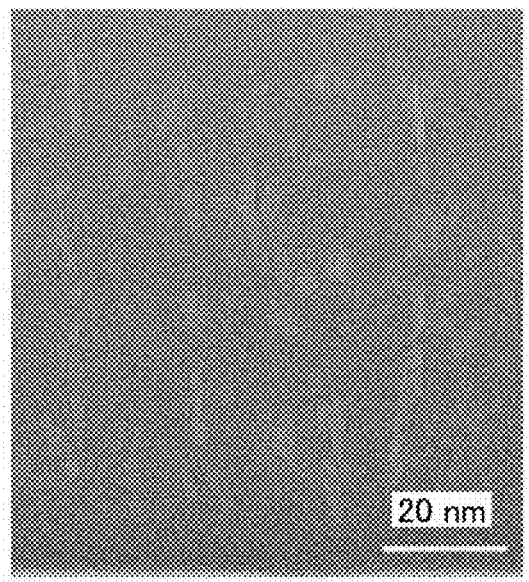

FIGS. 43A and 43B are high-resolution cross-sectional TEM images of an a-like OS. FIG. 43A is the high-resolution cross-sectional TEM image of the a-like OS at the start of the electron irradiation. FIG. 43B is the high-resolution cross-sectional TEM image of a-like OS after the electron ($e^-$) irradiation at $4.3 \times 10^8$ $e^-/nm^2$. FIGS. 43A and 43B show that stripe-like bright regions extending vertically are observed in the a-like OS from the start of the electron irradiation. It can be also found that the shape of the bright region changes after the electron irradiation. Note that the bright region is presumably a void or a low-density region.

The a-like OS has an unstable structure because it contains a void. To verify that an a-like OS has an unstable structure as compared with a CAAC-OS and an nc-OS, a change in structure caused by electron irradiation is described below.

An a-like OS, an nc-OS, and a CAAC-OS are prepared as samples. Each of the samples is an In—Ga—Zn oxide.

First, a high-resolution cross-sectional TEM image of each sample is obtained. The high-resolution cross-sectional TEM images show that all the samples have crystal parts.

It is known that a unit cell of an $InGaZnO_4$ crystal has a structure in which nine layers including three In—O layers and six Ga—Zn—O layers are stacked in the c-axis direction. The distance between the adjacent layers is equivalent to the lattice spacing on the (009) plane (also referred to as d value). The value is calculated to be 0.29 nm from crystal structural analysis. Accordingly, a portion where the spacing between lattice fringes is greater than or equal to 0.28 nm and less than or equal to 0.30 nm is regarded as a crystal part of $InGaZnO_4$ in the following description. Each of lattice fringes corresponds to the a-b plane of the $InGaZnO_4$ crystal.

Figure 44:
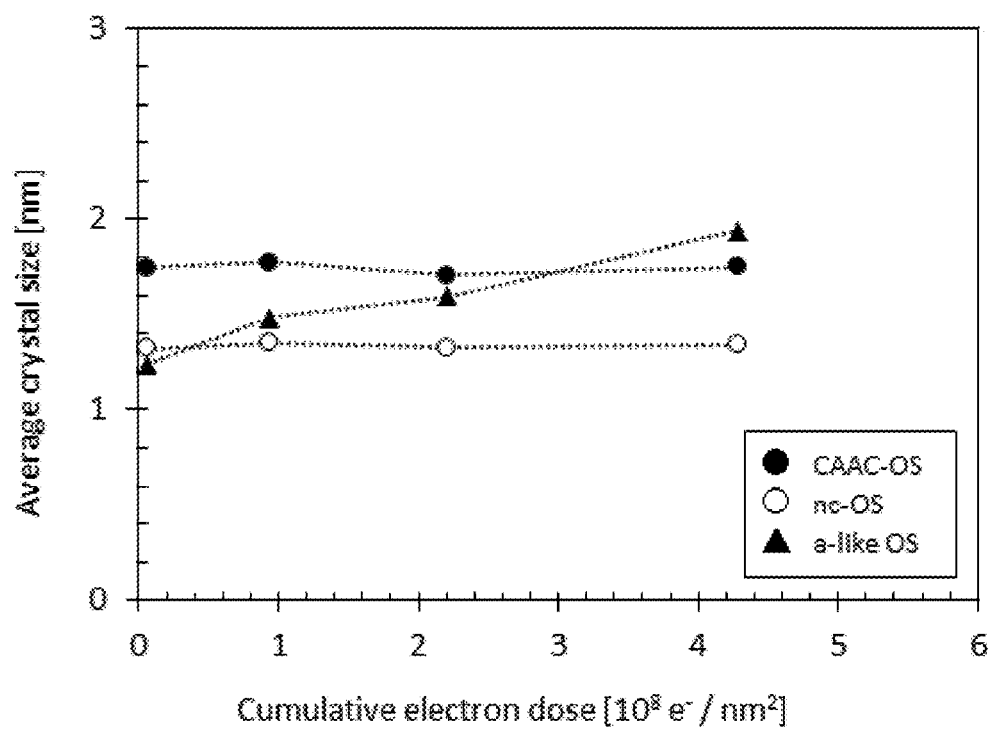
FIG. 44 shows changes in a crystal part of an In—Ga—Zn oxides induced by electron irradiation.

FIG. 44 shows a change in the average size of crystal parts (at 22 points to 30 points) in each sample. Note that the crystal part size corresponds to the length of a lattice fringe. FIG. 44 indicates that the crystal part size in the a-like OS increases with an increase in the cumulative electron dose in obtaining TEM images, for example. As shown in FIG. 44, a crystal part of approximately 1.2 nm (also referred to as an initial nucleus) at the start of TEM observation grows to a size of approximately 1.9 nm at a cumulative electron ($e^-$) dose of $4.2 \times 10^8$ $e^-/nm^2$. In contrast, the crystal part size in the nc-OS and the CAAC-OS shows little change from the start of electron irradiation to a cumulative electron dose of $4.2 \times 10^8$ $e^-/nm^2$. As shown in FIG. 44, the crystal part sizes in an nc-OS and a CAAC-OS are approximately 1.3 nm and approximately 1.8 nm, respectively, regardless of the cumulative electron dose. For the electron beam irradiation and TEM observation, a Hitachi H-9000NAR transmission electron microscope was used. The conditions of electron beam irradiation were as follows: the accelerating voltage was 300 kV; the current density was $6.7 \times 10^5$ $e^-/(nm^2 \cdot s)$; and the diameter of irradiation region was 230 nm.

In this manner, growth of the crystal part in the a-like OS is sometimes induced by electron irradiation. In contrast, in the nc-OS and the CAAC-OS, growth of the crystal part is hardly induced by electron irradiation. Therefore, the a-like OS has an unstable structure as compared with the nc-OS and the CAAC-OS.

The a-like OS has a lower density than the nc-OS and the CAAC-OS because it contains a void. Specifically, the density of the a-like OS is higher than or equal to 78.6% and lower than 92.3% of the density of the single crystal oxide semiconductor having the same composition. The density of each of the nc-OS and the CAAC-OS is higher than or equal to 92.3% and lower than 100% of the density of the single crystal oxide semiconductor having the same composition. Note that it is difficult to form an oxide semiconductor having a density of lower than 78% of the density of the single crystal oxide semiconductor.

For example, in the case of an oxide semiconductor having an atomic ratio of In: Ga: Zn=1:1:1, the density of single crystal InGaZnO$_4$ with a rhombohedral crystal structure is 6.357 g/cm$^3$. Accordingly, in the case of the oxide semiconductor having an atomic ratio of In: Ga: Zn=1:1:1, the density of the a-like OS is higher than or equal to 5.0 g/cm$^3$ and lower than 5.9 g/cm$^3$. For example, in the case of the oxide semiconductor having an atomic ratio of In: Ga: Zn=1:1:1, the density of each of the nc-OS and the CAAC-OS is higher than or equal to 5.9 g/cm$^3$ and lower than 6.3 g/cm$^3$.

Note that in the case where an oxide semiconductor having a certain composition does not exist in a single crystal structure, single crystal oxide semiconductors with different compositions are combined at an adequate ratio, which makes it possible to calculate density equivalent to that of a single crystal oxide semiconductor with the desired composition. The density of a single crystal oxide semiconductor having the desired composition can be calculated using a weighted average according to the combination ratio of the single crystal oxide semiconductors with different compositions. Note that it is preferable to use as few kinds of single crystal oxide semiconductors as possible to calculate the density.

As described above, oxide semiconductors have various structures and various properties. Note that an oxide semiconductor may be a stacked layer including two or more films of an amorphous oxide semiconductor, an a-like OS, an nc-OS, and a CAAC-OS, for example.

[Carrier Density of Oxide Semiconductor]

The carrier density of an oxide semiconductor will be described below.

Examples of a factor affecting the carrier density of an oxide semiconductor include oxygen vacancy (Vo) and impurities in the oxide semiconductor.

As the amount of oxygen vacancy in the oxide semiconductor increases, the density of defect states increases when hydrogen is bonded to the oxygen vacancy (this state is also referred to as VoH). The density of defect states also increases with an increase in the amount of impurity in the oxide semiconductor. Hence, the carrier density of an oxide semiconductor can be controlled by controlling the density of defect states in the oxide semiconductor.

A transistor using the oxide semiconductor in a channel region will be described below.

The carrier density of the oxide semiconductor is preferably reduced in order to inhibit the negative shift of the threshold voltage of the transistor or reduce the off-state current of the transistor. In order to reduce the carrier density of the oxide semiconductor, the impurity concentration in the oxide semiconductor is reduced so that the density of defect states can be reduced. In this specification and the like, a state with a low impurity concentration and a low density of defect states is referred to as a highly purified intrinsic or substantially highly purified intrinsic state. The carrier density of a highly purified intrinsic oxide semiconductor is lower than $8 \times 10^{15}$ cm$^{-3}$, preferably lower than $1 \times 10^{11}$ cm$^{-3}$, and further preferably lower than $1 \times 10^{10}$ cm$^{-3}$ and is higher than or equal to $1 \times 10^{-9}$ cm$^3$.

In contrast, the carrier density of the oxide semiconductor is preferably increased in order to improve the on-state current of the transistor or improve the field-effect mobility of the transistor. In order to increase the carrier density of the oxide semiconductor, the impurity concentration or the density of defect states in the oxide semiconductor is slightly increased. Alternatively, the bandgap of the oxide semiconductor is preferably narrowed. For example, an oxide semiconductor that has a slightly high impurity concentration or a slightly high density of defect states in the range where a favorable on/off ratio is obtained in the $I_d$-$V_g$ characteristics of the transistor can be regarded as substantially intrinsic. Furthermore, an oxide semiconductor that has a high electron affinity and thus has a narrow bandgap so as to increase the density of thermally excited electrons (carriers) can be regarded as substantially intrinsic. Note that a transistor using an oxide semiconductor with higher electron affinity has lower threshold voltage.

The aforementioned oxide semiconductor with an increased carrier density has somewhat n-type conductivity; thus, it can be referred to as a "slightly-n" oxide semiconductor.

The carrier density of a substantially intrinsic oxide semiconductor is preferably higher than or equal to $1 \times 10^5$ cm$^{-3}$ and lower than $1 \times 10^{18}$ cm$^{-3}$, further preferably higher than or equal to $1 \times 10^7$ cm$^{-3}$ and lower than or equal to $1 \times 10^{17}$ cm$^{-3}$, still further preferably higher than or equal to $1 \times 10^9$ cm$^3$ and lower than or equal to $5 \times 10^{16}$ cm$^3$, yet further preferably higher than or equal to $1 \times 10^{10}$ cm$^{-3}$ and lower than or equal to $1 \times 10^{16}$ cm$^{-3}$, and yet still preferably higher than or equal to $1 \times 10^{11}$ cm$^{-3}$ and lower than or equal to $1 \times 10^{15}$ cm$^{-3}$.

Figure 45:
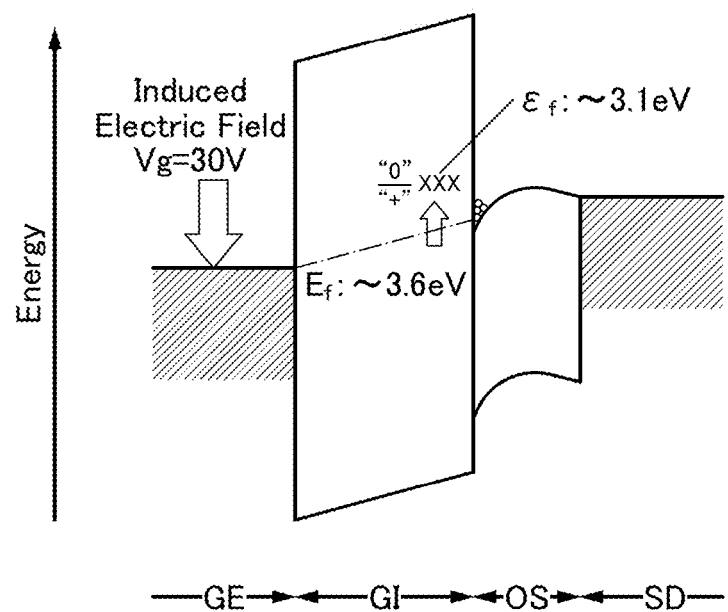
FIG. 45 is a diagram showing an energy band of a transistor including an oxide semiconductor in a channel formation region.

The use of the substantially intrinsic oxide semiconductor may improve the reliability of a transistor. Here, the reason for the improvement in the reliability of a transistor which uses the oxide semiconductor in its channel region is described with reference to FIG. 45. FIG. 45 is an energy band diagram of the transistor which uses the oxide semiconductor in its channel region.

In FIG. 45, GE, GI, OS, and SD refer to a gate electrode, a gate insulating film, an oxide semiconductor, and a source/drain electrode, respectively. In other words, FIG. 45 shows an example of energy bands of the gate electrode, the gate insulating film, the oxide semiconductor, and the source/drain electrode in contact with the oxide semiconductor.

In FIG. 45, a silicon oxide film and an In—Ga—Zn oxide are used for the gate insulating film and the oxide semiconductor, respectively. The transition level (εf) of a defect that might be formed in the silicon oxide film is assumed to be formed at a position approximately 3.1 eV away from the conduction band minimum of the gate insulating film. Furthermore, the Fermi level (Ef) of the silicon oxide film at the interface between the oxide semiconductor and the silicon oxide film when the gate voltage (Vg) is 30 V is assumed to be formed at a position approximately 3.6 eV away from the conduction band minimum of the gate insulating film. Note that the Fermi level of the silicon oxide film changes depending on the gate voltage. For example, the Fermi level (Ef) of the silicon oxide film at the interface between the oxide semiconductor and the silicon oxide film is lowered as the gate voltage is increased. A white circle and x in FIG. 45 represent an electron (carrier) and a defect state in the silicon oxide film, respectively.

As shown in FIG. 45, when thermal excitation of carriers occurs during the application of a gate voltage, the carriers are trapped by the defect states (x in the diagram) and the charge state of the defect states is changed from positive ("+") to neutral ("0"). In other words, when the value obtained by adding the thermal excitation energy to the Fermi level (Ef) of the silicon oxide film becomes greater than the transition level ($\varepsilon$f) of a defect, the charge state of the defect states in the silicon oxide film is changed from positive to neutral, so that the threshold voltage of the transistor shifts in the positive direction.

When the oxide semiconductor with different electron affinity is used, the Fermi level of the interface between the gate insulating film and the oxide semiconductor might be changed. When an oxide semiconductor with a higher electron affinity is used, the conduction band minimum of the gate insulating film becomes relatively high at the interface between the gate insulating film and the oxide semiconductor or in the vicinity of the interface. In that case, the defect state (x in FIG. 45) which might be formed in the gate insulating film also becomes relatively high, so that the energy difference between the Fermi level of the gate insulating film and the Fermi level of the oxide semiconductor is increased. The increase in energy difference leads to a reduction in the amount of charge trapped in the gate insulating film. For example, a change in the charge state of the defect states which might be formed in the silicon oxide film becomes smaller, so that change in the threshold voltage of the transistor by gate bias temperature (GBT) stress can be reduced.

<Electrode>

As a conductive material for forming the electrodes 863, 824, 844a, 844b, 825a, and 825b, a material containing one or more metal elements selected from aluminum, chromium, copper, silver, gold, platinum, tantalum, nickel, titanium, molybdenum, tungsten, hafnium, vanadium, niobium, manganese, magnesium, zirconium, beryllium, and the like can be used. Alternatively, a semiconductor having a high electric conductivity typified by polycrystalline silicon including an impurity element such as phosphorus, or silicide such as nickel silicide may be used. A plurality of stacked conductive layers formed with these materials may be used.

The conductive material for forming the electrodes 863, 824, 844a, 844b, 825a, and 825b can also be formed using a conductive material containing oxygen, such as indium tin oxide (ITO), indium oxide containing tungsten oxide, indium zinc oxide containing tungsten oxide, indium oxide containing titanium oxide, indium tin oxide containing titanium oxide, indium zinc oxide, indium gallium zinc oxide, or indium tin oxide to which silicon is added, or a conductive material containing nitrogen, such as titanium nitride or tantalum nitride. It is also possible to use a stacked-layer structure formed using a material containing the above metal element and conductive material containing oxygen. It is also possible to use a stacked-layer structure formed using a material containing the above metal element and a conductive material containing nitrogen. It is also possible to use a stacked-layer structure formed using a material containing the above metal element, a conductive material containing oxygen, and a conductive material containing nitrogen. There is no particular limitation on a formation method of the conductive material, and a variety of formation methods such as an evaporation method, a CVD method, and a sputtering method can be employed.

<Contact Plugs>

As the contact plug, a conductive material with high embeddability such as tungsten or polysilicon can be used. A side surface and a bottom surface of the material may be covered with a barrier layer (a diffusion prevention layer) of a titanium layer, a titanium nitride layer, a stacked layer of these layers, or the like. In this case, the barrier layer is regarded as part of the contact plug in some cases.

This embodiment can be combined with any of the other embodiments as appropriate.

(Embodiment 6)

In this embodiment, structure examples of a display device using the transistors of which are shown in the above embodiment will be described. Structure examples of a display device in which some or all of driver circuits can be formed over a substrate where a pixel portion is formed are described with reference to FIGS. 34A to 34C and FIGS. 35A and 35B.

<Display Device>

A display device including a liquid crystal element and a display device including an EL element are described as examples of the display device. Note that the display device described below can be used as the display panel 51 illustrated in FIG. 1.

Figure 34A:
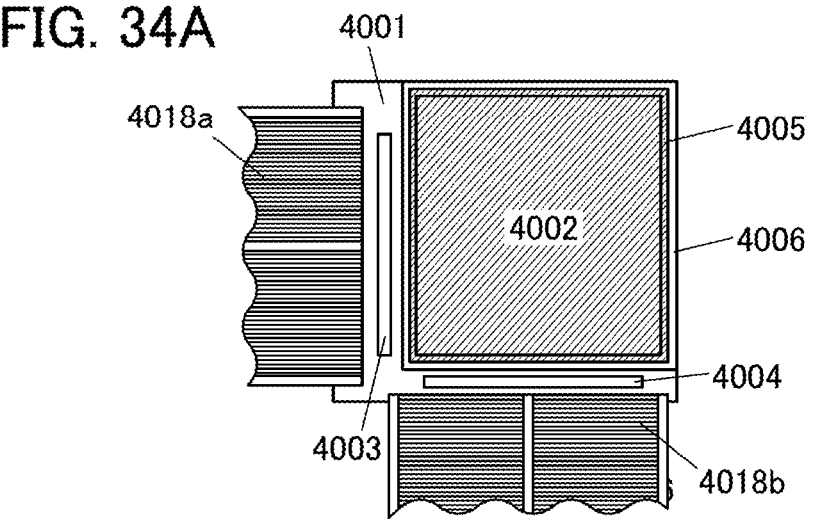
FIGS. 34A to 34C illustrate structure examples of a display device.

In FIG. 34A, a sealant 4005 is provided so as to surround a pixel portion 4002 provided over a first substrate 4001, and the pixel portion 4002 is sealed with a second substrate 4006. In FIG. 34A, a signal line driver circuit 4003 and a scan line driver circuit 4004 each are formed using a single crystal semiconductor or a polycrystalline semiconductor over another substrate, and mounted in a region different from the region surrounded by the sealant 4005 over the first substrate 4001. Various signals and potentials are supplied to the signal line driver circuit 4003, the scan line driver circuit 4004, and the pixel portion 4002 from flexible printed circuits (FPCs) 4018a and 4018b.

Figure 34B:
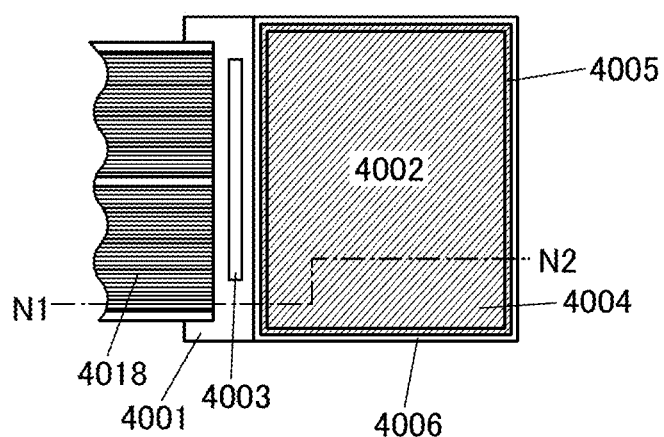
Figure 34C:
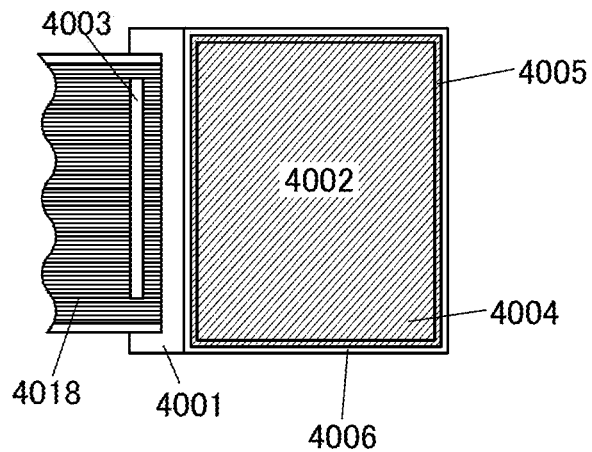

In FIGS. 34B and 34C, the sealant 4005 is provided so as to surround the pixel portion 4002 and the scan line driver circuit 4004 that are provided over the first substrate 4001. The second substrate 4006 is provided over the pixel portion 4002 and the scan line driver circuit 4004. Consequently, the pixel portion 4002 and the scan line driver circuit 4004 are sealed together with the display element, by the first substrate 4001, the sealant 4005, and the second substrate 4006. Furthermore, in FIGS. 34B and 34C, the signal line driver circuit 4003 that is formed using a single crystal semiconductor or a polycrystalline semiconductor over another substrate is mounted in a region that is different from the region surrounded by the sealant 4005 over the first substrate 4001. In FIGS. 34B and 34C, various signals and potentials are supplied to the signal line driver circuit 4003, the scan line driver circuit 4004, and the pixel portion 4002 through an FPC 4018.

Although FIGS. 34B and 34C each illustrate an example in which the signal line driver circuit 4003 is formed separately and mounted on the first substrate 4001, one embodiment of the present invention is not limited to this structure. The scan line driver circuit may be separately formed and then mounted, or only part of the signal line driver circuit or part of the scan line driver circuit may be separately formed and then mounted.

The connection method of a separately formed driver circuit is not particularly limited; wire bonding, a chip on glass (COG), a tape carrier package (TCP), a chip on film (COF), or the like can be used. FIG. 34A illustrates an example in which the signal line driver circuit 4003 and the scan line driver circuit 4004 are mounted by a COG. FIG. 34B illustrates an example in which the signal line driver circuit 4003 is mounted by a COG. FIG. 34C illustrates an example in which the signal line driver circuit 4003 is mounted by a TCP.

In some cases, the display device encompasses a panel in which a display element is sealed, and a module in which an IC or the like including a controller is mounted on the panel.

The pixel portion and the scan line driver circuit provided over the first substrate include a plurality of transistors and any of the transistors which are described in the above embodiments can be applied thereto.

FIGS. 35A and 35B correspond to cross-sectional views taken along chain line N1-N2 in FIG. 34B. As shown in FIGS. 35A and 35B, the display device has an electrode 4015, and the electrode 4015 is electrically connected to a terminal included in the FPC 4018 through an anisotropic conductive layer 4019. The electrode 4015 is electrically connected to a wiring 4014 in an opening formed in insulating layers 4112, 4111, and 4110.

The electrode 4015 is formed using the same conductive layer as a first electrode layer 4030, and the wiring 4014 is formed using the same conductive layer as source and drain electrodes of transistors 4010 and 4011.

The pixel portion 4002 and the scan line driver circuit 4004 provided over the first substrate 4001 include a plurality of transistors. In FIGS. 35A and 35B, the transistor 4010 included in the pixel portion 4002 and the transistor 4011 included in the scan line driver circuit 4004 are shown as an example. The insulating layers 4112, 4111, and 4110 are provided over the transistors 4010 and 4011 in FIG. 35A, and a bank 4510 is further provided over the insulating layer 4112 in FIG. 35B.

The transistors 4010 and 4011 are provided over an insulating layer 4102. The transistors 4010 and 4011 each include an electrode 4017 over the insulating layer 4102. An insulating layer 4103 is formed over the electrode 4017. The electrode 4017 can serve as a back gate electrode.

Any of the transistors described in the above embodiments can be applied to the transistors 4010 and 4011. A change in the electrical characteristics of any of the transistors described in the above embodiments is suppressed and thus the transistors are electrically stable. Accordingly, the display devices of this embodiment illustrated in FIGS. 35A and 35B can be highly reliable display devices.

FIGS. 35A and 35B illustrate the case where a transistor having a structure similar to that of the transistor 752 described in the above embodiment is used as each of the transistors 4010 and 4011.

The display devices illustrated in FIGS. 35A and 35B each include a capacitor 4020. The capacitor 4020 includes a region where part of the source electrode or part of the drain electrode of the transistor 4010 overlaps with an electrode 4021 with the insulating layer 4103 interposed therebetween. The electrode 4021 is formed using the same conductive layer as the electrode 4017.

In general, the capacitance of a capacitor provided in a display device is set in consideration of leakage current or the like of transistors provided in a pixel portion so that charge can be held for a predetermined period. The capacitance of the capacitor may be set considering off-state current of the transistor or the like.

For example, when an OS transistor is used in a pixel portion of a liquid crystal display device, the capacitance of the capacitor can be one-third or less, or one-fifth or less, of the capacitance of a liquid crystal. Using an OS transistor can omit the formation of a capacitor.

The transistor 4010 included in the pixel portion 4002 is electrically connected to the display element. An example of a liquid crystal display device using a liquid crystal element as a display element is illustrated in FIG. 35A. In FIG. 35A, a liquid crystal element 4013 that is the display element includes the first electrode layer 4030, a second electrode layer 4031, and a liquid crystal layer 4008. Note that an insulating layer 4032 and an insulating layer 4033 functioning as alignment films are provided so that the liquid crystal layer 4008 is provided therebetween. The second electrode layer 4031 is provided on the second substrate 4006 side, and the first electrode layer 4030 and the second electrode layer 4031 overlap with each other with the liquid crystal layer 4008 positioned therebetween.

A spacer 4035 is a columnar spacer obtained by selective etching of an insulating layer and is provided in order to control the distance between the first electrode layer 4030 and the second electrode layer 4031 (a cell gap). Alternatively, a spherical spacer may be used.

OS transistors are preferably used as the transistors 4010 and 4011. In the OS transistor, the current in an off state can be made small. Accordingly, an electrical signal such as an image signal can be held for a longer period, and a writing interval can be set longer in an on state. Accordingly, frequency of refresh operation can be reduced, which leads to an effect of suppressing power consumption.

In the OS transistor, relatively high field-effect mobility can be obtained, whereby high-speed operation is possible. Consequently, when the above transistor is used in a driver circuit portion or a pixel portion of a display device, high-quality images can be obtained. Since the driver circuit portion and the pixel portion can be formed over one substrate with use of the above transistor, the number of components of the display device can be reduced.

In the display device, a black matrix (a light-blocking layer), an optical member (an optical substrate) such as a polarizing member, a retardation member, or an anti-reflection member, and the like may be provided as appropriate. For example, circular polarization may be employed by using a polarizing substrate and a retardation substrate. In addition, a backlight, a sidelight, or the like may be used as a light source.

As the display element included in the display device, an EL element can be used. An EL element includes a layer containing a light-emitting compound (also referred to as an "EL layer") between a pair of electrodes. By generating a potential difference between the pair of electrodes that is greater than the threshold voltage of the EL element, holes are injected to the EL layer from the anode side and electrons are injected to the EL layer from the cathode side. The injected electrons and holes are recombined in the EL layer, so that a light-emitting substance contained in the EL layer emits light.

EL elements are classified depending on whether a light-emitting material is an organic compound or an inorganic compound. In general, the former is referred to as an organic EL element, and the latter is referred to as an inorganic EL element.

In an organic EL element, by voltage application, electrons are injected from one electrode to the EL layer and holes are injected from the other electrode to the EL layer. The carriers (i.e., electrons and holes) are recombined; thus, the light-emitting organic compound is excited. The light-emitting organic compound returns to a ground state from the excited state, thereby emitting light. Based on such a mechanism, such a light-emitting element is referred to as a current-excitation type light-emitting element.

In addition to the light-emitting compound, the EL layer may further include any of a substance with a high holeinjection property, a substance with a high hole-transport property, a hole-blocking material, a substance with a high electron-transport property, a substance with a high electron-injection property, a substance with a bipolar property (a substance with a high electron-transport property and a hole-transport property), and the like.

The EL layer can be formed by an evaporation method (including a vacuum evaporation method), a transfer method, a printing method, an inkjet method, a coating method, or the like.

Inorganic EL elements are classified as a dispersed inorganic EL element and a thin-film inorganic EL element depending on their element structures. A dispersion-type inorganic EL element has a light-emitting layer where particles of a light-emitting material are dispersed in a binder, and its light emission mechanism is donor-acceptor recombination type light emission that utilizes a donor level and an acceptor level. A thin-film inorganic EL element has a structure where a light-emitting layer is sandwiched between dielectric layers, which are further sandwiched between electrodes, and its light emission mechanism is localized type light emission that utilizes inner-shell electron transition of metal ions. Note that description is given here using an organic EL element as a light-emitting element.

In order to extract light emitted from the light-emitting element, it is acceptable as long as at least one of a pair of electrodes is transparent. The light-emitting element can have a top emission structure in which light emission is extracted from the side opposite to the substrate; a bottom emission structure in which light emission is extracted from the substrate side; or a dual emission structure in which light emission is extracted from both the side opposite to the substrate and the substrate side.

FIG. 35B illustrates an example of a light-emitting display device (also referred to as an "EL display device") using a light-emitting element as a display element. A light-emitting element 4513 which is the display element is electrically connected to the transistor 4010 provided in the pixel portion 4002. The structure of the light-emitting element 4513 is the stacked-layer structure including the first electrode layer 4030, a light-emitting layer 4511, and the second electrode layer 4031; however, this embodiment is not limited to this structure. The structure of the light-emitting element 4513 can be changed as appropriate depending on a direction in which light is extracted from the light-emitting element 4513, or the like.

The bank 4510 is formed using an organic insulating material or an inorganic insulating material. It is particularly preferable that the bank 4510 be formed using a photosensitive resin material to have an opening over the first electrode layer 4030 so that a side surface of the opening slopes with continuous curvature.

The light-emitting layer 4511 may be formed using a single layer or a plurality of layers stacked.

A protective layer may be formed over the second electrode layer 4031 and the bank 4510 in order to prevent entry of oxygen, hydrogen, moisture, carbon dioxide, or the like into the light-emitting element 4513. For the protective layer, silicon nitride, silicon nitride oxide, aluminum oxide, aluminum nitride, aluminum oxynitride, aluminum nitride oxide, diamond like carbon (DLC), or the like can be used. In addition, in a space which is enclosed by the first substrate 4001, the second substrate 4006, and the sealant 4005, a filler 4514 is provided for sealing. It is preferable that, in this manner, the display device be packaged (sealed) with a protective film (such as a laminate film or an ultraviolet curable resin film) or a cover member with high air-tightness and little degasification so that the display device is not exposed to the outside air.

As the filler 4514, an ultraviolet curable resin or a thermosetting resin can be used as well as an inert gas such as nitrogen or argon; for example, polyvinyl chloride (PVC), an acrylic resin, polyimide, an epoxy resin, a silicone resin, polyvinyl butyral (PVB), ethylene vinyl acetate (EVA), or the like can be used. A drying agent may be contained in the filler 4514.

A glass material such as a glass frit, or a resin that is curable at room temperature such as a two-component-mixture-type resin, a light curable resin, a thermosetting resin, and the like can be used for the sealant 4005. A drying agent may be contained in the sealant 4005.

In addition, if needed, an optical film, such as a polarizing plate, a circularly polarizing plate (including an elliptically polarizing plate), a retardation plate (a quarter-wave plate or a half-wave plate), or a color filter, may be provided as appropriate on a light-emitting surface of the light-emitting element. Furthermore, the polarizing plate or the circularly polarizing plate may be provided with an anti-reflection film. For example, anti-glare treatment by which reflected light can be diffused by projections and depressions on the surface so as to reduce the glare can be performed.

When the light-emitting element has a microcavity structure, light with high color purity can be extracted. Furthermore, when a microcavity structure and a color filter are used in combination, the glare can be reduced and the visibility of a display image can be increased.

The first electrode layer and the second electrode layer (also called a pixel electrode layer, a common electrode layer, a counter electrode layer, or the like) for applying voltage to the display element may have light-transmitting properties or light-reflecting properties, which depends on the direction in which light is extracted, the position where the electrode layer is provided, the pattern structure of the electrode layer, and the like.

The first electrode layer 4030 and the second electrode layer 4031 can be formed using a light-transmitting conductive material such as indium oxide containing tungsten oxide, indium zinc oxide containing tungsten oxide, indium oxide containing titanium oxide, indium tin oxide, indium tin oxide containing titanium oxide, indium zinc oxide, or indium tin oxide to which silicon oxide is added.

The first electrode layer 4030 and the second electrode layer 4031 each can also be formed using one or more kinds selected from a metal such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), or silver (Ag); an alloy thereof; and a nitride thereof.

A conductive composition containing a conductive high molecule (also called a conductive polymer) can be used for the first electrode layer 4030 and the second electrode layer 4031. As the conductive high molecule, a so-called 7c-electron conjugated conductive high molecule can be used. For example, polyaniline or a derivative thereof, polypyrrole or a derivative thereof, polythiophene or a derivative thereof, a copolymer of two or more of aniline, pyrrole, and thiophene or a derivative thereof can be given.

Since the transistor is easily broken due to static electricity or the like, a protection circuit for protecting the driver circuit is preferably provided. The protection circuit is preferably formed using a nonlinear element.

<Device>

Figure 36A:
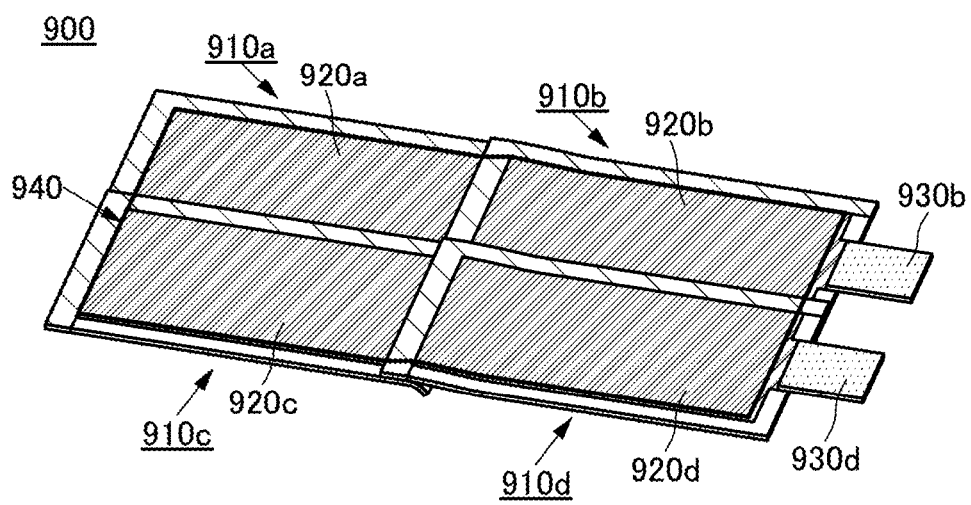
FIGS. 36A and 36B illustrate a structure example of a device.
Figure 36B:
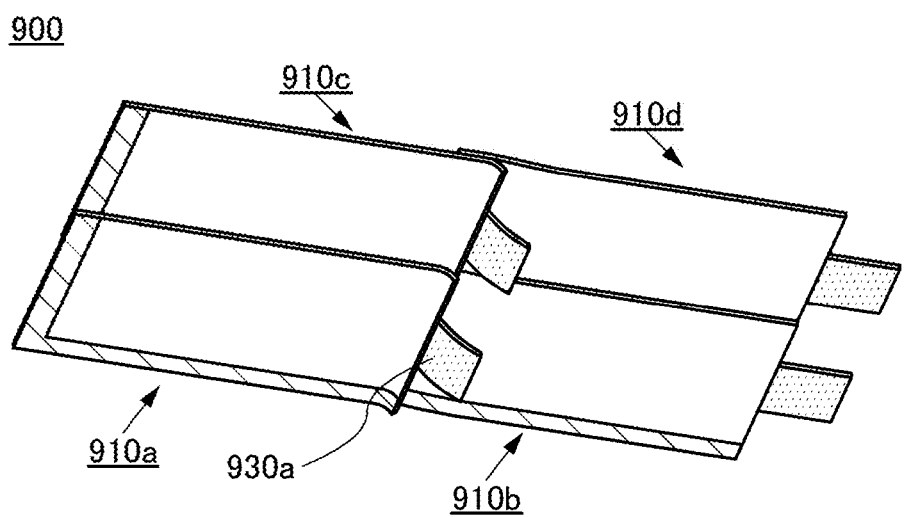

Next, a device including a plurality of display panels is described. FIG. 36A is a perspective view of a display surface side of a device 900. FIG. 36B is a perspective view of the side of the device 900 opposite to the display surface side. FIGS. 36A and 36B show a structure example of the device 900 including four display panels 910 arranged in a 2×2 matrix (two display panels both in the longitudinal direction and in the lateral direction); however, the number of the display panels 910 included in the device 900 is not limited thereto. FIGS. 36A and 36B illustrate an example where each of the display panels 910 is connected to an FPC. For the display panel 910, the display devices described in this embodiment can be used.

The display panel 910 may be flexible. When the flexible display panel 910 is used, as illustrated in FIGS. 36A and 36B, a region of the display panel 910a near an FPC 930a can be bent so that part of the display panel 910a and part of the FPC 930a can be placed under the display region 920b of the display panel 910b adjacent to the FPC 930a. As a result, the FPC 930a can be placed without physical interference with the rear surface of the display panel 910b.

Moreover, each display panel 910 is made flexible, in which case the display panel 910b can be curved gently so that the top surface of the display region 920b of the display panel 910b and the top surface of the display region 920a of the display panel 910a are leveled. Thus, the display regions can be leveled except the vicinity of a region where the display panel 910a and the display panel 910b overlap with each other.

Although, the relation between the display panel 910a and the display panel 910b is taken as an example in the above description, the same can apply to the relation between any other two adjacent display panels.

Furthermore, to reduce the step between two adjacent display panels 910, the thickness of the display panel 910 is preferably small. For example, the thickness of the display panel 910 is preferably less than or equal to 1 mm, further preferably less than or equal to 300 µm, still further preferably less than or equal to 100 µm. The display panel is preferably thin because the thickness or weight of the whole display device can also be reduced.

The device 900 can display an image on a display region 940 including the plurality of display regions 920. The device 900 including the plurality of display panels 910 in such a manner can be used for the display portion 50 illustrated in FIG. 1.

<Display Module>

Figure 37:
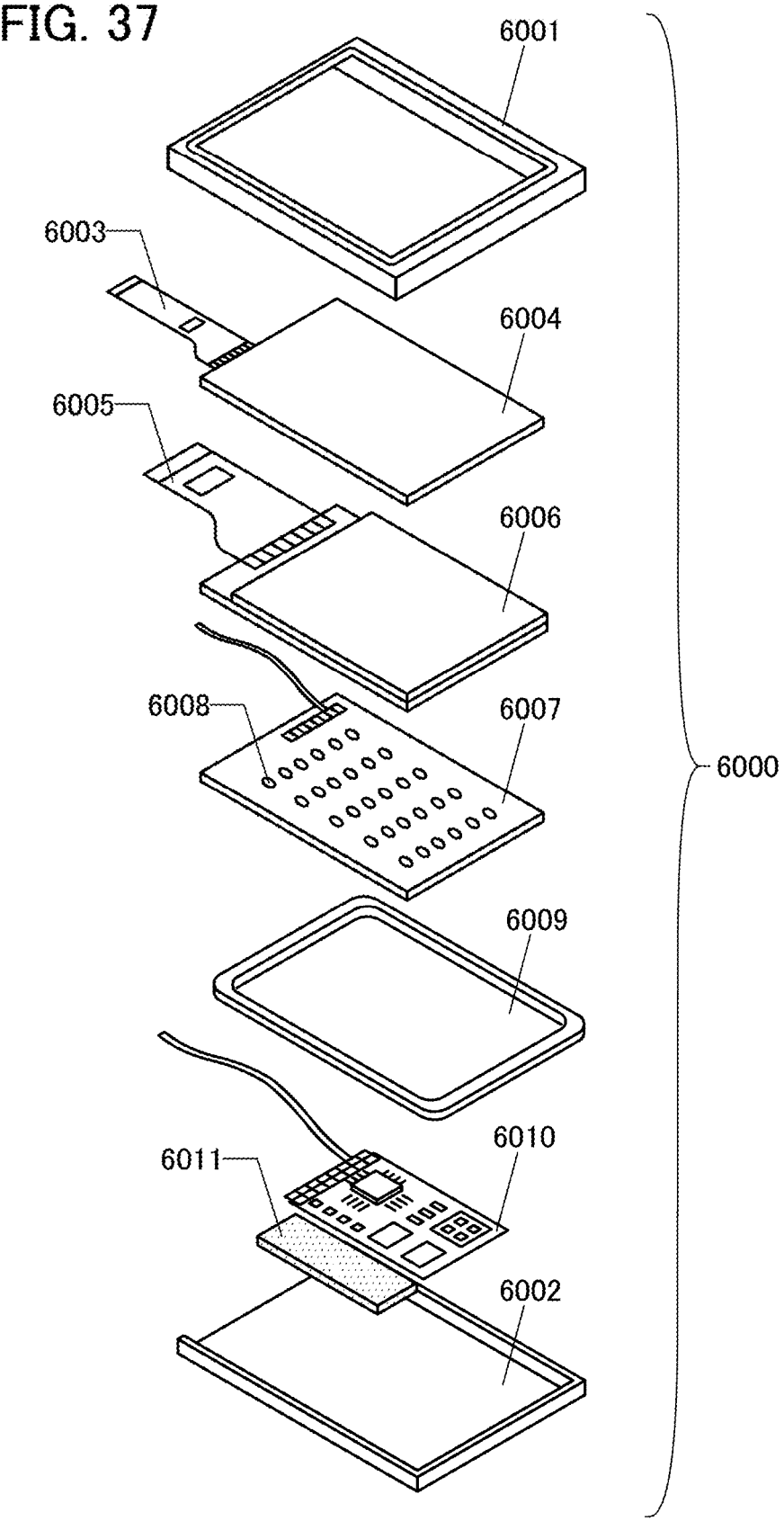
FIG. 37 illustrates a structure example of a display module.

Next, a display module is described. In a display module 6000 in FIG. 37, a touch sensor 6004 connected to an FPC 6003, a display panel 6006 connected to an FPC 6005, a backlight unit 6007, a frame 6009, a printed circuit board 6010, and a battery 6011 are provided between an upper cover 6001 and a lower cover 6002. Note that the backlight unit 6007, the battery 6011, the touch sensor 6004, and the like are not provided in some cases.

The semiconductor device of one embodiment of the present invention can be used for, for example, the touch sensor 6004, the display panel 6006, an integrated circuit mounted on the printed circuit board 6010, and the like. For example, the above-described display device can be used in the display panel 6006.

The shapes and sizes of the upper cover 6001 and the lower cover 6002 can be changed as appropriate in accordance with the sizes of the touch sensor 6004, the display panel 6006, and the like.

The touch sensor 6004 can be a resistive touch sensor or a capacitive touch sensor and may be formed to overlap with the display panel 6006. The display panel 6006 can have a touch sensor function. For example, an electrode for a touch sensor may be provided in each pixel of the display panel 6006 so that a capacitive touch panel function is added. Alternatively, a photosensor may be provided in each pixel of the display panel 6006 so that an optical touch sensor function is added. In the case where the touch sensor 6004 is not necessarily provided, the touch sensor 6004 can be omitted.

The backlight unit 6007 includes a light source 6008. The light source 6008 may be provided at an end portion of the backlight unit 6007 and a light diffusing plate may be used. When a light-emitting display device or the like is used for the display panel 6006, the backlight unit 6007 can be omitted.

The frame 6009 protects the display panel 6006 and also functions as an electromagnetic shield for blocking electromagnetic waves generated from the printed circuit board 6010 side. The frame 6009 may function as a radiator plate.

The printed circuit board 6010 has a power supply circuit, a signal processing circuit for outputting a video signal and a clock signal, and the like. As a power source for supplying power to the power supply circuit, the battery 6011 or a commercial power source may be used. Note that the battery 6011 can be omitted in the case where a commercial power source is used as the power source.

The display module 6000 can be additionally provided with a member such as a polarizing plate, a retardation plate, or a prism sheet.

This embodiment can be combined with any of the other embodiments as appropriate.

(Embodiment 7)

In this embodiment, examples of electronic devices using the device, the television system, or the like described in the above embodiments are described.

Examples of the electronic device including the device, the television system, or the like of one embodiment of the present invention include display devices such as televisions and monitors, desktop personal computers and laptop personal computers, word processors, image reproduction devices which reproduce still images or moving images stored in recording media such as digital versatile discs (DVDs), portable information terminals, tablet terminals, portable game consoles, stationary game machines such as pin-ball machines, calculators, electronic notebooks, e-book readers, video cameras, and digital still cameras.

Figure 38A:
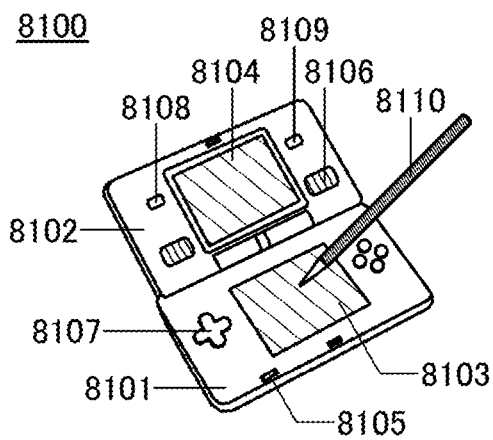
FIGS. 38A to 38F each illustrate a structure example of an electronic device.

A portable game machine 8100 illustrated in FIG. 38A includes a housing 8101, a housing 8102, a display portion 8103, a display portion 8104, a microphone 8105, a speaker 8106, an operation switch 8107, a light source 8108 for a sensor, a sensor 8109, and the like. In addition, the portable game machine 8100 includes an antenna, a battery, and the like inside the housing 8101. Although the portable game machine in FIG. 38A has the two display portions 8103 and 8104, the number of display portions included in a portable game machine is not limited to this. The display portion 8103 is provided with a touch sensor as an input device, which can be handled with a stylus 8110 or the like.

Figure 38B:
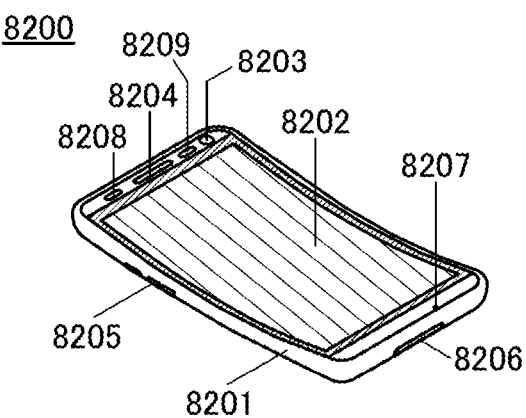

An information terminal 8200 illustrated in FIG. 38B includes a housing 8201, a display portion 8202, a microphone 8207, a speaker portion 8204, a camera 8203, an external connection portion 8206, an operation switch 8205, a light source 8208 for a sensor, a sensor 8209, and the like. A display panel and a touch sensor formed using a flexible substrate are provided in the display portion 8202. In addition, the information terminal 8200 includes an antenna, a battery, and the like inside the housing 8201. The information terminal 8200 can be used as, for example, a smart-phone, a mobile phone, a tablet information terminal, a tablet personal computer, or an e-book reader.

Figure 38C:
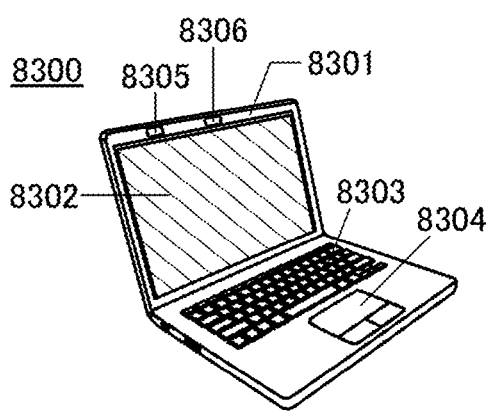

A notebook personal computer 8300 illustrated in FIG. 38C includes a housing 8301, a display portion 8302, a keyboard 8303, a pointing device 8304, a light source 8305 for a sensor, a sensor 8306, and the like. In addition, the notebook personal computer 8300 includes an antenna, a battery, and the like inside the housing 8301.

Figure 38D:
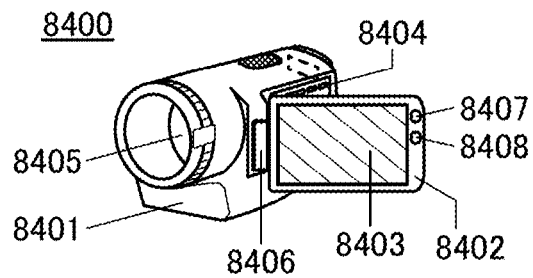

A video camera 8400 in FIG. 38D includes a housing 8401, a housing 8402, a display portion 8403, operation switches 8404, a lens 8405, a joint 8406, and the like. The operation switches 8404 and the lens 8405 are provided in the housing 8401, the display portion 8403, a light source 8407 for a sensor, and a sensor 8408 are provided in the housing 8402. In addition, the video camera 8400 includes an antenna, a battery, and the like inside the housing 8401. The housings 8401 and 8402 are connected to each other with the joint 8406, and the angle between the housings 8401 and 8402 can be changed with the joint 8406. The direction of an image on the display portion 8403 may be changed and display and non-display of an image may be switched depending on the angle between the housings 8401 and 8402.

Figure 38E:
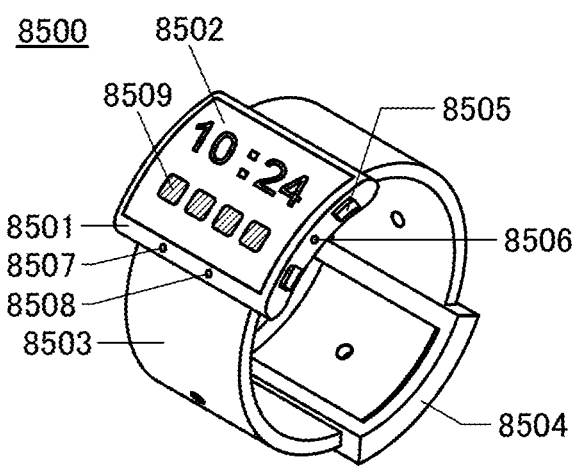

FIG. 38E illustrates an example of a watch-type information terminal. An information terminal 8500 includes a housing 8501, a display portion 8502, a band 8503, a buckle 8504, an operation switch 8505, an input/output terminal 8506, a light source 8507 for a sensor, a sensor 8508, and the like. In addition, the information terminal 8500 includes an antenna, a battery, and the like inside the housing 8501. The information terminal 8500 is capable of executing a variety of applications such as mobile phone calls, e-mailing, text viewing and editing, music reproduction, Internet communication, and computer games.

The display surface of the display portion 8502 is bent, and images can be displayed on the bent display surface. Further, the display portion 8502 includes a touch sensor, and operation can be performed by touching the screen with a finger, a stylus, or the like. For example, by touching an icon 8509 displayed on the display portion 8502, an application can be started. With the operation switch 8505, a variety of functions such as time setting, ON/OFF of the power, ON/OFF of wireless communication, setting and cancellation of a silent mode, and setting and cancellation of a power saving mode can be performed. For example, the functions of the operation switch 8505 can be set by setting the operating system incorporated in the information terminal 8500.

The information terminal 8500 can employ near field communication that is a communication method based on an existing communication standard. In that case, for example, mutual communication between the portable information terminal 8500 and a headset capable of wireless communication can be performed, and thus hands-free calling is possible.

Moreover, the information terminal 8500 includes the input/output terminal 8506, and data can be directly transmitted to and received from another information terminal via a connector. Power charging through the input/output terminal 8506 is possible. Note that the charging operation may be performed by wireless power feeding without using the input/output terminal 8506.

Figure 38F:
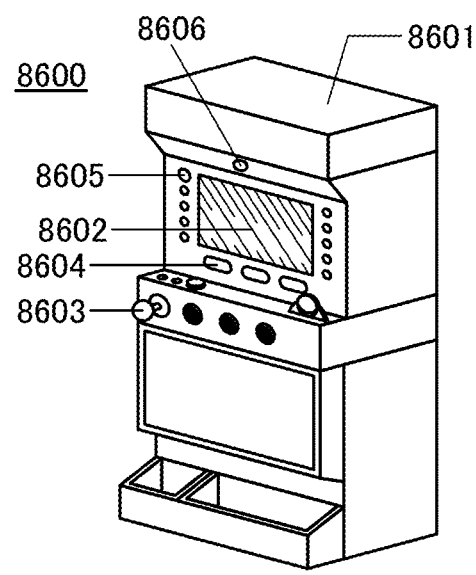

FIG. 38F shows an example of a slot machine 8600 which is a stationary game machine. In the slot machine 8600, a display portion 8602 is incorporated in a housing 8601. In addition, the slot machine 8600 includes an operation means such as a start lever 8603 or a stop switch 8604, a coin slot, a speaker, a light source 8605 for a sensor, a sensor 8606, and the like.

The electronic device shown in this embodiment can be provided with the device, the television system, or the like of one embodiment of the present invention.

This embodiment can be combined with any of the other embodiments as appropriate.

EXPLANATION OF REFERENCE

10: device, 20: front end portion, 30: decoder, 40: driver circuit, 41: circuit, 50: display portion, 51: display panel, 100: identification circuit, 110: signal generation circuit, 111: decoder circuit, 112: determination circuit, 120: loop filter, 130: signal generation circuit, 200: decoder circuit, 210: converter circuit, 220: adder circuit, 230: intra-frame prediction circuit, 240: memory circuit, 250: inter-frame prediction circuit, 260: memory circuit, 300: circuit, 301: counter, 302: XNOR , 303: XNOR , 304: FF, 305: inverter, 306: AND, 307: FF, 310: circuit, 311: counter, 312: XNOR , 313: XNOR , 314: XNOR , 315: AND, 316: FF, 317: AND, 318: FF, 320: circuit, 321: subtractor, 322: XNOR , 323: FF, 330: AND, 500: display device, 500a: display device, 500b: display device, 510: pixel portion, 511: pixel, 512: transistor, 513: liquid crystal element, 514: capacitor, 515: transistor, 516: transistor, 517: transistor, 518: light-emitting element, 519: capacitor, 520: driver circuit, 521: shift register, 522: buffer, 530: driver circuit, 531: shift register, 532: latch circuit, 533: buffer, 600: circuit, 601: transistor, 602: transistor, 603: transistor, 604: transistor, 605: inverter, 606: AND, 607: NAND, 608: inverter, 609: AND, 610: NAND, 611: inverter, 621: transistor, 622: transistor, 623: transistor, 624: transistor, 625: transistor, 626: transistor, 630: logic circuit, 710: transistor, 711: transistor, 720: transistor, 721: transistor, 725: transistor, 726: transistor, 730: transistor, 731: transistor, 740: transistor, 741: transistor, 742: transistor, 743: transistor, 744: transistor, 745: transistor, 746: transistor, 747: transistor, 748: transistor, 751:

transistor, 752: transistor, 753: transistor, 754: transistor, 822: insulating layer, 823: electrode, 824: electrode, 825: electrode, 826: insulating layer, 827: insulating layer, 828: insulating layer, 829: insulating layer, 831: opening, 842: semiconductor layer, 844: electrode, 847: opening, 855: impurity, 863: electrode, 866: electrode, 869: region, 871: substrate, 872: insulating layer, 873: insulating layer, 874: insulating layer, 875: insulating layer, 877: insulating layer, 882: insulating layer, 890: trap state, 900: device, 910: display panel, 920: display region, 930: FPC, 940: display region, 1000: broadcasting system, 1010: camera, 1011: transceiver, 1012: television system, 1013: receiver, 1014: display device, 1020: image sensor, 1021: image processor, 1022: encoder, 1023: modulator, 1025: demodulator, 1026: decoder, 1027: driver circuit, 1028: display portion, 1040: Raw data, 1041: image data, 1042: encoded data, 1043: broadcasting signal, 1044:

image data, 1045: signal, 1100: television receiver, 1101: broadcasting station, 1102: artificial satellite, 1103: radio tower, 1104: antenna, 1105: antenna, 1106A: radio wave, 1106B: radio wave, 1107A: radio wave, 1107B: radio wave, 1111: receiver, 1112: wireless transmitter, 1113: wireless transmitter, 1114: receiver, 1115: connector portion, 1200: ambulance, 1201: medical institution, 1202: medical institution, 1205: high-speed network, 1210: camera, 1211:

encoder, 1212: communication device, 1215: video data, 1216: video data, 1220: communication device, 1221: decoder, 4001: substrate, 4002: pixel portion, 4003: signal line driver circuit, 4004: scan line driver circuit, 4005: sealant, 4006: substrate, 4008: liquid crystal layer, 4010: transistor, 4011: transistor, 4013: liquid crystal element, 4014: wiring, 4015: electrode, 4017: electrode, 4018: FPC, 4019: anisotropic conductive layer, 4020: capacitor, 4021: electrode, 4030: electrode layer , 4031: electrode layer , 4032: insulating layer, 4033: insulating layer, 4035: spacer, 4102: insulating layer, 4103: insulating layer, 4110: insulating layer, 4111: insulating layer, 4112: insulating layer, 4510: bank, 4511: light-emitting layer, 4513: light-emitting element, 4514: filler, 6000: display module, 6001: upper cover, 6002: lower cover, 6003: FPC, 6004: touch sensor, 6005: FPC, 6006: display panel, 6007: backlight unit, 6008: light source, 6009: frame, 6010: printed circuit board, 6011: battery, 8100: portable game machine, 8101: housing, 8102: housing, 8103: display portion, 8104: display portion, 8105: microphone, 8106: speaker , 8107: operation switch, 8108: light source for a sensor, 8109: sensor, 8110: stylus, 8200: information terminal, 8201: housing, 8202: display portion, 8203: camera, 8204: speaker portion, 8205: operation switch, 8206: external connection portion, 8207: microphone, 8208: light source for a sensor, 8209: sensor, 8300: notebook personal computer, 8301: housing, 8302: display portion, 8303: keyboard, 8304: pointing device, 8305: light source for a sensor, 8306: sensor, 8400: video camera, 8401: housing, 8402: housing, 8403: display portion, 8404: operation switch, 8405: lens, 8406: joint, 8407: light source for a sensor, 8408: sensor, 8500: information terminal, 8501: housing, 8502: display portion, 8503: band, 8504: buckle, 8505: operation switch, 8506: input/output terminal, 8507: light source for a sensor, 8508: sensor, 8509: icon, 8600: slot machine, 8601: housing, 8602: display portion, 8603: start lever, 8604: stop switch, 8605: light source for a sensor, and 8606: sensor This application is based on Japanese Patent Application serial no. 2015-255674 filed with Japan Patent Office on Dec. 28, 2015, the entire contents of which are hereby incorporated by reference.

The invention claimed is:

1. A device comprising:
a decoder;
a driver circuit; and
a display portion comprising a first display panel and a second display panel,
wherein the decoder is configured to generate a signal corresponding to an image displayed on the display portion,
wherein the decoder is further configured to detect a change in an image in each of the first display panel and the second display panel, and determine whether or not image rewriting is necessary in each of the first display panel and the second display panel,
wherein the decoder is further configured to perform the determination on the basis of a value of a motion vector of the image displayed on the first display panel and a prediction error of an inter-frame prediction of the image displayed on the first display panel,
wherein the driver circuit is configured to output the signal to the first display panel when image rewriting is determined to be necessary for the first display panel, and
wherein the driver circuit is further configured to stop output of the signal to the first display panel when image rewriting is determined to be unnecessary for the first display panel.

2. The device according to claim 1,
wherein each of the first display panel and the second display panel comprises a pixel,
wherein the pixel comprises a transistor and a display element,
wherein one of a source and a drain of the transistor is electrically connected to a wiring,
wherein the other of the source and the drain of the transistor is electrically connected to the display element,
wherein the wiring is configured to transmit a potential corresponding to a gray level displayed in the pixel, and
wherein the transistor comprises an oxide semiconductor in a channel formation region.

3. The device according to claim 1, wherein the driver circuit is positioned inside the display portion.

4. A television system comprising the device according to claim 1, wherein the television system is configured to receive a broadcast signal to generate bitstream data and display an image on the basis of the bitstream data.

5. An electronic device comprising:
the device according to claim 1; and
any one of a microphone, a speaker, an operation switch and a sensor.

6. A device comprising:
a decoder;
a driver circuit; and
a display portion comprising a first display panel and a second display panel,
wherein the decoder is configured to generate a first signal corresponding to an image displayed on the display portion,
wherein the decoder is further configured to detect a change in an image in each of the first display panel and the second display panel, and determine whether or not image rewriting is necessary in each of the first display panel and the second display panel,
wherein the decoder is further configured to perform the determination on the basis of a value of a motion vector of the image displayed on the first display panel and a prediction error of an inter-frame prediction of the image displayed on the first display panel,
wherein the driver circuit is configured to output the first signal to the first display panel when image rewriting is determined to be necessary for the first display panel,
wherein the driver circuit is further configured to stop output of the first signal to the first display panel when image rewriting is determined to be unnecessary for the first display panel, and
wherein the decoder is further configured to generate a second signal to synchronize output of signals from the driver circuit to the display portion.

7. The device according to claim 6,
wherein each of the first display panel and the second display panel comprises a pixel,
wherein the pixel comprises a transistor and a display element,
wherein one of a source and a drain of the transistor is electrically connected to a wiring,
wherein the other of the source and the drain of the transistor is electrically connected to the display element, wherein the wiring is configured to transmit a potential corresponding to a gray level displayed in the pixel, and wherein the transistor comprises an oxide semiconductor in a channel formation region.

8. The device according to claim 6, wherein the driver circuit is positioned inside the display portion.

9. A television system comprising the device according to claim 6, wherein the television system is configured to receive a broadcast signal to generate bitstream data and display an image on the basis of the bitstream data.

10. An electronic device comprising:
the device according to claim 6; and
any one of a microphone, a speaker, an operation switch and a sensor.

11. A device comprising:
a decoder;
a driver circuit; and
a display portion comprising a first display panel and a second display panel,
wherein the decoder is configured to generate a signal corresponding to an image displayed on the display portion,
wherein the decoder is further configured to detect a change in an image in each of the first display panel and the second display panel, and determine whether or not image rewriting is necessary in each of the first display panel and the second display panel, and
wherein the decoder is further configured to perform the determination on the basis of a value of a motion vector of the image displayed on the first display panel and a prediction error of an inter-frame prediction of the image displayed on the first display panel.

12. The device according to claim 11, wherein each of the first display panel and the second display panel comprises a plurality of pixels.

13. The device according to claim 11,
wherein each of the first display panel and the second display panel comprises a pixel,
wherein the pixel comprises a transistor and a display element,
wherein one of a source and a drain of the transistor is electrically connected to a wiring,
wherein the other of the source and the drain of the transistor is electrically connected to the display element,
wherein the wiring is configured to transmit a potential corresponding to a gray level displayed in the pixel, and
wherein the transistor comprises an oxide semiconductor in a channel formation region.

14. The device according to claim 11, wherein the driver circuit is positioned inside the display portion.

15. A television system comprising the device according to claim 11, wherein the television system is configured to receive a broadcast signal to generate bitstream data and display an image on the basis of the bitstream data.

16. An electronic device comprising:
the device according to claim 11; and
any one of a microphone, a speaker, an operation switch and a sensor.

* * * * *